(12) United States Patent
Arazaki

(10) Patent No.: US 7,357,473 B2
(45) Date of Patent: Apr. 15, 2008

(54) PRINTER, PRINTER CONTROL PROGRAM, PRINTER CONTROL METHOD, PRINT DATA GENERATING DEVICE, PRINT DATA GENERATING PROGRAM, AND PRINT DATA GENERATING METHOD

(75) Inventor: Shinichi Arazaki, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/669,258

(22) Filed: Jan. 31, 2007

(65) Prior Publication Data

US 2007/0176965 A1    Aug. 2, 2007

(30) Foreign Application Priority Data

Feb. 1, 2006  (JP) ............... 2006-024154
Oct. 27, 2006 (JP) ............... 2006-292573

(51) Int. Cl.
*B41J 2/205* (2006.01)
(52) U.S. Cl. .......................... 347/15; 347/19
(58) Field of Classification Search ............... 347/15, 347/19, 43, 41
See application file for complete search history.

(56) References Cited

U.S. PATENT DOCUMENTS 5,581,284 A * 12/1996 Hermanson ............... 347/43
5,587,730 A * 12/1996 Karz ........................ 347/43
2004/0119766 A1 * 6/2004 Shibata et al. ............ 347/12

FOREIGN PATENT DOCUMENTS

| JP | 05-030361 | 2/1993 |
|---|---|---|
| JP | 11-151821 | 6/1999 |
| JP | 11-254662 | 9/1999 |
| JP | 2000-079710 | 3/2000 |
| JP | 2002-019101 | 1/2002 |
| JP | 2002-225716 | 8/2002 |
| JP | 2003-063043 | 3/2003 |
| JP | 2003-136702 | 5/2003 |

* cited by examiner

*Primary Examiner*—Lamson Nguyen
(74) *Attorney, Agent, or Firm*—Harness, Dickey & Pierce, P.L.C.

(57) ABSTRACT

A printer includes a print head having nozzles forming dots on a medium; a unit acquiring image data having pixel values with M gray scales (M≧2); a unit storing nozzle characteristic information; a unit specifying a banding generating nozzle based on the nozzle characteristic information; a processor performing a banding prevention process for data corresponding to a banding generation line formed by the banding generating nozzle and a different line formed by a different nozzle near the banding generating nozzle; a controller controlling the banding prevention processor so that a process range includes the banding generation line and the different line, a density difference of a line adjacent to the different line falling within a predetermined numerical range; and a unit printing an image on the medium with the print head based on the image data subjected to the banding prevention process.

18 Claims, 25 Drawing Sheets

| | OBJECT PIXEL | 7/16 |
|---|---|---|
| 3/16 | 5/16 | 1/16 |

| 1 | 0 | -1 |
|---|---|---|
| 1 | 0 | -1 |
| 1 | 0 | -1 |

| COLOR | Bk | Cy | Mg | Ye |
|---|---|---|---|---|
| CONCENTRATION CONTROL THRESHOLD VALUE th | 25 | 30 | 30 | 60 |

| 1 | -2 | 1 |
|---|---|---|
| -2 | 3 | -2 |
| 1 | -2 | 1 |

PRINTER, PRINTER CONTROL PROGRAM, PRINTER CONTROL METHOD, PRINT DATA GENERATING DEVICE, PRINT DATA GENERATING PROGRAM, AND PRINT DATA GENERATING METHOD

BACKGROUND

1. Technical Field

The present invention relates to a printer, such as a facsimile machine, a copier or other OA equipments, a printer control program and a printer control method, and more particularly, to a printer, a printer control program, a printer control method, a print data generating device, a print data generating program, and a print data generating method, which are adaptable for a so-called inkjet-typed printing process in which characters and/or images are printed on a print paper (recording material) by discharging particles of liquid ink having several colors on the print paper.

2. Related Art

Hereinafter, a printer, particularly a printer employing an inkjet method (hereinafter referred to as an inkjet printer) will be described.

In general, since inkjet printers are inexpensive and can easily produce color prints of high quality, the inkjet printers have widely spread to ordinary users as well as offices with increasing spread of personal computer, digital cameras and so on.

In such inkjet printers, in general, while a moving body, which is called a carriage or the like which includes an ink cartridge and a print head which are integrally formed, reciprocates on a print medium (paper) in a direction perpendicular to a paper feed direction, desired prints are produced by discharging (jetting) particles of liquid ink in a dotted shape from nozzles of the print head. The carriage may have four ink cartridges having four different colors (black, yellow, magenta and cyan) and respective print heads to allow full color print as well as monochrome print (in addition to this four-color print, six-color, seven-color print or eight-color print, including light cyan, light magenta and the like, is also putting to practical use).

However, in such inkjet printers in which the printing operation is performed while reciprocating the print head of the carriage in the direction perpendicular to the paper feed direction, the print head has to be reciprocated several tens times or more than 100 times in order to clearly print one page throughout. In other words, these inkjet printers have a drawback in that it takes even longer time to complete the printing operation than printers of different types, for example, laser printers or copiers employing an electrophotography.

On the other hand, in inkjet printers in which a long print head having the same width as a print paper is disposed without using a carriage, a so-called one scan (one pass) printing operation is possible without need to move the print head in a width direction, thereby allowing high speed print like the laser printers. In addition, since these inkjet printers require no carriage and no driving system for driving the carriage, they have an advantage of small-size, light weight, high silence. An inkjet printer of the former type (i.e., with carriage) is commonly called a "multi-pass type printer or "serial printer", while an inkjet printer of the latter type (i.e. without carriage) is commonly called a "line head type printer."

A print head essential to the inkjet printer is arranged in one or more rows in a printing direction with fine nozzles having a diameter of 10 to 70 µm or so disposed at specified intervals. Therefore, an ink discharge direction of some nozzles may be inclined or positions of nozzles may be deflected from their ideal positions due to their manufacturing errors. This may result in a so-called "flying deflection" effect that impact positions of dots formed by the nozzles are deflected from their ideal positions. In addition, if the nozzles are disposed very irregularly, the amount of discharged ink may be very larger or very smaller than the ideal amount.

As a result, there may occur a print defect, which is called a "banding (stripe) effect," in a portion printed by the defective nozzles, which results in noticeable deterioration of print quality. That is, if the "flying deflection" effect occurs, as a distance between dots discharged by adjacent nozzles becomes irregular, a "white stripe" (in case of white print paper) occurs in a portion where a distance between adjacent dots becomes abnormally long, while a "thick stripe" occurs in a portion where the distance between adjacent dots becomes abnormally short. In addition, when the amount of discharged ink is different from the ideal amount, the thick stripe occurs in a portion of print paper corresponding to a nozzle discharging a high amount of ink while the white stripe occurs in a portion of print paper corresponding to a nozzle discharging a low amount of ink.

Particularly, such a banding effect is apt to occur in the line head type printer in which the print head or the print medium is fixed (one pass print), rather than the multi-pass type printer (or the serial printer) (the multi-pass type printer may remove the banding effect by reciprocating the print head many times).

In order to prevent a kind of print defect by such a banding effect, although research and development have actively made to improve a hardware part, for example, a print head, it is difficult to provide a print head with no banding effect in the respect of manufacture costs and technique.

At present, accompanied with the improvement of the hardware part, a software method has been used to reduce the banding effect. Several examples of the software method are as follows.

For example, JP-A-2002-19101 and JP-A-2003-136702 disclose a technique in which a shading correction method is used in a portion of print paper having low print density to cope with irregularity of a print head while a color is substituted with a different color (for example, a black color is substituted with a cyan or magenta color) in a portion of print paper having high print density to remove the banding effect or print irregularity.

As another example, JP-A-2003-63043 discloses a technique in which a beta image (an image so painted throughout as not to view a base) is generated over all nozzles by increasing the discharge amount of ink of adjacent nozzles of neighboring pixels of nozzles that can not discharge ink.

As still another example, JP-A-5-30361 discloses a technique in which a degree of irregularity of nozzles is fed back to error diffusion and a banding effect is avoided by absorbing the irregularity of the discharge amount of ink of the nozzles.

However, in the related techniques disclosed in the above Patent Documents 1 to 4, since a banding prevention process to reduce deterioration of image quality by the banding effect is performed for only a portion to be corrected (a portion where a banding effect occurs), there may occur a visual difference between an image of a corrected portion and its adjacent images. In other words, the deterioration of the image quality may be more remarkable in the portions having such a difference than that before the banding prevention process.

SUMMARY

An advantage of some aspects of the invention is that it provides a new printer, a printer control program, a printer control method, a print data generating device, a print data generating program, and a print data generating method, which are capable of preventing or reducing deterioration of image quality due to an banding effect and preventing or reducing deterioration of print image quality which may occur when performing a process of preventing or reducing deterioration of the image quality due to the banding effect.

Aspect 1

According to Aspect 1 of the invention, there is provided a printer including: a print head having nozzles that form dots on a print medium; an image data acquiring unit that acquires image data having pixel values each having M gray scales (where, $M \geq 2$); a nozzle characteristic information storage that stores nozzle characteristic information representing characteristics of the nozzles; a nozzle specifying unit that specifies a nozzle concerned with banding generation in the print head, based on the nozzle characteristic information; a banding prevention processor that performs a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; a banding prevention processing controller that controls throughput of the banding prevention process in the banding prevention processor, based on a distance relationship between the banding generation line and the different line; a print data generating unit that generates print data including information associated with dot formation of the nozzle for the image data that are subjected to the banding prevention process; and a printing unit that prints an image on the print medium by means of the print head, based on the print data.

With this configuration, the image data having pixel values each having M gray scales (where, $M \geq 2$) can be acquired by the image data acquiring unit, the nozzle characteristic information representing characteristics of the nozzles can be stored by the nozzle characteristic information storage, the nozzle concerned with banding generation in the print head can be specified, based on the nozzle characteristic information, by the nozzle specifying unit, the banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding can be performed by the banding prevention processor, and the throughput of the banding prevention process in the banding prevention processor, based on a distance relationship between the banding generation line and the different line can be controlled by the banding prevention processing controller.

In addition, the print data including information associated with dot formation of the nozzle for the image data that are subjected to the banding prevention process can be generated by the print data generating unit, and the image can be printed on the print medium by means of the print head, based on the print data, by the printing unit.

That is, when the banding prevention process (a process of correcting pixel values, etc.) such as an information generating process to reduce deterioration of print quality due to banding is performed, since the throughput of the banding prevention process for the banding generation line constituted by dots formed by the nozzle concerned with the banding generation and the different line formed by the different nozzle near the nozzle concerned with the banding generation can be controlled based on the distance relationship between the banding generation line and the different line, it is possible to perform the banding prevention process with ordinary throughput (throughput required to realize the banding prevention) for the banding generation line and with less throughput for other lines.

Accordingly, since a visual difference between a print image of the banding generation line and a print image of the other lines can be inconspicuous even with light banding prevention process for the other lines as well as the banding generation line, the deterioration of the print quality due to the banding can be reduced, and also deterioration of the print quality which may occur by the banding prevention process can be reduced.

Here, the dot refers to one region formed when ink discharged from one or more nozzles impacts on the print medium. The dot has one or more kinds of finite sizes. A dot formed by discharged ink may not be necessarily a perfect circle. For example, if the dot is formed in a shape such as an ellipse other than the perfect circle, its average diameter may be treated as a dot diameter, or a diameter of an equivalent dot of the perfect circle having the same area as a dot formed by the specified amount of discharged ink may be treated as a dot diameter. In addition, a method of striking dots having different densitys may include, for example, a method of striking dots having the same size and different densitys, a method of striking dots having the same density and different sizes, a method of striking dots having the same density and different amounts of discharged ink, an overstriking method of changing the densitys of dots, etc. In addition, if one ink drop discharged from one nozzle is separately impacted, it may be assumed that one dot is formed, and, if two or more dots sequentially formed from one or two nozzles adhere to each other, it may be assumed that two dots are formed. The above description about the dots is equally applied to aspects associated with a printer, a printer control program, a printer control method, a print data generating device, a print data generating program, a print data generating method, and a record medium recorded with these programs, and the following description of exemplary embodiments.

The image data acquiring unit may acquire image data from an optical print readable unit such as a scanner, image data passively or actively from an external device via a network such as an LAN or a WAN, image data from a recording medium such as a CD-ROM, a DVD-ROM or the like through a driving device, such as a CD drive, a DVD drive or the like, included in the printer, or image data from a storage included in the printer. That is, the acquisition may include at least input, receipt, and read of the image data. The above description about the acquisition is equally applied to aspects associated with a printer, a printer control program, a printer control method, a print data generating device, a print data generating program, a print data generating method, and a record medium recorded with these programs, and the following description of exemplary embodiments.

The nozzle characteristic information may include information indicating whether or not nozzles of the print head are concerned with the banding, information based on which it is determined whether or not nozzles of the print head are concerned with the banding, etc. For example, the nozzle characteristic information may include deflection from an ideal formation position of an actually formed dot, a difference between a size of an actually formed dot and a size of an ideal dot, information (for example, a format converted into a flag indicating whether or not the nozzles are concerned with the banding) based on which the deflection and the difference can be easily controlled, etc. The above description about the nozzle characteristic information is equally applied to aspects associated with a printer, a printer control program, a printer control method, a print data generating device, a print data generating program, a print data generating method, and a record medium recorded with these programs, and the following description of exemplary embodiments.

The "nozzle characteristic information storing unit" may store the nozzle characteristic information by all means and at any times, store the nozzle characteristic information in advance, or store the nozzle characteristic information inputted from an external device when the printer operates. For example, before the printer is shipped, deflections of dot formation positions of nozzles of the print head or discharge conditions of ink may be checked by means of an optical print read unit such as a scanner, based on a printing result of the print head, and a result of the check may be beforehand stored in the nozzle characteristic information storing unit, or even when the printer is in use, deflections of dot formation positions of nozzles of the print head may be checked as before the printer is shipped, and a result of the check may be beforehand stored in the nozzle characteristic information storing unit. In addition, after the printer is used, in order to cope with possible change of characteristics of the print head, a difference between an actual print position and an ideal print position of the print head or discharge conditions of ink of the nozzles may be checked periodically or at a predetermined time by means of an optical print read unit such as a scanner, based on a printing result of the print head, and a result of the check may be stored in the nozzle characteristic information storing unit, along with data produced before the printer is shipped, or overwriting the produced data, for update of the nozzle characteristic information. The above description about the nozzle characteristic information storing unit is equally applied to aspects associated with a printer, a printer control program, a printer control method, a print data generating device, a print data generating program, a print data generating method, and a record medium recorded with these programs, and the following description of exemplary embodiments.

The "nozzle concerned with the banding" may include, for example, a nozzle generating a flying deflection effect, a nozzle having improper discharge amount of ink, etc. The above description about the nozzle concerned with the banding is equally applied to aspects associated with a printer, a printer control program, a printer control method, a print data generating device, a print data generating program, a print data generating method, and a record medium recorded with these programs, and the following description of exemplary embodiments.

The "nozzle near the nozzle concerned with the banding" may include, for example, a nozzle that forms 2~10 lines (strictly being varied depending on resolution or color) around a line formed by the nozzle concerned with the banding. In addition, if a line that forms elements constituting an image such as a figure or a table includes the line formed by the nozzle concerned with the banding, the nozzle near the nozzle concerned with the banding may include nozzles that form all other lines that constitute the elements around the line. In addition, as the resolution increases, the number of nozzles near the nozzle concerned with the banding increases. The above description about the nozzle near the nozzle concerned with the banding is equally applied to aspects associated with a printer, a printer control program, a printer control method, a print data generating device, a print data generating program, a print data generating method, and a record medium recorded with these programs, and the following description of exemplary embodiments.

The "information associated with the dot formation of the nozzle" may include information required when nozzles form dots, such as information associated with the presence or absence of dots for pixel values of the image data and information associated with sizes (for example, large, medium and small) of formed dots. For example, there is only one kind of dot size, the information associated with the dot formation of the nozzle may include only information on the presence or absence of dots. The above description about the nozzle concerned with the information associated with the dot formation of the nozzle is equally applied to aspects associated with a printer, a printer control program, a printer control method, a print data generating device, a print data generating program, a print data generating method, and a record medium recorded with these programs, and the following description of exemplary embodiments.

The "deterioration of print quality" may include, for example, deterioration of granularity of a print image, which may occur when unnecessary large dots are formed and mixed in the banding prevention process. The above description about the deterioration of print quality is equally applied to aspects associated with a printer, a printer control program, a printer control method, a print data generating device, a print data generating program, a print data generating method, and a record medium recorded with these programs, and the following description of exemplary embodiments.

The "banding" refers to defects of print, such as a flying deflection effect by a nozzle whose dot formation position is deflected from an ideal dot formation position, and a white stripe or a thick stripe appearing on a print due to badness of ink discharge of nozzles. The above description about the banding is equally applied to aspects associated with a printer, a printer control program, a printer control method, a print data generating device, a print data generating program, a print data generating method, and a record medium recorded with these programs, and the following description of exemplary embodiments.

The "flying deflection effect" refers to an effect that a dot is formed at a position deflected from an ideal position due to inclination of ink discharge direction of a nozzle, although it can discharge ink unlike inability to discharge ink of a nozzle. The above description about the flying deflection effect is equally applied to aspects associated with a printer, a printer control program, a printer control method, a print data generating device, a print data generating program, a print data generating method, and a record medium recorded with these programs, and the following description of exemplary embodiments.

The "white stripe" refers to a portion (region) where color of a base of a print medium is conspicuous in a line shape as a distance between adjacent dots becomes longer than a predetermined distance due to the "flying deflection effect,"

and the "thick stripe" refers to a portion (region) where color of a base of a print medium is inconspicuous as a distance between adjacent dots becomes shorter than a predetermined distance due to the "flying deflection effect," the color of the base of the print medium appears to be relatively thickened as a distance between adjacent dots becomes shorter, or overlap of deflected dots with normal dots becomes conspicuous in a thick line shape. The white stripe may be caused by the less amount of ink discharge of a nozzle while the thick stripe may be caused by the more amount of ink discharge of a nozzle. The above description about the white stripe and the thick stripe is equally applied to aspects associated with a printer, a printer control program, a printer control method, a print data generating device, a print data generating program, a print data generating method, and a record medium recorded with these programs, and the following description of exemplary embodiments.

The "banding prevention process" refers to a process for preventing or reducing generation of the banding itself or deterioration of print quality which occurs due to the banding. For example, the banding prevention process may include a process for reducing deterioration of print quality which occurs deflection of an actual dot formation position of a nozzle from its ideal dot formation position, a process for causing at least one of the nozzle concerned with the banding and the nozzle near the nozzle concerned with the banding not to form dots or forming dots in a dot pattern in which the banding is inconspicuous for an image portion corresponding to the nozzle, etc. The above description about the banding prevention process is equally applied to aspects associated with a printer, a printer control program, a printer control method, a print data generating device, a print data generating program, a print data generating method, and a record medium recorded with these programs, and the following description of exemplary embodiments.

Aspect 2

According to Aspect 2, it is preferable that the banding prevention processing controller controls the banding prevention processor such that the throughput of the banding prevention process for the different line is reduced as a distance between the banding generation line and the different line increases.

With this configuration, since the banding generation line is most heavily subjected to the banding prevention process and a line distant from the banding generation line is subjected to the banding prevention process with throughput in inverse proportion to the distance from the banding generation line (that is, the more distance, the less throughput), deterioration of print quality due to the banding can be prevented or reduced. In addition, since it is possible to make a visual difference between a print image at the banding generation line and print images at adjacent lines inconspicuous, deterioration of print quality, which may occur when the banding prevention process is performed, can be effectively prevented or reduced.

The "throughput of the banding prevention process for the different line is reduced as a distance between the banding generation line and the different line increases" includes not only a state where the throughput decreases successively with distance but also a state where the throughput decreases microscopically with distance although the throughput may increase in the course of banding prevention process. The above description about "the throughput of the banding prevention process for the different line is reduced as a distance between the banding generation line and the different line increases" is equally applied to aspects associated with a printer, a printer control program, a printer control method, a print data generating device, a print data generating program, a print data generating method, and a record medium recorded with these programs, and the following description of exemplary embodiments.

Aspect 3

According to Aspect 3 of the invention, there is provided a printer including: a print head having nozzles that form dots on a print medium; an image data acquiring unit that acquires image data having pixel values each having M gray scales (where, $M \geq 2$); a nozzle characteristic information storage that stores nozzle characteristic information representing characteristics of the nozzles; a nozzle specifying unit that specifies a nozzle concerned with banding generation in the print head, based on the nozzle characteristic information; a banding prevention processor that performs a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; a banding prevention processing controller that controls the banding prevention processor so that a process range of the banding prevention process in the banding prevention processor includes the banding generation line and the different line in the image data, a density difference of density values of a line adjacent to the different line falling within a predetermined numerical range; and a printing unit that prints an image on the print medium by means of the print head, based on the image data that are subjected to the banding prevention process.

With this configuration, the image data having pixel values each having M gray scales (where, $M \geq 2$) can be acquired by the image data acquiring unit, the nozzle characteristic information representing characteristics of the nozzles can be stored by the nozzle characteristic information storage, the nozzle concerned with banding generation in the print head can be specified, based on the nozzle characteristic information, by the nozzle specifying unit, the banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding can be performed by the banding prevention processor, and, by the banding prevention processing controller, the banding prevention processor can be controlled so that a process range of the banding prevention process in the banding prevention processor includes the banding generation line and the different line, a density difference of density values of a line adjacent to the different line falling within a predetermined numerical range.

In addition, the image can be printed on the print medium by means of the print head, based on the image data which are subjected to the banding prevention process, by the printing unit.

That is, a region having the same or substantially same property as the banding generation line can be subjected to the same banding prevention process as the banding generation line.

Accordingly, since a visual difference between a print image of the banding generation line and a print image of the other lines can become inconspicuous even with the banding prevention process for the other lines as well as the banding generation line, the deterioration of the print quality due to the banding can be reduced, and also deterioration of the print quality which may occur by the banding prevention process can be reduced.

In addition, since the banding prevention process may not be performed all over the image, the throughput can be reduced, and since the banding prevention process may be performed for only a needed portion, a print result with reduced deterioration of print quality can be attained.

Aspect 4

According to Aspect 4, it is preferable that the printer further includes a print data generating unit that generates print data including information associated with dot formation of the nozzle for the image data, based on the image data that are subjected to the banding prevention process, and the printing unit prints the image on the print medium by means of the print head, based on the print data.

With this configuration, the print data including information associated with dot formation of the nozzle for the image data can be generated, based on the image data that are subjected to the banding prevention process, by the print data generating unit, and the printing unit can print the image on the print medium by means of the print head, based on the print data. The printer of Aspect 3 has the same operation and effect as that of Aspect.

Aspect 5

According to Aspect 5, it is preferable that the banding prevention processing controller controls throughput of the banding prevention process in the banding prevention processor, based on a distance relationship between the banding generation line and the different line.

With this configuration, when the banding prevention process is performed, since the throughput of the banding prevention process for the banding generation line and the different line formed by the different nozzle near the nozzle concerned with the banding generation can be controlled based on the distance relationship between the banding generation line and the different line, it is possible to perform the banding prevention process with ordinary throughput (throughput required to realize the banding prevention) for the banding generation line and with less throughput for other lines.

Accordingly, since a visual difference between a print image of the banding generation line and a print image of the other lines can be inconspicuous even with light banding prevention process for the other lines adjacent to the banding generation line, the deterioration of the print quality due to the banding can be reduced, and also deterioration of the print quality which may occur by the banding prevention process can be effectively reduced.

Aspect 6

According to Aspect 6, it is preferable that the banding prevention processing controller controls the banding prevention processor such that the throughput of the banding prevention process for the different line is reduced as a distance between the banding generation line and the different line increases.

With this configuration, since the banding generation line is most heavily subjected to the banding prevention process and a line distant from the banding generation line is subjected to the banding prevention process with throughput in inverse proportion to the distance from the banding generation line (that is, the more distance, the less throughput), deterioration of print quality due to the banding can be prevented or reduced. In addition, since it is possible to make a visual difference between a print image at the banding generation line and print images at adjacent lines inconspicuous, deterioration of print quality, which may occur when the banding prevention process is performed, can be effectively prevented or reduced.

Here, the "throughput of the banding prevention process for the different line is reduced as a distance between the banding generation line and the different line increases" includes not only a state where the throughput decreases successively with distance but also a state where the throughput decreases microscopically with distance although the throughput may increase in the course of banding prevention process. The above description about "the throughput of the banding prevention process for the different line is reduced as a distance between the banding generation line and the different line increases" is equally applied to aspects associated with a printer, a printer control program, a printer control method, a print data generating device, a print data generating program, a print data generating method, and a record medium recorded with these programs, and the following description of exemplary embodiments.

Aspect 7

According to Aspect 7, it is preferable that the banding prevention processing controller controls the banding prevention processor to perform the banding prevention process for only data of the line whose density value exceeds a predetermined density value.

In general, since the number of formed dots is small in a region having low density (i.e., having high luminance), a difference by one nozzle is inconspicuous (deflection is relatively reduced as a distance between dots increases) and an area density difference (luminance difference) between the formed dots and the print medium (for example, print paper) is small, thereby making deflection of dot formation positions inconspicuous.

That is, with this configuration, since the banding prevention process is performed for data of lines in a halftone density range and a high density range while the banding prevention process may not be performed for a low density region where deterioration of print quality due to the banding is inconspicuous, a print result that is properly subjected to the banding prevention process can be attained.

Here, it is preferable that the density value exceeding the predetermined density value falls within a halftone and high density range. Accordingly, for example, in case of CMYK, assuming that the maximum number of print dots having the maximum density of each color (being varied depending on the kind of printer) is 100%, black (Bk) has a density value in a density range having, for example, more than 25% of the maximum number of print dots, cyan (Cy) and magenta (Mg) have a density value in a density range having, for example, more than 30% of the maximum number of print dots, and yellow (Ye) has a density value in a density range having, for example, more than 60% of the maximum number of print dots. The above description about the density value exceeding the predetermined density value is equally applied to aspects associated with a printer, a printer control program, a printer control method, a print data generating device, a print data generating program, a print data generating method, and a record medium recorded with these programs, and the following description of exemplary embodiments.

Aspect 8

According to Aspect 8, it is preferable that the banding prevention processing controller controls the banding prevention processor to perform the banding prevention process for only data of the line whose density value falls within a halftone density range.

With this configuration, since the banding prevention process is performed for data of lines in the halftone density range while the banding prevention process may not be performed for low and high density regions where deterioration of print quality due to the banding is inconspicuous, a print result that is properly subjected to the banding prevention process can be attained.

Here, the halftone density range is varied depending on ink color. For example, in case of CMYK, assuming that the maximum number of print dots having the maximum density of each color (being varied depending on the kind of printer) is 100%, black (Bk) has a halftone density range having, for example, 25%~90% of the maximum number of print dots, cyan (Cy) and magenta (Mg) have a halftone density range having, for example, more than 30%~90% of the maximum number of print dots, and yellow (Ye) has a halftone density range having, for example, more than 60%~90% of the maximum number of print dots.

The halftone density range need to be set according to a ratio of generation of dots, function of the printer, a binarization method, etc., in addition to the ink color. The above description about the halftone density value is equally applied to aspects associated with a printer, a printer control program, a printer control method, a print data generating device, a print data generating program, a print data generating method, and a record medium recorded with these programs, and the following description of exemplary embodiments.

Aspect 9

According to Aspect 9, it is preferable that the printer further includes a frequency information extracting unit that extracts frequency information from the image data, and the banding prevention processing controller determines the process range of the banding prevention process, based on the frequency information extracted by the frequency information extracting unit.

In general, the banding by irregularity of characteristics of nozzles is apt to be visually perceived in a portion having a low frequency component of an image in a particular region, while the banding by variation of an image is not nearly perceived in a portion having a low frequency component of the image, that is, in a portion where image content (luminance or density) is frequently varied.

That is, with this configuration, since the banding prevention process may not be performed for a region difficult to be visually perceived (high frequency region) while the banding prevention process may be performed for only a needed region (for example, low frequency region), based on the frequency information, a print result that is properly subjected to the banding prevention process can be attained.

Here, the frequency information is information based on which frequency magnitude of an image in a particular region can be determined, such as information on output values after filtering using a HPF (high pass filter), or information on transformation of an image signal into a frequency domain using a Fourier transform (FT, FFT, etc.), a discrete cosine transform (DCT), a Hadamard transform, etc. The above description about the frequency information is equally applied to aspects associated with a printer, a printer control program, a printer control method, a print data generating device, a print data generating program, a print data generating method, and a record medium recorded with these programs, and the following description of exemplary embodiments.

Aspect 10

According to Aspect 10, it is preferable that the printer further includes an edge information extracting unit that extracts edge information from the image data, and the banding prevention processing controller determines the process range of the banding prevention process, based on the edge information extracted by the edge information extracting unit.

With this configuration, the edge formation can be extracted from the image data by the edge information extracting unit, and the banding prevention processing controller can determine the process range of the banding prevention process, based on the edge information extracted by the edge information extracting unit.

For example, since edge information in an image region to be subjected to the banding prevention process can be easily extracted by an edge extracting filter or the like, a place that is visually suddenly varying in the image region (that is, having suddenly varying density) can be known from the edge information.

Accordingly, with the place suddenly varying as a boundary, for example, by performing the banding prevention process up to the boundary from the banding generation line while not performing the banding prevention process for a region before the boundary, it is possible to perform the banding prevention process for only a needed range (for example, a place having constant density or a place having density that is gradually varying). Accordingly, a print result that is properly subjected to the banding prevention process can be attained.

Aspect 11

According to Aspect 11, it is preferable that the printer further includes a print information acquiring unit that acquires print information including configuration information of the image, and the banding prevention processing controller determines the process range of the banding prevention process, based on the print information acquired by the print information acquiring unit.

Print data generated by a printer driver includes information indicating shape or size of portions of a print image, etc.

That is, with this configuration, since the shape or size of the portions of the print image can be known from the print information, the process range of the banding prevention process can be simply and reliably determined.

Aspect 12

According to Aspect 12, it is preferable that the nozzle characteristic information includes information on a difference between an actual position of the dots formed by the nozzles and an ideal position of the dots formed by the nozzles on the print medium.

With this configuration, it is possible to specify a nozzle that causes a flying deflection effect which is the cause of the banding and occurs when a dot formation position is deflected from an ideal dot formation position.

Here, the ideal dot formation position refers to a position at which dots are logically formed. For example, in case of a nozzle (printer) that forms dots with resolution of 180×180 [dpi], a lattice position of 180 [dpi] becomes a position at which the dots are logically formed, that is, an ideal dot formation position. The above description about the ideal dot formation position is equally applied to aspects associated with a printer, a printer control program, a printer control method, a print data generating device, a print data generating program, a print data generating method, and a record medium recorded with these programs, and the following description of exemplary embodiments.

Aspect 13

According to Aspect 13, it is preferable that the nozzle characteristic information includes information indicating the presence or absence of badness of ink discharge of the nozzles.

With this configuration, it is possible to specify a nozzle having badness of ink discharge which is the cause of the banding.

Here, the badness of ink discharge refers to a state where ink can not be ideally discharged, such as non-discharge of ink, insufficient discharge amount of ink, excessive discharge amount of ink, inability to discharge of ink onto an ideal position and the like. In addition, since the presence or absence of the badness of ink discharge of nozzles can be detected by, for example, a CCD sensor prepared in the printer, it is possible to generate information indicating the presence or absence of the badness of ink discharge based on a result of the detection. As an alternative method of detecting badness of ink discharge of a nozzle, a threshold value of a difference between an ideal dot formation position and an actual dot formation position is set, the threshold value is compared with an actual difference, and if the actual difference exceeds the threshold value, it is determined that the nozzle causes the badness of ink discharge. In addition, a threshold value of the amount of ink discharge of a nozzle is set, the threshold value is compared with an actual amount of ink discharge, and if the actual amount of ink discharge is more or less than the threshold value, it is determined that the nozzle causes the badness of ink discharge. The above description about the badness of ink discharge is equally applied to aspects associated with a printer, a printer control program, a printer control method, a print data generating device, a print data generating program, a print data generating method, and a record medium recorded with these programs, and the following description of exemplary embodiments.

Aspect 14

According to Aspect 14, it is preferable that the nozzle characteristic information includes information on a difference between an actual density value of the dots formed by the nozzles and an ideal density value of the dots formed by the nozzles.

With this configuration, it is possible to specify a nozzle that causes a density smear effect which is the cause of the handing and occurs when density of a formed dot is deflected from its ideal density.

Aspect 15

According to Aspect 15, it is preferable that the print head includes the nozzles successively arranged over a range wider than a load region of the print medium and is a print head which can print the image on the print medium through one scan.

With this configuration, as described above, it is possible to generate print data effective to cover a white stripe or a thick stripe which may occur due to a banding effect which is likely to occur in a line head type print head that completes a printing operation with a so-called one scan (one pass) print.

Here, the one scan print refers to that a printing operation is performed for one line in a paper transport direction (head moving direction) by means of only a nozzle responsible for the line and the printing operation for the line is completed when the nozzle passes the line once. The above description about the one scan print is equally applied to aspects associated with a printer, a printer control program, a printer control method, a print data generating device, a print data generating program, a print data generating method, and a record medium recorded with these programs, and the following description of exemplary embodiments.

Aspect 16

According to Aspect 16, it is preferable that the print head is a print head which performs a printing operation while reciprocating in a direction perpendicular to a conveyance direction of the print medium.

Aspect 17

According to Aspect 17 of the invention, there is provided a printer control program that causes a computer to execute a method of controlling a printer that prints an image on a print medium by means of a print head having nozzles that can form dots on the print medium, the method including: acquiring image data having pixel values each having M gray scales (where, $M \geq 2$); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling throughput of the banding prevention process, based on a distance relationship between the banding generation line and the different line; generating print data including information associated with dot formation of the nozzle for the image data that are subjected to the banding prevention process; and printing an image on the print medium by means of the print head, based on the print data.

With this configuration, when the computer reads the program and executes the read program, the same operation and effect as the printer of Aspect 1 are attained.

Aspect 18

According to Aspect 18, it is preferable that the banding prevention process is controlled such that the throughput of the banding prevention process for the different line is reduced as a distance between the banding generation line and the different line increases.

With this configuration, when the computer reads the program and executes the read program, the same operation and effect as the printer of Aspect 2 are attained.

Aspect 19

According to Aspect 19 of the invention, there is provided a printer control program that causes a computer to execute a method of controlling a printer that prints an image on a print medium by means of a print head having nozzles that can form dots on the print medium, the method including: acquiring image data having pixel values each having M gray scales (where, $M \geq 2$); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; and controlling a process range of the banding prevention process to include the banding generation line and the different line, a density difference of density values of a line adjacent to the different line falling within a predetermined numerical range.

With this configuration, when the computer reads the program and executes the read program, the same operation and effect as the printer of Aspect 3 are attained.

Aspect 20

According to Aspect 20, it is preferable that the method further includes: generating print data including information associated with dot formation of the nozzle for the image data, based on the image data that are subjected to the banding prevention process; and printing the image on the print medium by means of the print head, based on the print data.

With this configuration, when the computer reads the program and executes the read program, the same operation and effect as the printer of Aspect 4 are attained.

Aspect 21

According to Aspect 21, it is preferable that throughput of the banding prevention process is controlled based on a distance relationship between the banding generation line and the different line.

With this configuration, when the computer reads the program and executes the read program, the same operation and effect as the printer of Aspect 5 are attained.

Aspect 22

According to Aspect 22, it is preferable that the banding prevention process is controlled such that the throughput of the banding prevention process for the different line is reduced as a distance between the banding generation line and the different line increases.

With this configuration, when the computer reads the program and executes the read program, the same operation and effect as the printer of Aspect 6 are attained.

Aspect 23

According to Aspect 23, it is preferable that the banding prevention process is performed for only data of the line whose density value exceeds a predetermined density value.

With this configuration, when the computer reads the program and executes the read program, the same operation and effect as the printer of Aspect 7 are attained.

Aspect 24

According to Aspect 24, it is preferable that the banding prevention process is performed for only data of the line whose density value falls within a halftone density range.

With this configuration, when the computer reads the program and executes the read program, the same operation and effect as the printer of Aspect 8 are attained.

Aspect 25

According to Aspect 25, it is preferable that the method further includes extracting frequency information from the image data, and the process range of the banding prevention process is determined based on the extracted frequency information.

With this configuration, when the computer reads the program and executes the read program, the same operation and effect as the printer of Aspect 9 are attained.

Aspect 26

According to Aspect 26, it is preferable that the method further includes extracting edge information from the image data, and the process range of the banding prevention process is determined based on the extracted edge information.

With this configuration, when the computer reads the program and executes the read program, the same operation and effect as the printer of Aspect 10 are attained.

Aspect 27

According to Aspect 27, it is preferable that the method further includes acquiring print information including configuration information of the image, and the process range of the banding prevention process is determined based on the acquired print information.

With this configuration, when the computer reads the program and executes the read program, the same operation and effect as the printer of Aspect 11 are attained.

Aspect 28

According to Aspect 28, it is preferable that the nozzle characteristic information includes information on a difference between an actual position of the dots formed by the nozzles and an ideal position of the dots formed by the nozzles on the print medium.

With this configuration, when the computer reads the program and executes the read program, the same operation and effect as the printer of Aspect 12 are attained.

Aspect 29

According to Aspect 29, it is preferable that the nozzle characteristic information includes information indicating the presence or absence of badness of ink discharge of the nozzles.

With this configuration, when the computer reads the program and executes the read program, the same operation and effect as the printer of Aspect 13 are attained.

Aspect 30

According to Aspect 30, it is preferable that the nozzle characteristic information includes information on a difference between an actual density value of the dots formed by the nozzles and an ideal density value of the dots formed by the nozzles.

With this configuration, when the computer reads the program and executes the read program, the same operation and effect as the printer of Aspect 14 are attained.

Aspect 31

According to Aspect 31 of the invention, there is provided a printer control method of controlling a printer that prints an image on a print medium by means of a print head having nozzles that can form dots on the print medium, the method including: acquiring image data having pixel values each having M gray scales (where, $M \geq 2$); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling throughput of the banding prevention process, based on a distance relationship between the banding generation line and the different line; generating print data including information associated with dot formation of the nozzle for the image data that are subjected to the banding prevention process; and printing an image on the print medium by means of the print head, based on the print data.

With this configuration, the same effect as the printer of Aspect 1 is attained.

Aspect 32

According to Aspect 32, it is preferable that the banding prevention process is controlled such that the throughput of the banding prevention process for the different line is reduced as a distance between the banding generation line and the different line increases.

With this configuration, the same effect as the printer of Aspect 2 is attained.

Aspect 33

According to Aspect 33 of the invention, there is provided a printer control method of controlling a printer that prints an image on a print medium by means of a print head having nozzles that can form dots on the print medium, the method including: acquiring image data having pixel values each having M gray scales (where, M≧2); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling a process range of the banding prevention process to include the banding generation line and the different line, a density difference of density values of a line adjacent to the different line falling within a predetermined numerical range; and printing the image on the print medium by means of the print head, based on the image data that are subjected to the banding prevention process.

With this configuration, the same effect as the printer of Aspect 3 is attained.

Aspect 34

According to Aspect 34, it is preferable that the printer control method further includes generating print data including information associated with dot formation of the nozzle for the image data, based on the image data that are subjected to the banding prevention process, and the printing of the image on the print medium includes printing the image on the print medium by means of the print head, based on the print data.

With this configuration, the same effect as the printer of Aspect 4 is attained.

Aspect 35

According to Aspect 35, it is preferable that throughput of the banding prevention process is controlled based on a distance relationship between the banding generation line and the different line.

With this configuration, the same effect as the printer of Aspect 5 is attained.

Aspect 36

According to Aspect 36, it is preferable that the banding prevention process is controlled such that the throughput of the banding prevention process for the different line is reduced as a distance between the banding generation line and the different line increases.

With this configuration, the same effect as the printer of Aspect 6 is attained.

Aspect 37

According to Aspect 37, it is preferable that the banding prevention process is performed for only data of the line whose density value exceeds a predetermined density value.

With this configuration, the same effect as the printer of Aspect 7 is attained.

Aspect 38

According to Aspect 38, it is preferable that the banding prevention process is performed for only data of the line whose density value falls within a halftone density range.

With this configuration, the same effect as the printer of Aspect 8 is attained.

Aspect 39

According to Aspect 39, it is preferable that the method further includes extracting frequency information from the image data, and the process range of the banding prevention process is determined based on the extracted frequency information.

With this configuration, the same effect as the printer of Aspect 9 is attained.

Aspect 40

According to Aspect 40, it is preferable that the method further includes extracting edge information from the image data, and the process range of the banding prevention process is determined based on the extracted edge information.

With this configuration, the same effect as the printer of Aspect 10 is attained.

Aspect 41

According to Aspect 41, it is preferable that the method further includes acquiring print information including configuration information of the image, and the process range of the banding prevention process is determined based on the acquired print information.

With this configuration, the same effect as the printer of Aspect 11 is attained.

Aspect 42

According to Aspect 42, it is preferable that the nozzle characteristic information includes information on a difference between an actual position of the dots formed by the nozzles and an ideal position of the dots formed by the nozzles on the print medium.

With this configuration, the same effect as the printer of Aspect 12 is attained.

Aspect 43

According to Aspect 43, it is preferable that the nozzle characteristic information includes information indicating the presence or absence of badness of ink discharge of the nozzles.

With this configuration, the same effect as the printer of Aspect 13 is attained.

Aspect 44

According to Aspect 44, it is preferable that the nozzle characteristic information includes information on a difference between an actual density value of the dots formed by the nozzles and an ideal density value of the dots formed by the nozzles.

With this configuration, the same effect as the printer of Aspect 14 is attained.

Aspect 45

According to Aspect 45 of the invention, there is provided a print data generating device for generating print data used in a printer that prints an image on a print medium by means of a print head having nozzles that can form dots on the print medium, including: an image data acquiring unit that acquires image data having pixel values each having M gray scales (where, M≧2); a nozzle characteristic information storage that stores nozzle characteristic information representing characteristics of the nozzles; a nozzle specifying unit that specifies a nozzle concerned with banding generation in the print head, based on the nozzle characteristic information; a banding prevention processor that performs a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; a banding prevention processing controller that controls throughput of the banding prevention process in the banding prevention processor, based on a distance relationship between the banding generation line and the different line; and a print data generating unit that generates print data including information associated with dot formation of the nozzle for the image data that are subjected to the banding prevention process.

The print data generating device of Aspect 45 does not include a printing unit that actually prints an image on a print medium, but generates the print data based on original image data of M gray scales.

Accordingly, the same effect as the printer of Aspect 1 is attained. For example, since the printer can perform a printing process when the print data generated in the print data generating device of Aspect 45 are transferred to the printer, an existing inkjet type printer may be used without the need to use a dedicated printer.

In addition, since a general purpose information processor such as a PC (personal computer) may be used, an existing printing system including a print instruction device, such as a PC, and an inkjet printer may be utilized.

Aspect 46

According to Aspect 46, it is preferable that the banding prevention processing controller controls the banding prevention processor such that the throughput of the banding prevention process for the different line is reduced as a distance between the banding generation line and the different line increases.

With this configuration, the same effect as the printer of Aspect 2 is attained.

Aspect 47

According to Aspect 47 of the invention, there is provided a print data generating device for generating print data used in a printer that prints an image on a print medium by means of a print head having nozzles that can form dots on the print medium, including: an image data acquiring unit that acquires image data having pixel values each having M gray scales (where, M≧2); a nozzle characteristic information storage that stores nozzle characteristic information representing characteristics of the nozzles; a nozzle specifying unit that specifies a nozzle concerned with banding generation in the print head, based on the nozzle characteristic information; a banding prevention processor that performs a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; a banding prevention processing controller that controls the banding prevention processor so that a process range of the banding prevention process in the banding prevention processor includes the banding generation line and the different line, a density difference of density values of a line adjacent to the different line falling within a predetermined numerical range; and a print data generating unit that generates the print data including information associated with dot formation of the nozzle for the image data, based on the image data that are subjected to the banding prevention process.

With this configuration, the same effect as the printer of Aspect 4 is attained.

Aspect 48

According to Aspect 48, it is preferable that the banding prevention processing controller controls throughput of the banding prevention process in the banding prevention processor, based on a distance relationship between the banding generation line and the different line.

With this configuration, the same effect as the printer of Aspect 5 is attained.

Aspect 49

According to Aspect 49, it is preferable that the banding prevention processing controller controls the banding prevention processor such that the throughput of the banding prevention process for the different line is reduced as a distance between the banding generation line and the different line increases.

With this configuration, the same effect as the printer of Aspect 6 is attained.

Aspect 50

According to Aspect 50, it is preferable that the banding prevention processing controller controls the banding prevention processor to perform the banding prevention process for only data of the line whose density value exceeds a predetermined density value.

With this configuration, the same effect as the printer of Aspect 7 is attained.

Aspect 51

According to Aspect 51, it is preferable that the banding prevention processing controller controls the banding prevention processor to perform the banding prevention process for only data of the line whose density value falls within a halftone density range.

With this configuration, the same effect as the printer of Aspect 8 is attained.

Aspect 52

According to Aspect 52, it is preferable that the print data generating device further includes a frequency information extracting unit that extracts frequency information from the image data, and the banding prevention processing controller determines the process range of the banding prevention process, based on the frequency information extracted by the frequency information extracting unit.

With this configuration, the same effect as the printer of Aspect 9 is attained.

Aspect 53

According to Aspect 53, it is preferable that the print data generating device further includes an edge information extracting unit that extracts edge information from the image data, and the banding prevention processing controller determines the process range of the banding prevention process, based on the edge information extracted by the edge information extracting unit.

With this configuration, the same effect as the printer of Aspect 10 is attained.

Aspect 54

According to Aspect 54, it is preferable that the print data generating device further includes a print information acquiring unit that acquires print information including configuration information of the image, and the banding prevention processing controller determines the process range of the banding prevention process, based on the print information acquired by the print information acquiring unit.

With this configuration, the same effect as the printer of Aspect 11 is attained.

Aspect 55

According to Aspect 55, it is preferable that the nozzle characteristic information includes information on a difference between an actual position of the dots formed by the nozzles and an ideal position of the dots formed by the nozzles on the print medium.

With this configuration, the same effect as the printer of Aspect 12 is attained.

Aspect 56

According to Aspect 56, it is preferable that the nozzle characteristic information includes information indicating the presence or absence of badness of ink discharge of the nozzles.

With this configuration, the same effect as the printer of Aspect 13 is attained.

Aspect 57

According to Aspect 57, it is preferable that the nozzle characteristic information includes information on a difference between an actual density value of the dots formed by the nozzles and an ideal density value of the dots formed by the nozzles.

With this configuration, the same effect as the printer of Aspect 14 is attained.

Aspect 58

According to Aspect 58 of the invention, there is provided a print data generating program that causes a computer to execute a method to generate print data used in a printer that prints an image on a print medium by means of a print head having nozzles that can form dots on the print medium, the method including: acquiring image data having pixel values each having M gray scales (where, M≧2); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling throughput of the banding prevention process, based on a distance relationship between the banding generation line and the different line; and generating print data including information associated with dot formation of the nozzle for the image data that are subjected to the banding prevention process.

With this configuration, when the computer reads the program and executes the read program, the same operation and effect as the printer of Aspect 1 are attained.

Aspect 59

According to Aspect 59, it is preferable that the banding prevention process is controlled such that the throughput of the banding prevention process for the different line is reduced as a distance between the banding generation line and the different line increases.

With this configuration, when the computer reads the program and executes the read program, the same operation and effect as the printer of Aspect 2 are attained.

Aspect 60

According to Aspect 60 of the invention, there is provided a print data generating program that causes a computer to execute a method to generate print data used in a printer that prints an image on a print medium by means of a print head having nozzles that can form dots on the print medium, the method including: acquiring image data having pixel values each having M gray scales (where, M≧2); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling a process range of the banding prevention process to include the banding generation line and the different line, a density difference of density values of a line adjacent to the different line falling within a predetermined numerical range; and generating the print data including information associated with dot formation of the nozzle for the image data, based on the image data that are subjected to the banding prevention process.

With this configuration, when the computer reads the program and executes the read program, the same operation and effect as the printer of Aspect 4 are attained.

Aspect 61

According to Aspect 61, it is preferable that throughput of the banding prevention process is controlled based on a distance relationship between the banding generation line and the different line.

With this configuration, when the computer reads the program and executes the read program, the same operation and effect as the printer of Aspect 5 are attained.

Aspect 62

According to Aspect 62, it is preferable that the banding prevention process is controlled such that the throughput of the banding prevention process for the different line is reduced as a distance between the banding generation line and the different line increases.

With this configuration, when the computer reads the program and executes the read program, the same operation and effect as the printer of Aspect 6 are attained.

Aspect 63

According to Aspect 63, it is preferable that the banding prevention process is performed for only data of the line whose density value exceeds a predetermined density value.

With this configuration, when the computer reads the program and executes the read program, the same operation and effect as the printer of Aspect 7 are attained.

Aspect 64

According to Aspect 64, it is preferable that the banding prevention process is performed for only data of the line whose density value falls within a halftone density range.

With this configuration, when the computer reads the program and executes the read program, the same operation and effect as the printer of Aspect 8 are attained.

Aspect 65

According to Aspect 65, it is preferable that the method further includes extracting frequency information from the image data, and the process range of the banding prevention process is determined based on the extracted frequency information.

With this configuration, when the computer reads the program and executes the read program, the same operation and effect as the printer of Aspect 9 are attained.

Aspect 66

According to Aspect 66, it is preferable that the method further includes extracting edge information from the image data, and the process range of the banding prevention process is determined based on the extracted edge information.

With this configuration, when the computer reads the program and executes the read program, the same operation and effect as the printer of Aspect 10 are attained.

Aspect 67

According to Aspect 67, it is preferable that the method further includes acquiring print information including configuration information of the image, and the process range of the banding prevention process is determined based on the acquired print information.

With this configuration, when the computer reads the program and executes the read program, the same operation and effect as the printer of Aspect 11 are attained.

Aspect 68

According to Aspect 68, it is preferable that the nozzle characteristic information includes information on a difference between an actual position of the dots formed by the nozzles and an ideal position of the dots formed by the nozzles on the print medium.

With this configuration, when the computer reads the program and executes the read program, the same operation and effect as the printer of Aspect 12 are attained.

Aspect 69

According to Aspect 69, it is preferable that the nozzle characteristic information includes information indicating the presence or absence of badness of ink discharge of the nozzles.

With this configuration, when the computer reads the program and executes the read program, the same operation and effect as the printer of Aspect 13 are attained.

Aspect 70

According to Aspect 70, it is preferable that the nozzle characteristic information includes information on a difference between an actual density value of the dots formed by the nozzles and an ideal density value of the dots formed by the nozzles.

With this configuration, when the computer reads the program and executes the read program, the same operation and effect as the printer of Aspect 14 are attained.

Aspect 71

According to Aspect 71 of the invention, there is provided a print data generating method of generating print data used in a printer that prints an image on a print medium by means of a print head having nozzles that can form dots on the print medium, the method including: acquiring image data having pixel values each having M gray scales (where, $M \geq 2$); specifying a nozzle concerned with banding generation in the print heads based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling throughput of the banding prevention process, based on a distance relationship between the banding generation line and the different line; and generating print data including information associated with dot formation of the nozzle for the image data that are subjected to the banding prevention process.

With this configuration, the same effect as the printer of Aspect 1 is attained

Aspect 72

According to Aspect 72, it is preferable that the banding prevention process is controlled such that the throughput of the banding prevention process for the different line is reduced as a distance between the banding generation line and the different line increases.

With this configuration, the same effect as the printer of Aspect 2 is attained.

Aspect 73

According to Aspect 73 of the invention, there is provided a print data generating method of generating print data used in a printer that prints an image on a print medium by means of a print head having nozzles that can form dots on the print medium, the method including: acquiring image data having pixel values each having M gray scales (where, $M \geq 2$); specifying a nozzle concerned with banding generation in the print head, based on nozzle characteristic information representing characteristics of the nozzles; performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; controlling a process range of the banding prevention process to include the banding generation line and the different line, a density difference of density values of a line adjacent to the different line falling within a predetermined numerical range; and generating the print data including information associated with dot formation of the nozzle for the image data, based on the image data that are subjected to the banding prevention process.

With this configuration, the same effect as the printer of Aspect 4 is attained.

Aspect 74

According to Aspect 74, it is preferable that throughput of the banding prevention process is controlled based on a distance relationship between the banding generation line and the different line.

With this configuration, the same effect as the printer of Aspect 5 is attained.

Aspect 75

According to Aspect 75, it is preferable that the banding prevention process is controlled such that the throughput of the banding prevention process for the different line is reduced as a distance between the banding generation line and the different line increases.

With this configuration, the same effect as the printer of Aspect 6 is attained.

Aspect 76

According to Aspect 76, it is preferable that the banding prevention process is performed for only data of the line whose density value exceeds a predetermined density value.

With this configuration, the same effect as the printer of Aspect 7 is attained.

Aspect 77

According to Aspect 77, it is preferable that the banding prevention process is performed for only data of the line whose density value falls within a halftone density range.

With this configuration, the same effect as the printer of Aspect 8 is attained.

Aspect 78

According to Aspect 78, it is preferable that the method further includes extracting frequency information from the image data, and the process range of the banding prevention process is determined based on the extracted frequency information.

With this configuration, the same effect as the printer of Aspect 9 is attained.

Aspect 79

According to Aspect 79, it is preferable that the method further includes extracting edge information from the image data, and the process range of the banding prevention process is determined based on the extracted edge information.

With this configuration, the same effect as the printer of Aspect 10 is attained.

Aspect 80

According to Aspect 80, it is preferable that the method further includes acquiring print information including configuration information of the image, and the process range of the banding prevention process is determined based on the acquired print information.

With this configuration, the same effect as the printer of Aspect 11 is attained.

Aspect 81

According to Aspect 81, it is preferable that the nozzle characteristic information includes information on a difference between an actual position of the dots formed by the nozzles and an ideal position of the dots formed by the nozzles on the print medium.

With this configuration, the same effect as the printer of Aspect 12 is attained.

Aspect 82

According to Aspect 82, it is preferable that the nozzle characteristic information includes information indicating the presence or absence of badness of ink discharge of the nozzles.

With this configuration, the same effect as the printer of Aspect 13 is attained.

Aspect 83

According to Aspect 83, it is preferable that the nozzle characteristic information includes information on a difference between an actual density value of the dots formed by the nozzles and an ideal density value of the dots formed by the nozzles.

With this configuration, the same effect as the printer of Aspect 14 is attained.

Aspect 84

According to Aspect 84 of the invention, there is provided a computer readable storage medium that stores the printer control program of any one of Aspects 17 to 30.

With this configuration, the same effect as the printer control program of any one of Aspects 17 to 30 is attained, and the printer control program can be transferred via a storage medium such as a CD-ROM, a DVD-ROM, an MO or the like.

Aspect 85

According to Aspect 85 of the invention, there is provided a computer readable storage medium that stores the print data generating program of any one of Aspects 58 to 70.

With this configuration, the same effect as the print data generating program of any one of Aspects 58 to 70 is attained, and the print data generating program can be transferred via a storage medium such as a CD-ROM, a DVD-ROM, an MO or the like.

BRIEF DESCRIPTION OF THE DRAWINGS

The invention will be described with reference to the accompanying drawings wherein like numbers reference like elements.

DESCRIPTION OF EXEMPLARY EMBODIMENTS

First Embodiment

Hereinafter, a first embodiment of the invention will be described with reference to the drawings. FIGS. 1 to 16 are views illustrating a printer, a printer control program, a printer control method, a print data generating device, a print data generating program, and a print data generating method according to the first embodiment of the invention.

Figure 1:
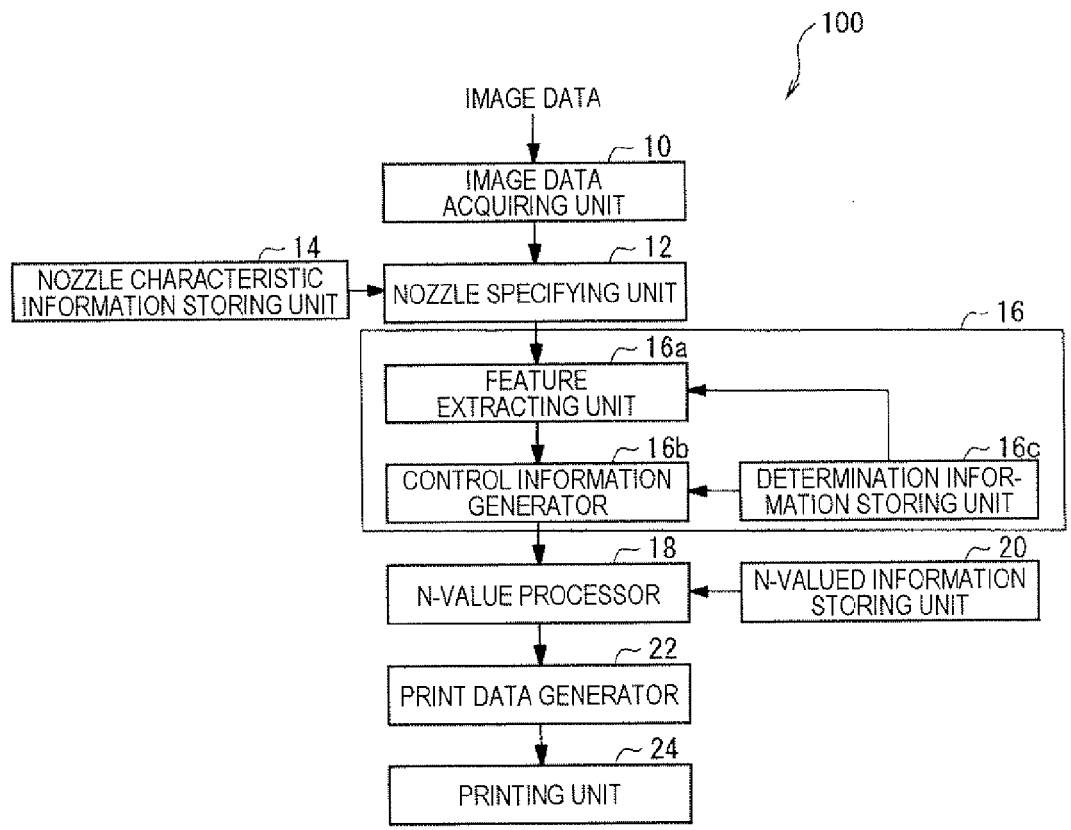
FIG. 1 is a block diagram showing a configuration of a printer 100 according to an aspect of the invention.

To begin with, a configuration of a printer 100 associated with the invention will be described with reference to FIG. 1. FIG. 1 is a block diagram showing the configuration of the printer 100 associated with the invention.

As shown in FIG. 1, the printer 100, being a line head type printer, includes an image data acquiring unit 10 that acquires image data of an M value ($M \geq 2$) forming an image from an external device, a storage and so on, a nozzle specifying unit 12 that specifies a nozzle concerned with banding generation based on nozzle characteristic information indicating characteristics of nozzles constituting a print head 200 which will be described later, a nozzle characteristic information storing unit 14 that stores the nozzle characteristic information, a banding prevention processing controller 16 that generates control information of a banding prevention process, an N-value processor 18 that performs an N-value process for the image data based on the control information and N-valued information including various information required for the N-value process, an N-valued information storing unit 20 that stores the N-valued information, a print data generator 22 that generates print data based on the image data which is subjected to the N-value process, and a printing unit 24 that prints an image of the image data on a printer paper based on the print data according to an inkjet method.

The image data acquiring unit 10 acquires image data of multiple values that have gray scales (luminance values) for each of colors (R, G and B) per one pixel, which are represented by 8 bits (0 to 255), for example. The image data may be acquired from an external device via a network such as an LAN or a WAN according to a print instruction from an input device or the like included in the printer according to the embodiment of the invention or an external device such as a PC, acquired from a recording medium such as a CD-ROM, a DVD-ROM or the like through a driving device (not shown), such as a CD drive, a DVD drive or the like, included in the printer according to the embodiment of the invention, or acquired from a storage 70, which will be described later, included in the printer according to the embodiment of the invention. In addition, the image data acquiring unit 10 may also convert multi-valued RGB data into multi-valued CMYK data (in case of four colors) corresponding to each ink of the print head 200. In addition, in this embodiment, the acquired image data include print information of a print driver. In general, the print information of the print driver includes print setting information associated with print setting and image information indicating a configuration of an image to be printed. In addition, the image information includes information associated with a shaper a coordinate, a size and so on of each of elements constituting the image.

The nozzle specifying unit 12 specifies a nozzle concerned with banding generation, of nozzles used for printing an image of the image data, based on the image data acquired in the image data acquiring unit 10 and the nozzle characteristic information stored in the nozzle characteristic information storing unit 14. In this embodiment, the print head 200 of the line head type is of a one-pass printing type, and the nozzle concerned with the banding generation generates the banding for one line of a printed image for which the nozzle is responsible. Hereinafter, the line at which the banding is generated is called a band generation line. In addition, the nozzle characteristic information includes information indicating the presence or absence of discharge badness of ink for each of nozzles N of the print head 200 included in the printing unit 24, information indicating a degree of flying deflection of each nozzle N, information on density smears of each nozzle N, etc. That is, the nozzle specifying unit 12 specifies a nozzle having discharge badness of ink, a nozzle having flying deflection of more than a predetermined level, a nozzle having high density smear, etc. as a nozzle concerned with the banding.

The nozzle characteristic information storing unit 14 stores the nozzle characteristic information including information indicating characteristics of the nozzles N, such as information indicating a correspondence of each nozzle N of the print head 200 included in the printing unit 24 to each of pixel data for the image data having respective resolutions, information indicating a correspondence of each nozzle N of the print head 200 included in the printing unit 24 to each of pixel data in the image data having respective resolutions, information indicating the presence or absence of discharge badness of ink for each nozzle N, information indicating a degree of flying deflection of each nozzle N, information on density smears of each nozzle N, etc. In addition, a characteristic of the print head 200 (each nozzle N) is fixed during a manufacture phase, and is relatively seldom changed after the manufacture phase, except for discharge badness due to ink stoppage rare. Accordingly, in most cases, the characteristic of the print head 200 does not have to be again set once it is checked and pre-stored in the nozzle characteristic information storing unit 14 at the time of shipping.

The banding prevention processing controller 16 includes a feature extracting unit 16a that extracts image feature (information on frequency, edge, density, etc.) from image data, a control information generator 16b that generates control information for the banding prevention process based on the image feature and determination information, and a determination information storing unit 16c that stores the determination information.

The feature extracting unit 16a extracts features of an image constituted by the CMYK image data from the CMYK image data obtained from the image data acquiring unit 10. Specifically, first, the feature extracting unit 16a extracts image information including information of elements constituting the image from the CMYK image data and selects an element (image region) associated with a particular nozzle based on the extracted image information. In this embodiment, the feature extracting unit 16a selects an image region including a banding generation line. Next, the feature extracting unit 16a extracts features associated with a frequency of the selected image region for each of colors of pixels constituting the selected image region. For example, the feature extracting unit 16a extracts an output value after filtering using a HPF (high pass filter), or a value of transformation of an image signal of the image region into a frequency domain using a Fourier transform (FT, FFT, etc.), a discrete cosine transform (DCT), a Hadamard transform, etc.

In addition, the feature extracting unit 16a compares the extracted frequency with a high frequency determination threshold value stored in the determination information storing unit 16c to determine whether or not the selected image region is in a high frequency domain. If it is determined that the selected image region is not in the high frequency domain, then the feature extracting unit 16a extracts features (density information) associated with a density value (or luminance value) of the selected image region for each of colors of pixels constituting the selected image region. In this embodiment, the density information refers to a mean value of density values for lines for which nozzles used for print of the selected image region are responsible. If it is determined that the selected image region is in the high frequency domain, the feature extracting unit 16a transmits the fact and the information of the selected image region to the control information generator 16b. If it is determined that the selected image region is not in the high frequency domain, the feature extracting unit 16a transmits the calculated average density value and the information of the selected image region to the control information generator 16b.

If the selected image region is not in the high frequency domain, the control information generator 16b determines whether or not different lines other than the banding generation line constituting the image of the selected image region are to be subjected to the banding prevention process, based on various information from the feature extracting unit 16a and the determination information stored in the determination storing unit 16c, and generates control information based on a result of the determination. Specifically, the control information generator 16b compares a differential value of average density values of adjacent lines in the selected image region with a threshold value defining an allowable variation range of density differential values to determine whether or not the differential value of average density values falls within the allowable variation range. That is, if the differential value falls within the allowable variation range, the different lines are determined to be subjected to the banding prevention process, and if the differential value is out of the allowable variation range, the different lines are regarded to have sudden density variation and are accordingly determined not to be subjected to the banding prevention process. Then, taking a region constituting the banding generation line and the different lines that are lined up in a direction perpendicular to the banding generation line and are determined to be subjected to the banding prevention process, as a range to be subjected to the banding prevention process, the control information generator 16b generates control information including information on the range. That is, taking a region having uniform or substantially uniform density or a region smoothly varying density such as a gradation image, as a range to be subjected to the banding prevention process, the control information generator 16b generates control information including information on the range.

In addition, if the selected image region falls within the high frequency domain, the control information generator 16b generates control information associated with the selected image region that is not subjected to the banding prevention process.

The determination information storing unit 16c stores the determination information including a threshold value and so on which are used to determine whether or not the image feature of the image region extracted in the feature extracting unit 16a is to be subjected to the banding prevention process.

The N-value processor 18 selects pixel data from the CMYK image data transmitted from the banding prevention processing controller 16 and, based on the control information transmitted from the banding prevention processing controller 16, determines whether or not the selected pixel data are to be subjected to the banding prevention process. If it is determined that the selected pixel data are to be subjected to the banding prevention process, the N-value processor 18 converts the selected pixel data into N-value pixel data by an N-value process accompanied with the banding prevention process, based on the N-valued information read from the N-valued information storing unit 20. On the contrary, if it is determined that the selected pixel data are not to be subjected to the banding prevention process, the N-value processor 18 converts the selected pixel data into N-value pixel data by an ordinary N-value process. An error diffusion method, a dither method or the like may be used for the N-value process. Using the error diffusion method, the N-value processor 18 converts the selected pixel data into the N-valued pixel data, calculates a difference between a pixel value before the N-value conversion of the pixel data and a pixel value after the N-value conversion, and diffuses pixel data, which are not subjected to the N-value process, of adjacent pixels corresponding to the selected pixel data, using the difference as an error. Using the dither method, the N-value processor 18 compares a predetermined threshold value of a dither matrix with a pixel value to determine whether or not dots are to be printed. In this embodiment, the N-valued information includes an N-value threshold value corresponding to a dot formation size of a nozzle, a dot number corresponding to the dot formation size, a pixel value (for example, density value) after the N-value conversion, which corresponds to the dot number, an error diffusion matrix, a dither matrix, a dot generation ratio table, etc.

Specifically, when the N-value process accompanied with the banding prevention process is performed, the N-value processor 18 determines a formation ratio of small dots to large dots in a line corresponding to an abnormal nozzle, such as a nozzle generating a flying deflection or a nozzle that can not discharge ink, according to a dot generation ration table prepared for the banding prevention process, and performs the N-value process based on the determined formation ratio. On the other hand, when an ordinary N-value process is performed, the N-value processor 18 performs the N-value process according to a dot generation ration table prepared for the ordinary N-value process.

As described above, when all pixel data of the image data are subjected to the N-value process and the error diffusion process, the pixel data are converted into data including pixel values (density values and luminance values) and nozzle number information according to N kinds of dot formation sizes which can be formed by nozzles of the print head 200. Hereinafter, CMYK image data after the N-value process and the error diffusion process are called N-valued image data.

Here, the N-value process refers to a process of converting image data having an M value ($M \geq 2$) (that is, having M kinds of pixel values (pixel data)) into data having an N value ($M \geq N \geq 2$) (that is, having N kinds of numerical values). For example, in case of binarization, a pixel value to be converted is compared with a threshold value, and the pixel value to be converted is converted into one of two kinds of predetermined numerical values. For example, the pixel value to be converted is converted into "1" if the pixel value exceeds the threshold value and is converted into "0" if the pixel value is less than the threshold value. Similarly, in case of N-value conversion, pixel values of M are compared with N kinds of threshold values, and the pixel values are converted into one of N kinds of predetermined numerical values according to a result of the comparison.

The error diffusion method diffuses errors in the same way as known error diffusion methods. For example, in case of binarization process in which the image data having the N value are converted into "0" if pixel values are less than a threshold value "128" and are converted into "255" if the pixel values are more than the threshold value "128," if a pixel value of a selected pixel is "101", "101" is converted into "0", and the pixel is diffused with respect to a plurality of pixels, which is not subjected to the N-value conversion, using "101", which is a difference between "0" after the conversion and "101" before the conversion, as an error, according to a predetermined diffusion method. For example, a pixel (for example, having a pixel value "101") on the right side of the selected pixel can not satisfy the threshold value by only the ordinary binarization process, like the selected pixel. However, when this pixel having the pixel value "101" receives an error of the selected pixel, for example, "27," and a value of the pixel becomes "128" which is equal to the threshold value, and accordingly is converted into "1." In case of the dither method, a value is determined by only comparing a threshold value at a corresponding position with a pixel value.

The N-valued information storing unit 20 stores N-valued information including an N-value threshold value corresponding to a dot formation size of a nozzle, a dot number corresponding to the dot formation size, a pixel value (for example, luminance value) after the N-value conversion, which corresponds to the dot number, an error diffusion matrix, a dither matrix, a dot generation ratio table, etc, as described above.

The print data generator 22 generates print data having a data format which can analyze the printing unit 24 and into which the N-valued image data are converted.

Figure 3:
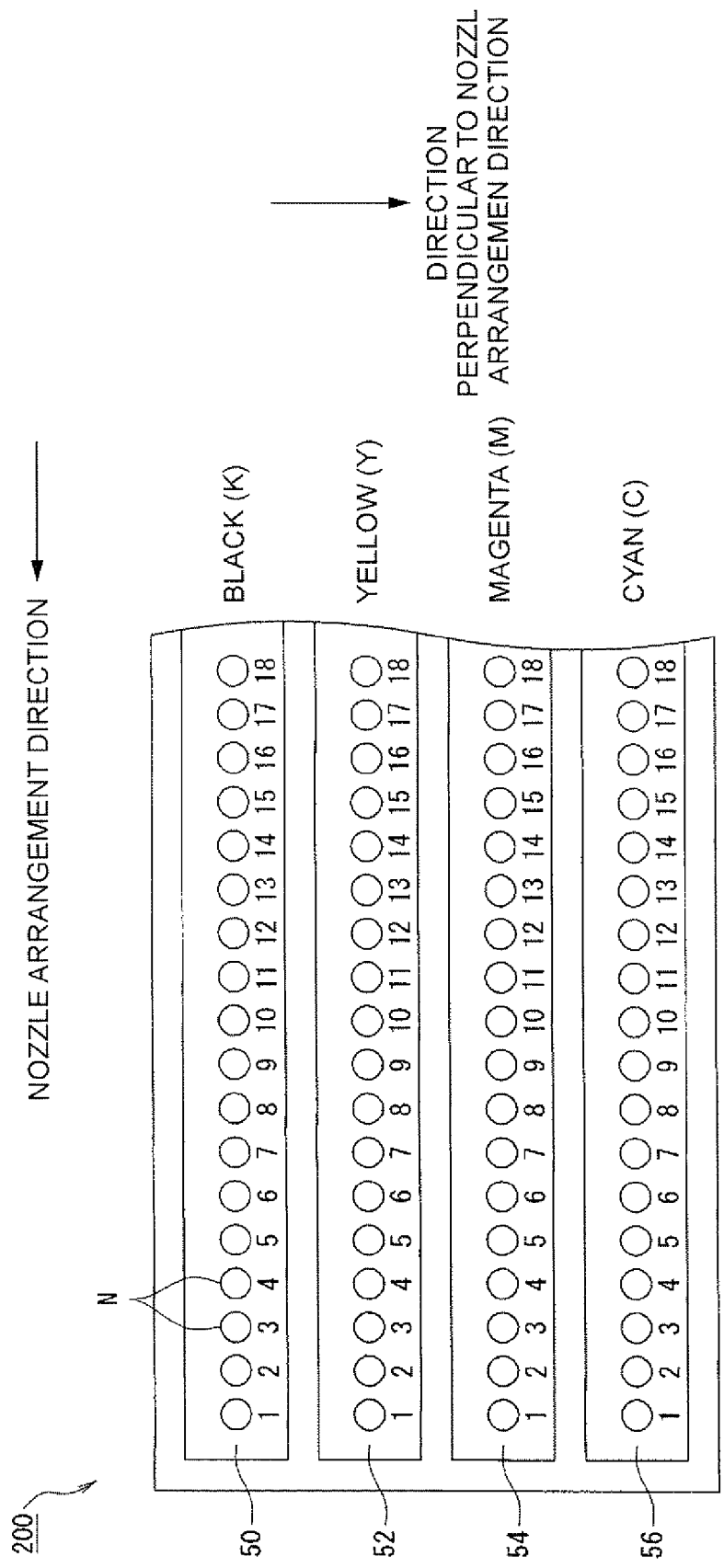
FIG. 3 is a partially enlarged bottom view showing a structure of a print head 200 according to an aspect of the invention.
Figure 4:
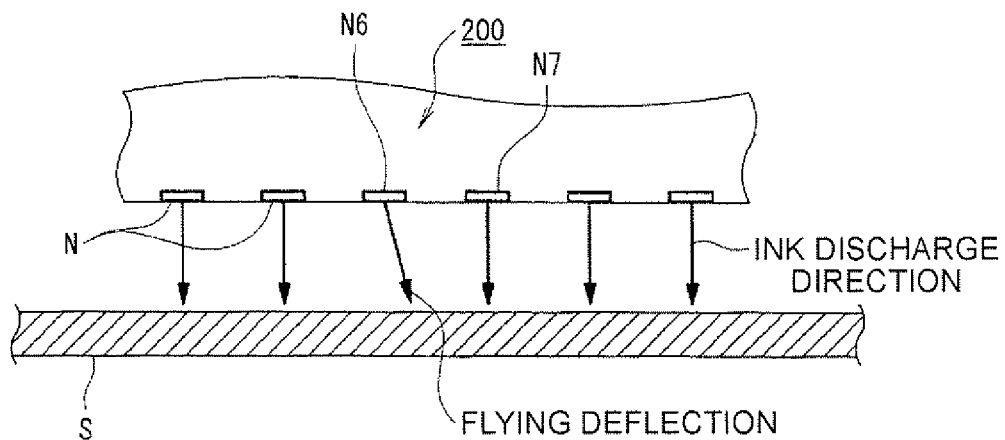
FIG. 4 is a partially enlarged side view of FIG. 3.

FIG. 3 is a partially enlarged bottom view showing a structure of the print head 200 according to the embodiment of the invention, and FIG. 4 is a partially enlarged side view of FIG. 3.

As shown in FIG. 3, the print head 200 includes four nozzle modules 50, 52, 54 and 56, that is, a black nozzle module 50 in which a plurality of nozzles N (18 in the figure) that discharges black (K) ink is arranged in a line in a nozzle arrangement direction, a yellow nozzle module 52 in which a plurality of nozzles N that discharges yellow (Y) ink is arranged in a line in the nozzle arrangement direction, a magenta nozzle module 54 in which a plurality of nozzles N that discharges magenta (M) ink is arranged in a line in the nozzle arrangement direction, and a cyan nozzle module 56 in which a plurality of nozzles N that discharges cyan (C) ink is arranged in a line in the nozzle arrangement direction. These nozzle modules 50, 52, 54 and 56 are integrally arranged in such a manner that nozzles N having the same number are lined up in a print direction (perpendicular to the nozzle arrangement direction), as shown in FIG. 3. Accordingly, the plurality of nozzles N constituting each nozzle module is arranged in a line in the nozzle arrangement direction, and nozzles N having the same number in these nozzle modules are arranged in a line in the print direction.

The print head 200 as constructed above prints circular dots on a white print paper by discharging ink supplied into an ink chamber (not shown) prepared for each nozzle N1, N2, N3, . . . , by means of a piezoelectric element such as a piezo actuator (not shown) prepared for each ink chamber, while printing dots having different sizes for each nozzle N1, N2, N3, . . . , by controlling a voltage applied to the piezoelectric element in multiple steps to thereby control the amount of ink discharged from the ink chamber. In addition, in any case, one dot may be formed on the print paper by applying a voltage to each nozzle in two steps in a time-series within a short time to thereby combine two discharges. In this case, by first discharging a small dot and then discharging a large dot using their different discharge speeds due to their size difference, it is possible to impact ink on substantially the same position of the print paper to form one larger dot thereon. FIG. 4 shows a state where a sixth nozzle N6 on the left of the black nozzle module 50 of the four nozzle modules 50, 52, 54 and 56 causes a flying deflection effect, ink is obliquely discharged from the nozzle N6 into a print medium S, and accordingly, a dot formed on the print medium S by the ink obliquely discharged from the nozzle N6 is formed near a dot that is formed on the print medium S by ink discharged from a normal nozzle N7 next to the nozzle N6.

Returning to FIGS. 1 and 3, the printing unit 24 is an inkjet type printer that forms an image including a plurality of dots on the print medium S (for example, print paper) by jetting ink from the nozzle modules 50, 52, 54 and 56, which are prepared in the print head 200, in a dot shape while moving one or both of the print medium S and the print head 200. The printing unit 24 includes not only the print head 200 but also a print head conveyance mechanism (not shown) (in case of multi-pass type) that reciprocates the print head 200 on the print medium S in its width direction, a paper conveyance mechanism (not shown) that conveys the print medium S, a print control mechanism (not shown) that controls ink discharge of the print head 200 based on print data, etc.

Figure 2:
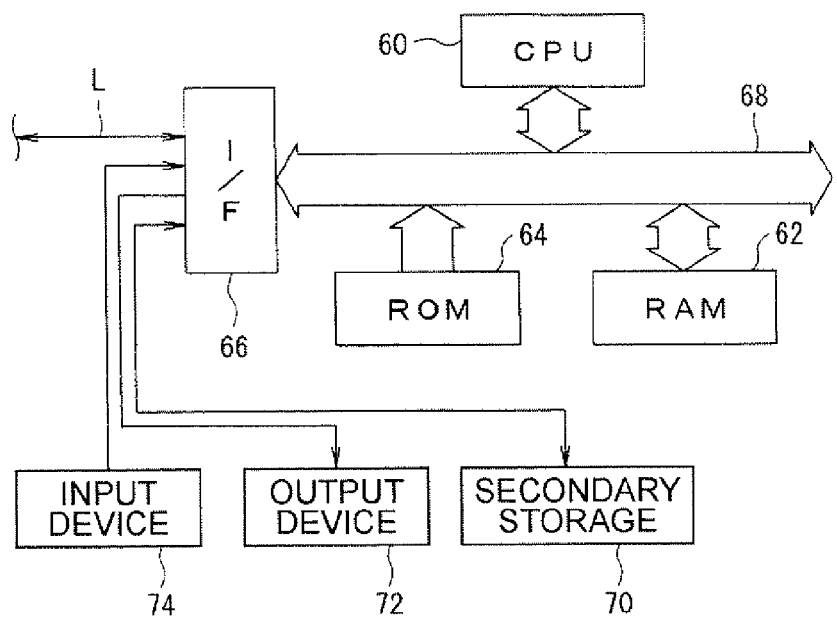
FIG. 2 is a view showing a hardware configuration of a computer system.

In addition, the printer 100 includes a computer system that executes, on software, functions of the image data acquiring unit 10, the nozzle specifying unit 12, the banding prevention processing controller 16, the N-value processor 18, the print data generator 22, the printing unit 24, etc., or executes software programs to control hardware required to realize the above functions. As shown in FIG. 2, a hardware configuration of the computer system includes a CPU (Central Processing Unit) 60 that is responsible for various controls and arithmetic operations, a RAM (Random Access Memory) 62 that forms a main storage, a ROM (Read Only Memory) 64, which are interconnected by various internal and external buses 68 such as a PCI (Peripheral Component Interconnect) bus and an ISA (Industrial Standard Architecture) bus, a secondary storage 70 such as a HDD, the printing unit 13 (see FIG. 1), an output device 72 such as a CRT or an LCD monitor, an input device 74 such as an operation panel, a mouse, a keyboard or a scanner, a print instruction device (not shown), etc., which are connected to the buses 68 through network cables L and an input/output (I/F) interface 66.

When the computer system is powered on, a system program, such as a BIOS stored in the ROM 64 or the like, loads various dedicated computer programs pre-stored in the ROM 64 or various dedicated computer programs installed in the secondary storage 70 through a storage medium such as a CD-ROM, DVD-ROM, flexible disk (FD) or a communication network such as Internet into the RAM 62, and the CPU 60 performs predetermined controls and arithmetic operations by making use of various resources according to instructions described in the programs loaded into the RAM 62, so that the above functions can be realized on software.

Figure 5:
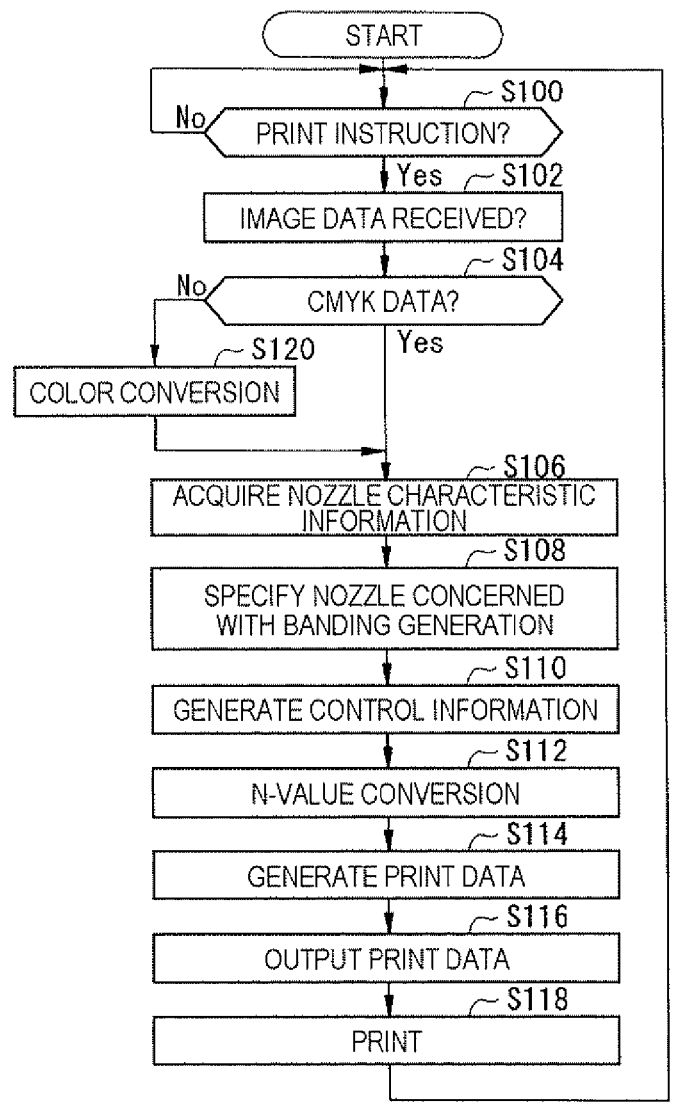
FIG. 5 is a flow chart illustrating a printing process of the printer 100.

In addition, the printer 100 starts a program stored in a predetermined area of the ROM 64 by means of the CPU 60 and performs a printing process as shown in a flow chart of FIG. 5 according to the program. In addition, although the print head 200 can generally form dots having different kinds of colors such as four colors or six colors, the print head 200 is assumed to be constituted by nozzle modules that form four color dots of CMYK, as described above, in this embodiment.

FIG. 5 is a flow chart illustrating a printing process of the printer 100.

As shown in FIG. 5, when the printing process is performed by the CPU 60, first, the printing process proceeds to Step S100.

In step S100, the image data acquiring unit 10 determines whether or not a print instruction is inputted from an external device connected to the printer 100 via the network cable L or directly from the input device 74 of the printer 100. If it is determined that the print instruction is inputted (Yes), the printing process proceeds to Step S102. If it is determined that the print instruction is not inputted (No), the determination step S100 is repeated until the print instruction is inputted.

In step S102, the image data acquiring unit 10 determines whether or not image data having an M value ($M \geq N \geq 2$) corresponding to the print instruction are acquired from the external device, the recording medium such as the CD-ROM or the DVD-ROM, or the secondary storage such as the HDD, as described above. If it is determined that the image data are acquired (Yes), the printing process proceeds to Step S104. If it is determined that the image data are not acquired (No), the printer 100 informs a print instruction source that it is impossible to perform a printing operation, and the printing process for the print instruction is abandoned and proceeds to Step S100.

In step S104, the image data acquiring unit 10 determines whether or not the image data having the M value acquired in Step S102 have CMYK color information. If so (Yes), the image data acquired in Step S102 are transferred to the nozzle specifying unit 12 and then the printing process proceeds to Step S106. Otherwise (No), the printing process proceeds to Step S120.

In step S106, the nozzle specifying unit 12 acquires nozzle characteristic information from the nozzle characteristic information storing unit 14 and then the printing process proceeds to Step S108.

In step S108, the nozzle specifying unit 12 specifies a nozzle concerned with banding generation, of nozzles used for print of the CMYK image data acquired in the image data acquiring unit 10, based on the nozzle characteristic information, and the printing process proceeds to Step S110.

In step S110, the banding prevention processing controller 16 generates control information of banding prevention process, based on information on the nozzle specified in Step S108 (Hereinafter referred to as a specified nozzle), and then the printing process proceeds to Step S112.

In step S112, the N-value processor 18 performs an N-value process for the CMYK image data acquired in the image data acquiring unit 10, based on the control information generated in the banding prevention processing controller 16, and then the printing process proceeds to Step S114.

In step S114, the print data generator 22 generates print data, based on N-valued image data obtained in the N-value processor 18, and then the printing process proceeds to Step S116.

In step S116, the print data generator 22 outputs the print data generated in Step S114 to the printing unit 24 and then the printing process proceeds to Step S118.

In step S118, the printing unit 24 performs the printing operation, based on the print data generated in the print data generator 22, and then the printing process proceeds to Step S100.

On the other hand, in step S120, the image data acquiring unit 10 converts the acquired image data into the CMYK image data, and then the printing process proceeds to Step S106.

Next, a control information generating process in step S110 will be described with reference to FIG. 6.

Figure 6:
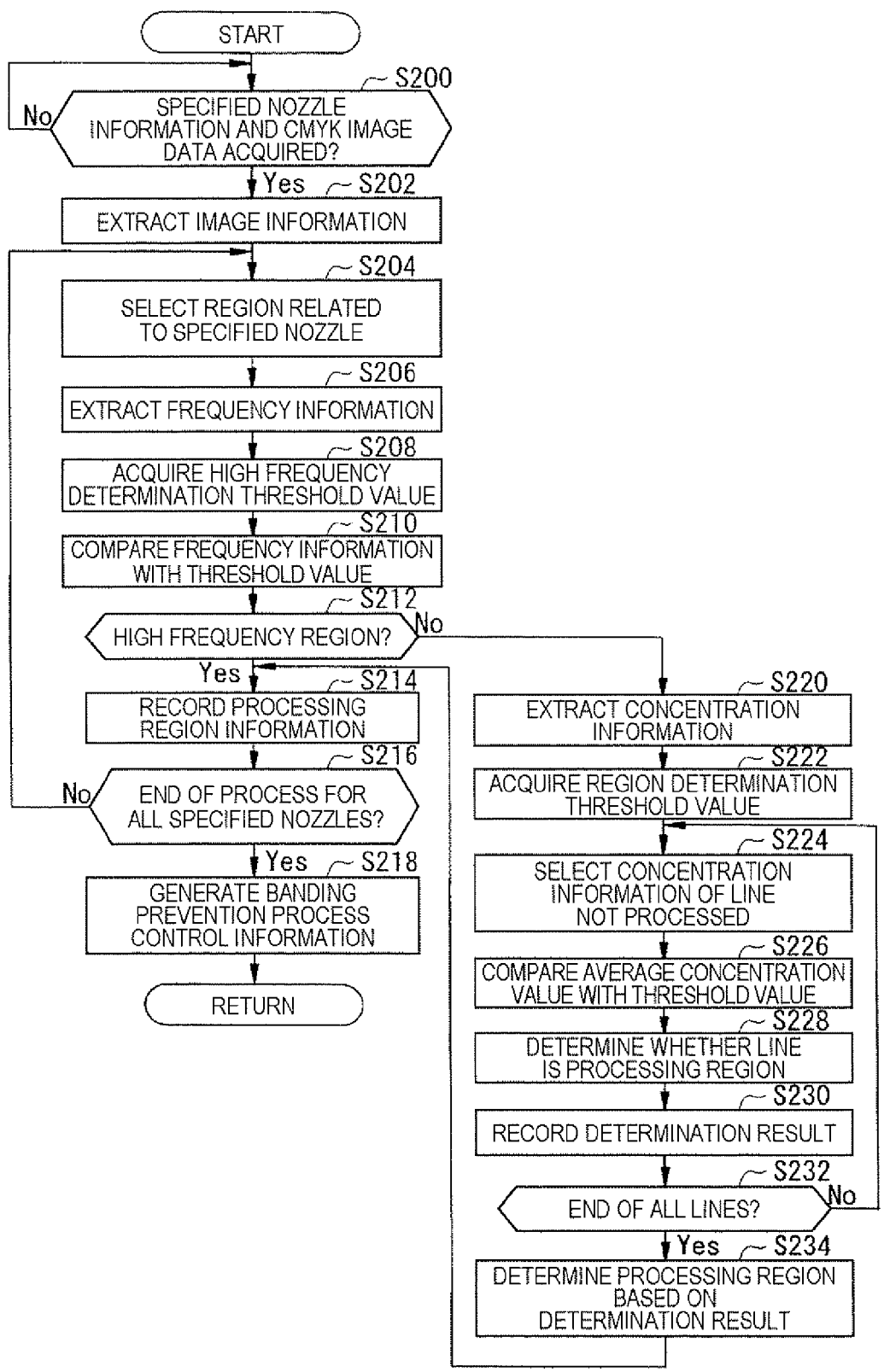
FIG. 6 is a flow chart illustrating a control information generating process in a banding prevention processing controller 16 of the printer 100 according to a first embodiment of the invention.

FIG. 6 is a flow chart illustrating a control information generating process in a banding prevention processing controller 16 of the printer 100 according to the first embodiment of the invention.

The control information generating process is a process of determining a process range of the banding prevention process for the banding generation line for which the nozzle concerned with the banding generation is responsible and generating the control information of the banding prevention process, based on the determined process range. When this process is performed in step S110 of FIG. 5, this process first proceeds to Step S200 as shown in FIG. 6. In this embodiment, the control information generating process is performed for each of image data corresponding to each color ink.

In step S200, the feature extracting unit 16a determines whether or not specified nozzle information and the CMYK image data are acquired. If so (Yes), the control information generating process proceeds to Step S202. Otherwise (No), this determination step S200 is repeated until the specified nozzle information and the CMYK image data are acquired.

In step S202, the feature extracting unit 16a extracts image information from the print information included in the CMYK image data acquired in Step S200, and then the control information generating process proceeds to Step S204.

In step S204, the feature extracting unit 16a selects a region associated with the specified nozzle, based on the specified nozzle information acquired in Step S200 and the image information extracted in Step S202, and then the control information generating process proceeds to Step S206. In this embodiment, the region associated with the specified nozzle is a region of image elements including the banding generation line formed by the specified nozzle, and, in some cases, a plurality of elements may be selected for one specified nozzle.

In step S206, the feature extracting unit 16a extracts frequency information, as image feature information for each line for which each nozzle is responsible, from the region selected in Step S204, and then the control information generating process proceeds to Step S208.

In step S208, the feature extracting unit 16a acquires a high frequency determination threshold value included in the determination information from the determination information storing unit 16c, and then the control information generating process proceeds to Step S210. Here, the high frequency determination threshold value is a threshold value used to determine whether or not a selected region is a high frequency region (having high variation of pixel values). The high frequency determination threshold value is varied depending on the content (kind) of frequency information.

In step S210, the feature extracting unit 16a compares the frequency information extracted in Step S206 with the high frequency determination threshold value acquired in Step S208, and then the control information generating process proceeds to Step S212.

In step S212, the feature extracting unit 16a determines whether or not the region selected in Step S204 is the high frequency region, based on a result of the comparison in step S210. If so (Yes), the feature extracting unit 16a transfers information indicating that the region selected in Step S204 is the high frequency to the control information generator 16b, and then the control information generating process proceeds to Step S214. Otherwise (No), the control information generating process proceeds to Step S220.

In step S214, the control information generator 16b records information indicating that the region selected in Step S204 is out of a process range of the banding determination process, or information of a process range determined in Step S234 in a predetermined area of the secondary storage 70, and then the control information generating process proceeds to Step S216.

In step S216, the control information generator 16b determines whether or not the determination process of the process range for all specified nozzles is ended. If so (Yes), the control information generating process proceeds to Step S218. Otherwise (No), the control information generating process proceeds to Step S204.

In step S218, the control information generator 16b generates the control information, based on information on the processing region recorded in the secondary storage 70 and transfers the generated control information, along with the CMYK image data, to the N-value processor. Then, a series of processes is ended and the control information generating process returns to an original process.

On the other hand, in step S220, the feature extracting unit 16a extracts density information, as image feature information for each line for which each nozzle is responsible, from the region selected in Step S204, and transfers the extracted density information to the control information generator 16b. Then, the control information generating process proceeds to Step S222. Specifically, an average density value for each line is calculated.

In step S222, the control information generator 16b acquires a processing region determination threshold value included in the determination information from the determination information storing unit 16c, and then the control information generating process proceeds to Step S224. Here, the processing region determination threshold value refers to a threshold value used to determine whether or not a differential value of average density values of adjacent lines in the selected region (that is, variation of density values of adjacent lines) falls with an allowable variation range.

In step S224, the control information generator 16b selects density information of a pixel line not processed, from the density information (average density value) extracted in Step S220, and then the control information generating process proceeds to Step S226.

In step S226, the control information generator 16b compares the average density value of the line selected in Step S224 with the processing region determination threshold value acquired in Step S222, and then the control information generating process proceeds to Step S228.

In step S228, the control information generator 16b determines whether or not the line corresponding to the density information is a processing region, based on a result of the comparison in step S214, and then the control information generating process proceeds to Step S230.

In step S230, the control information generator 16b records a result of the determination in step S228 into a predetermined area of the secondary storage 70, and then the control information generating process proceeds to Step S232.

In step S232, the control information generator 16b determines whether or not the record of the process result for all lines of the region selected in Step S204 is ended. If so (Yes), the control information generating process proceeds to Step S234. Otherwise (No), the control information generating process proceeds to Step S224.

In step S234, the control information generator 16b determines a process range of the banding prevention process, based on a result of the determination recorded into a predetermined area of the secondary storage 70, and then the control information generating process proceeds to Step S214.

Next, the N-value of Step 112 process will be described in detail with reference to FIG. 7.

Figure 7:
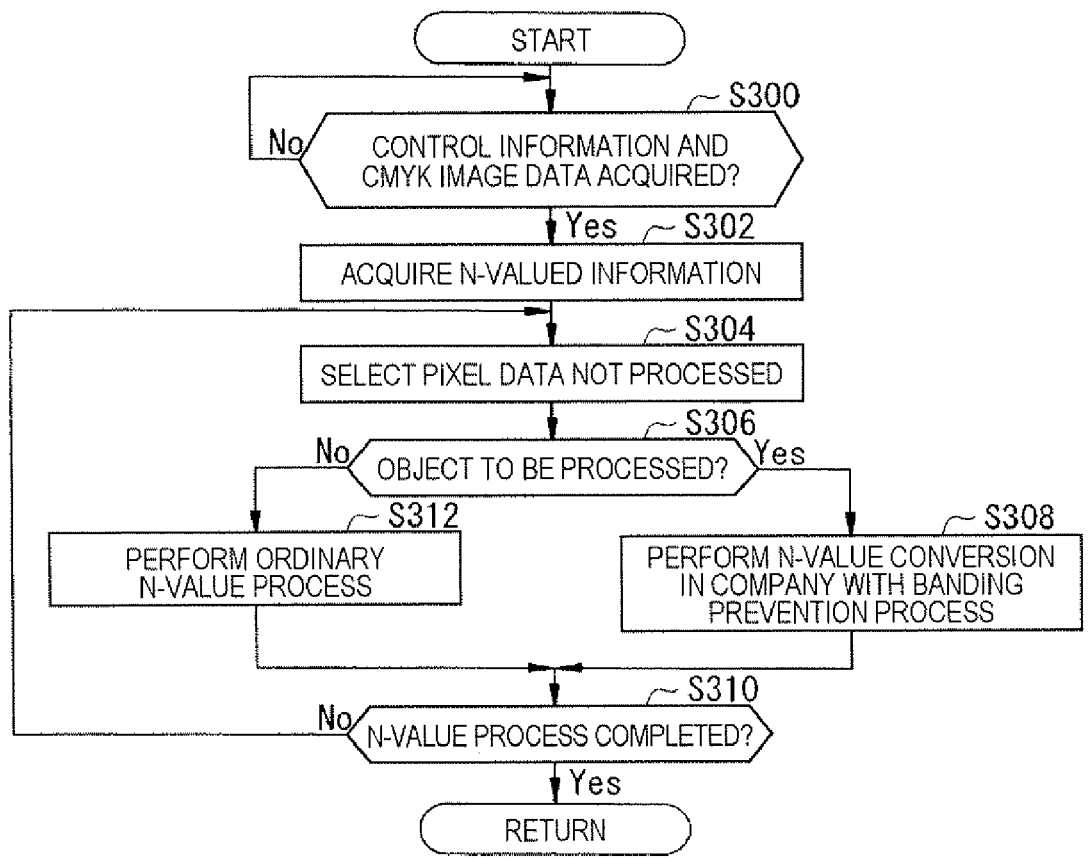
FIG. 7 is a flow chart illustrating an N-value process in an N-value processor 18 of the printer 100 according to the first embodiment of the invention.

FIG. 7 is a flow chart illustrating the N-value process in the N-value processor 18 of the printer 100 according to the first embodiment of the invention.

The N-value process is a process of generating N-valued image data by performing an N-value process accompanied with the banding prevention process for the process range of the banding prevention process and performing an ordinary N-value process for pixel data which are out of the process range, based on the control information generated in the banding prevention processing controller 16. When this process is performed in step S112 of FIG. 5, this process first proceeds to Step S300 as shown in FIG. 7.

In step S300, the N-value processor 18 determines whether or not the control information and the CMYK image data are acquired. If so (Yes), the N-value process proceeds to Step S302. Otherwise (No), the determination process step S300 is repeated until the control information and the CMYK image data are acquired.

In step S302, the N-value processor 18 acquires N-valued information from the N-valued information storing unit 20, and then the N-value process proceeds to Step S304.

In step S304, the N-value processor 18 selects pixel data not processed, from the CMYK image data acquired in Step S300, and then the N-value process proceeds to Step S306.

In step S306, the N-value processor 18 determines whether or not the pixel data selected in Step S304 are to be subjected to the banding prevention process. If so (Yes), the N-value process proceeds to Step S308. Otherwise (No), the N-value process proceeds to Step S312.

In step S308, the N-value processor 18 performs the N value process accompanied with the banding prevention process for the pixel data selected in Step S304, and then the N-value process proceeds to Step S310

In step S310, the N-value processor 18 determines whether or not the N-value process for all pixel data of the CMYK image data is completed. If so (Yes), a series of processes is ended and the N-value process returns to an original process. Otherwise (No), the N-value process proceeds to Step S304.

On the other hand, in step S312, the N-value processor 18 performs an ordinary N-value process for the pixel data selected in Step S304, and then the N-value process proceeds to Step S310.

Next, an operation of the printer according to the first embodiment of the invention will be described with reference to FIGS. 8 to 16.

Figure 8A:
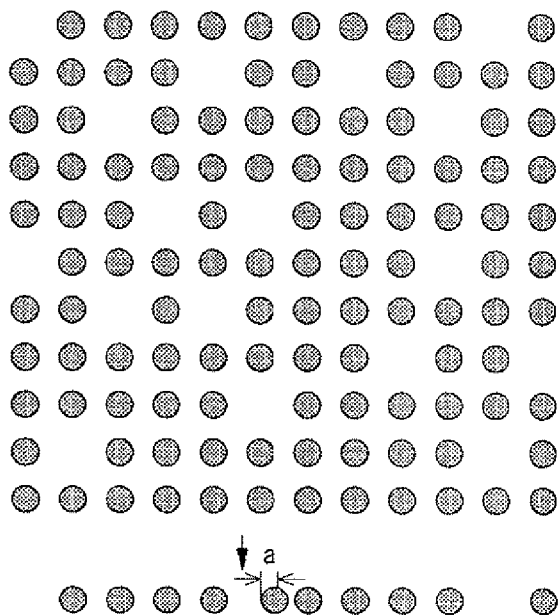
FIG. 8A is a view showing an example of a dot pattern formed by only a black nozzle module 50 without an abnormal nozzle generating a so-called flying deflection.
Figure 8B:
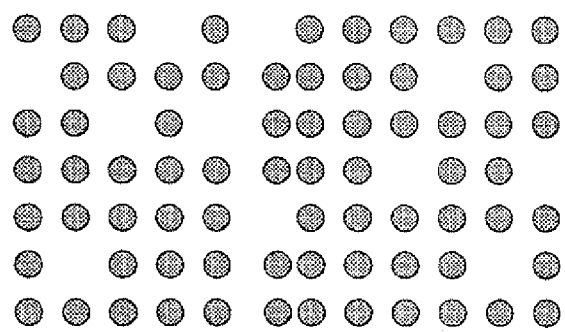
FIG. 8B is a view showing an example of a dot pattern formed when a nozzle N6 of the black nozzle module 50 generates the flying deflection.
Figure 8C:
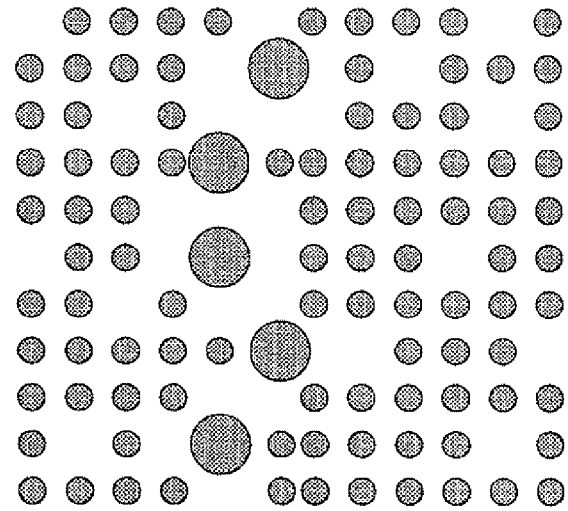
FIG. 8C is a view showing an example of a dot pattern which is subjected to a banding prevention process.
Figure 9A:
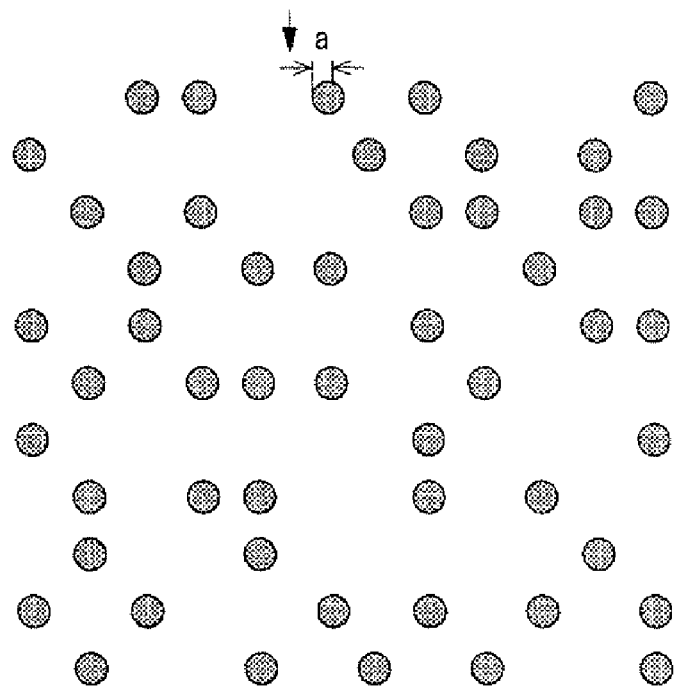
FIG. 9A is a view showing an example of a dot pattern having low print density and formed when a nozzle N6 generates the flying deflection.
Figure 9B:
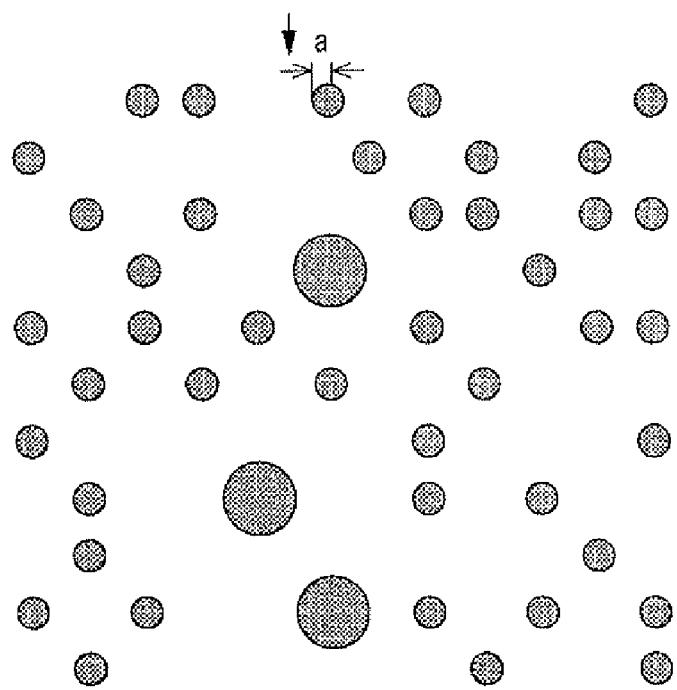
FIG. 9B is a view showing an example in which the dot pattern of FIG. 9A is subjected to a banding prevention process.
Figure 10:
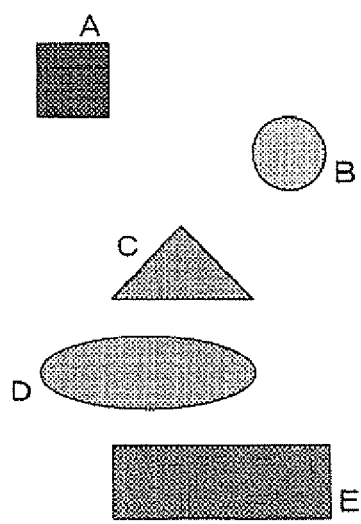
FIG. 10 is a view showing an example of elements forming an image.
Figure 11:
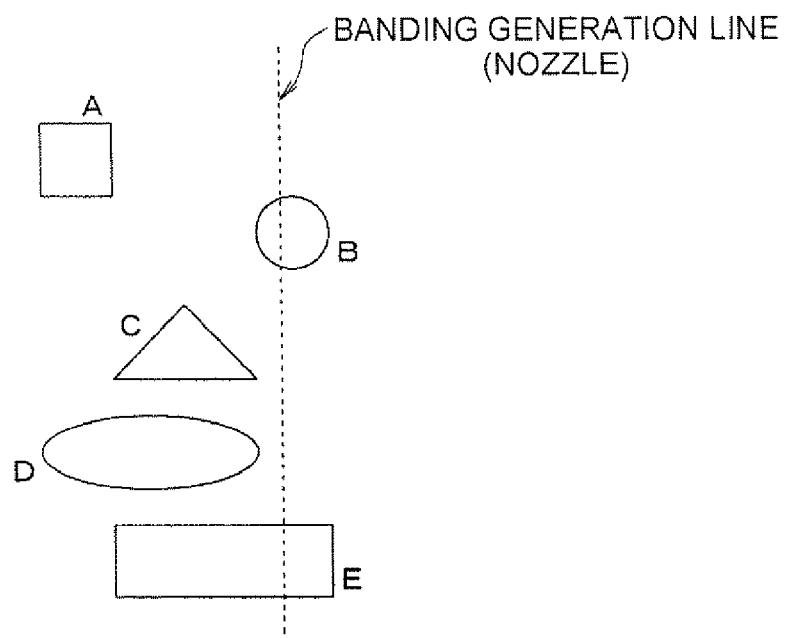
FIG. 11 is a view showing an example of a region associated with a banding generating line and a particular nozzle.
Figures 12A, 12B:
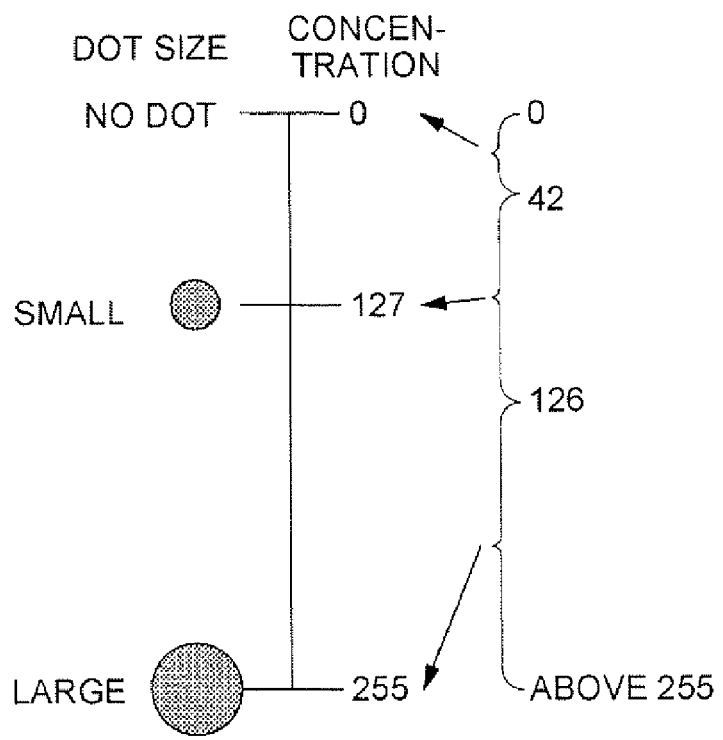
FIG. 12A is a view showing an example of information on N values and information on a threshold value of the N values for a dot size.
FIG. 12B is a view showing an example of an error diffusion matrix used for the N-value process.
Figure 13A:
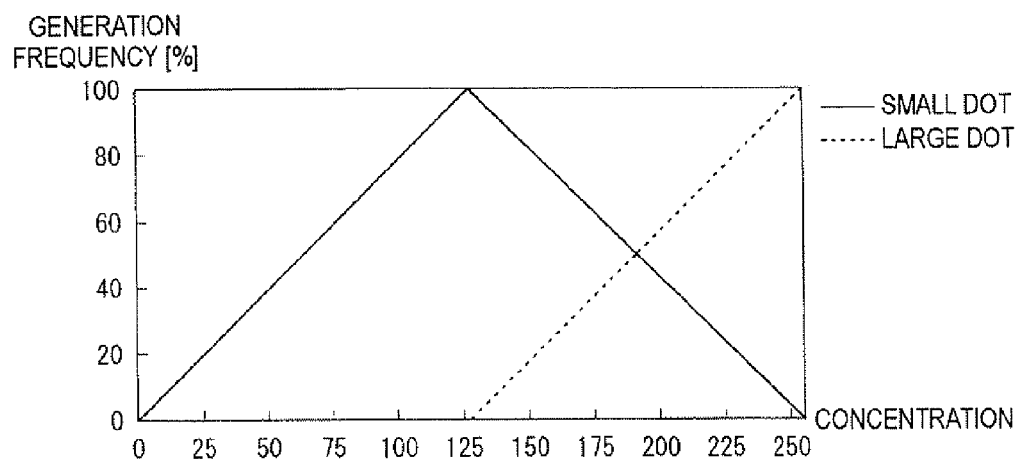
FIG. 13A is a view showing an example of a dot generation ratio table used for a normal N-value process.
Figure 13B:
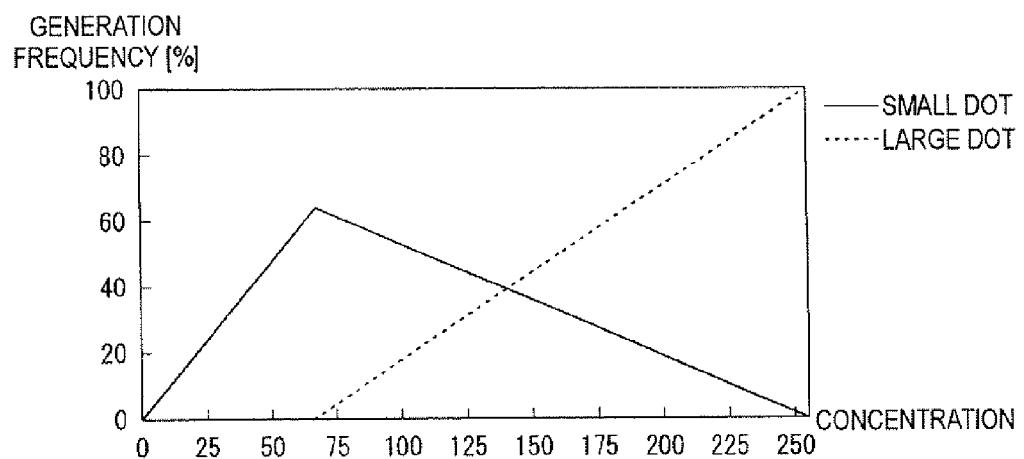
FIG. 13B is a view showing an example of a dot generation ratio table used for the N-value process accompanied with the N-value process.
Figure 14A:
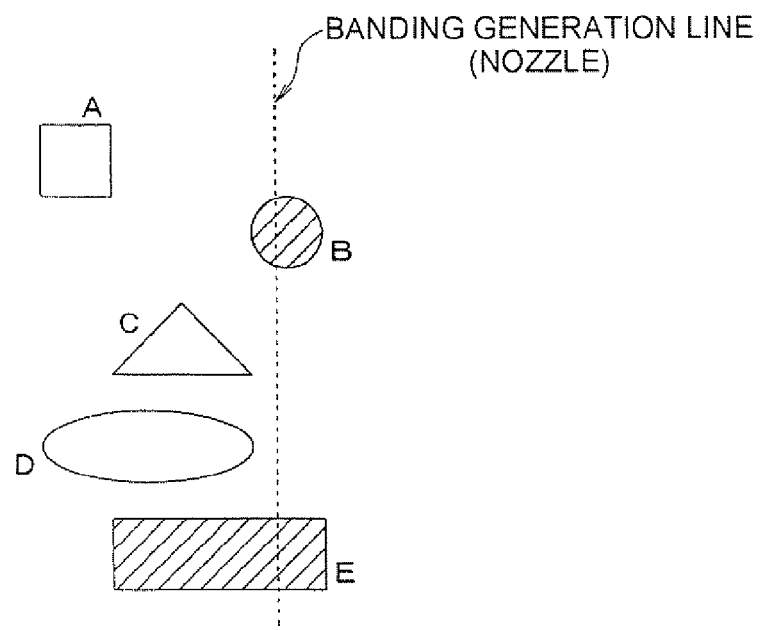
FIGS. 14A and 14B are views showing an example of a range of banding prevention process.
Figure 14B:
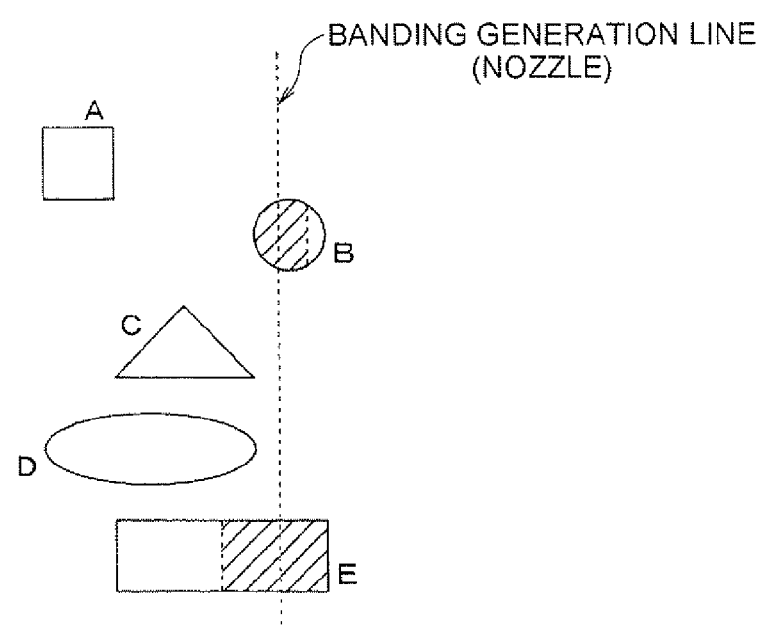
Figure 15:
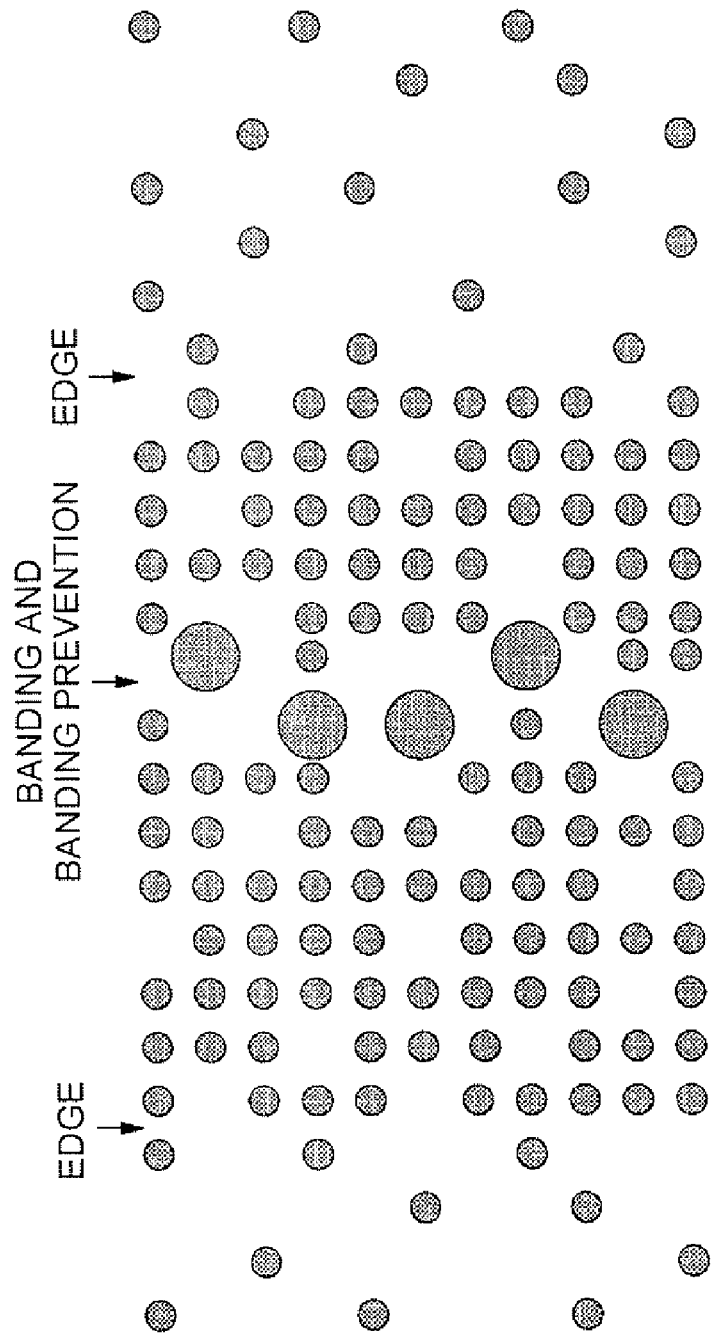
FIG. 15 is a view showing an example of a dot pattern in which only a banding generation line is subjected to the banding prevention process.
Figure 16:
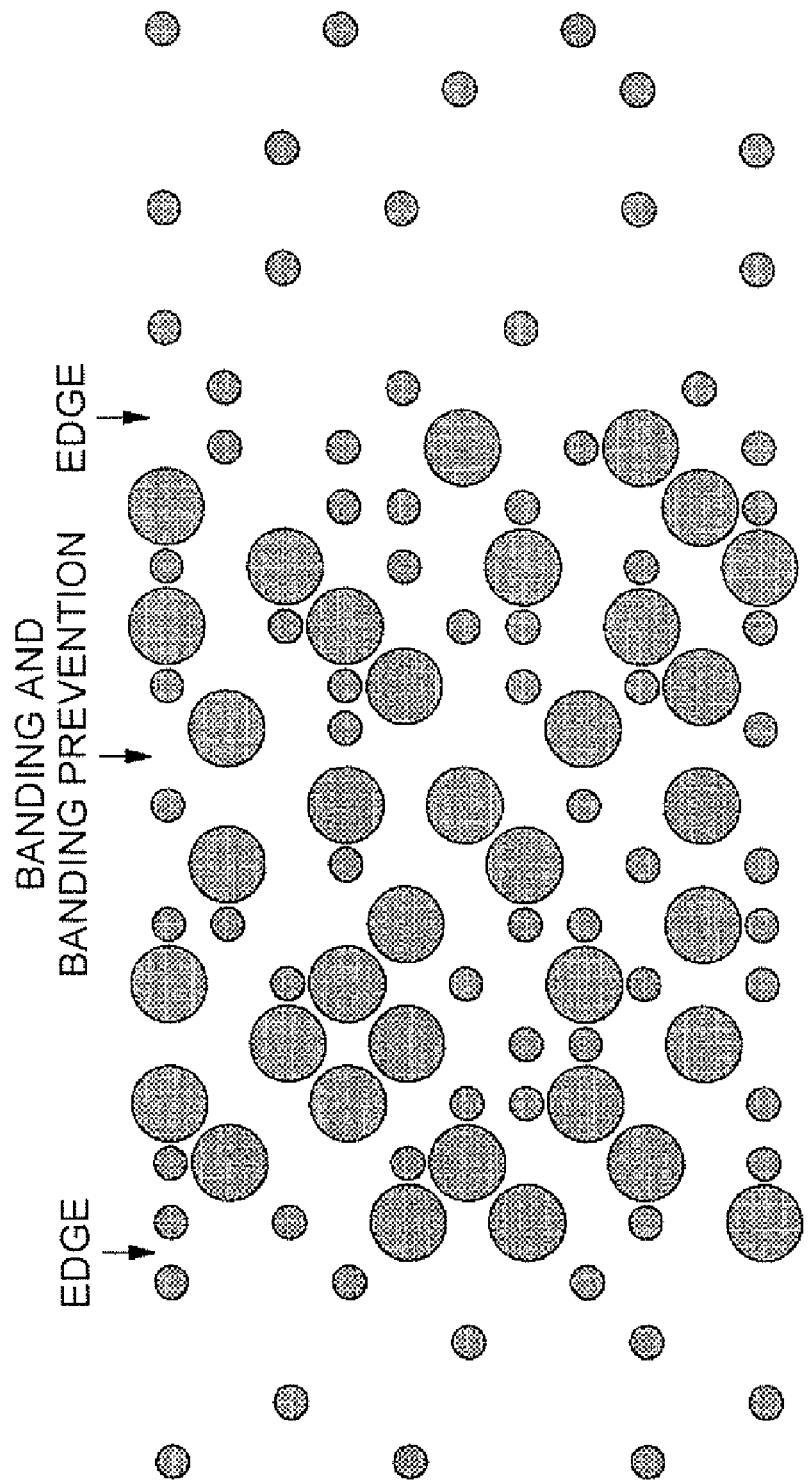
FIG. 16 is a view showing an example of a dot pattern in which a processing region selected using the method of the first embodiment of the invention is subjected to the banding prevention process.

FIG. 8A is a view showing an example of a dot pattern formed by only the black nozzle module 50 without an abnormal nozzle generating a so-called flying deflection, FIG. 8B is a view showing an example of a dot pattern formed when the nozzle N6 of the black nozzle module 50 generates the flying deflection, and FIG. 8C is a view showing an example of a dot pattern which is subjected to the banding prevention process. FIG. 9A is a view showing an example of a dot pattern having low print density and formed when the nozzle N6 generates the flying deflection, and FIG. 9B is a view showing an example in which the dot pattern of FIG. 9A is subjected to the banding prevention process. FIG. 10 is a view showing an example of elements forming an image. FIG. 11 is a view showing an example of a region associated with a banding generating line and a particular nozzle. FIG. 12A is a view showing an example of information on N values and information on a threshold value of the n values for a dot size, and FIG. 12B is a view showing an example of an error diffusion matrix used for the N-value process. FIG. 13A is a view showing an example of a dot generation ratio table used for the normal N-value process, and FIG. 13B is a view showing an example of a dot generation ratio table used for the N-value process accompanied with the N-value process. FIGS. 14A and 14B are views showing an example of a range of banding prevention process. FIG. 15 is a view showing an example of a dot pattern in which only a banding generation line is subjected to the banding prevention process. FIG. 16 is a view showing an example of a dot pattern in which a processing region selected using the method of the first embodiment of the invention is subjected to the banding prevention process.

As shown in FIG. 8A, a dot pattern formed by the black nozzle module 50 without an abnormal nozzle generating the flying deflection does not have a banding effect occurring due to deflection of nozzle intervals, such as a white stripe or a thick stripe, as described above.

On the other hand, as shown in FIG. 8B, a dot pattern formed by the black nozzle module 50 including an abnormal nozzle N6 generating the flying deflection is deflected by a distance a from a dot pattern formed by a normal nozzle N7 on the right side of the abnormal nozzle N6, and as a result, a white stripe occurs between the dot pattern formed by the nozzle N6 and the dot pattern formed by a nozzle N5 on the left side of the nozzle N6.

The white stripe, which is a so-called overcoat print, is conspicuous in a combination of extremely different densitys, such as a combination of white print paper and black ink, thereby extremely deteriorating print quality.

On the other hand, when the nozzle modules 52, 54 and 56 corresponding to different colors, other than the black nozzle module 50, are used, as the nozzle N6 is deflected by a distance a by the flying deflection, as described above, the nozzle N6 becomes close to the nozzle N7 on the right side of the nozzle N6 by the distance a. Accordingly, dots formed by the nozzles becomes denser (in some case, dots overlap with each other), which results in a conspicuous thick stripe, thereby extremely deteriorating print quality.

Accordingly, it is preferable to perform the banding prevention process in which the N-value process (data conversion) is performed to change or thin out dots formed by not only the nozzle concerned with the flying deflection, that is, the abnormal nozzle N6, but also the adjacent nozzles (for example, the nozzles N5 and N7), so that large dots are formed in the white stripe portion, thereby making the white stripe extinct or inconspicuous, and the corrected portion is prevented from being conspicuous by making an area gray scale of the corrected portion comply with an area gray scale of other normal portions, as shown in FIG. 8C.

However, since dots are sparsely formed in places having low print density (density), as shown in FIG. 9A, if the banding prevention process is partially performed for such places, as shown in FIG. 8C, large dots are sparsely formed, and small dots in the vicinity of the large dots become small or are thinned out, which results in deterioration of granularity and hence deterioration of image quality as shown in FIG. 9B.

Therefore, in this embodiment, the printer 100 specifies a nozzle concerned with the banding, based on nozzle characteristic information, and selects a region of elements associated with the specified nozzle, based on information on a line formed by the specified nozzle and image information generated by a printer driver. Next, the printer 100 extracts frequency information of the selected region, compares the extracted frequency information with a high frequency determination threshold value, and determines whether or not the selected region is a high frequency region, based on a result of the comparison. If it is determined that the selected region is the high frequency region, the selected region is assumed to be a region that need not to be subjected to the banding prevention process.

If it is determined that the selected region is not the high frequency region, the printer 100 extracts density information of each line of the selected region, compares the extracted density information with a processing region determination threshold value, determines whether or not the banding prevention process is performed for each line, based on a result of the comparison, and decides a processing region of the banding prevention process, based on a result of the determination.

In addition, for image data, the printer 100 generates N-valued image data by performing an N-value process accompanied with the banding prevention process for pixel data corresponding to the processing region and performing an ordinary N-value process for pixel data corresponding to other regions, and generates print data by use of which the banding prevention process is performed for a region whose line density range falls within a predetermined range, of regions of elements specified from the image information, based on the generated N-valued image data.

First, for example, when the image data acquiring unit 10 of the printer 100 receives image data having RGB color information corresponding to print instruction information from a print instruction information source, for example, an external device (Step S102), the image data acquiring unit 10 generates CMYK image data by color-converting the color information (RGB) of the acquired image data into CMYK and transfers the generated CMYK image data to the nozzle specifying unit 12 (Step S120). In this embodiment, the image data received from the external device includes print information generated by a printer driver.

When the nozzle specifying unit 12 acquires the CMYK image data from the image data acquiring unit 10, the nozzle specifying unit 12 reads nozzle characteristic information from the nozzle characteristic information storing unit 14 (Step S106) and specifies a nozzle concerned with banding generation, based on the read nozzle characteristic information (Step S108). For example, when the nozzle characteristic information includes information on relative flying deflection, information on ink discharge non-discharge of nozzle and information on density smear of nozzle, a nozzle having relative flying deflection of more than a predetermined threshold value, a nozzle that can not discharge ink, and a nozzle that causes the density smear are specified as the nozzle concerned with banding generation.

The nozzle specifying unit 12 transfers information on the nozzle specified as the nozzle concerned with banding generation and the CMYK image data to the banding prevention processing controller 16.

When the banding prevention processing controller 16 acquires the information on the specified nozzle and the CMYK image data from the nozzle specifying unit 12, it performs a control information generation process (Step S110).

In the banding prevention processing controller that performs the control information generating process, first, the feature extracting unit 16a extracts image information from the print information included in the CMYK image data (Step S202) and selects a region associated with the specified nozzle, based on the extracted image information and information on the specified nozzle (Step S204). For example, the image information includes shape information (triangle, circle, quadrangle, etc.) and coordinate information of elements constituting an image. For example, an image of the image data acquired in the image data acquiring unit 10 may be constituted by five elements, that is, a square A, a circle B, a triangle C, an ellipse D and a rectangle E, as shown in FIG. 10. In the image shown in FIG. 10, for example, if a line formed by the specified nozzle is located as shown in FIG. 11, since the coordinate information and the shape information of the square A, the circle B, the triangle C, the ellipse D and the rectangle E can be known from the image information, elements overlapping the line formed by the specified nozzle can be selected as the region associated with the specified nozzle. FIG. 11 shows that regions of the circle B and the rectangle E are selected as the region associated with the specified nozzle.

When the region associated with the specified nozzle is selected, the feature extracting unit 16a extracts frequency information from the image data forming the selected region (the circle B and the rectangle E) (Step S206). Next, the feature extracting unit 16a reads a high frequency determination threshold value included in determination information from the determination information storing unit 16c (Step S208) and compares the read high frequency determination threshold value with the extracted frequency information (Step S210). Next, the feature extracting unit 16a determines whether or not the selected region is a high frequency region, based on a result of the comparison (Step S212). For example, the selected region is filtered using a high pass filter (HPF) and a filtering output value is compared with the high frequency determination threshold value. If the selected region includes much high frequency components, this region is determined to be the high frequency region. If the selected region is the high frequency region (Yes in Step S212), the selected region is excluded from a process range of the banding prevention process. That is, the feature extracting unit 16a transfers processing region information indicating that the selected region is out of the process range to the control information generator 16b, and the control information generator 16b stores the processing region information in a predetermined area of the secondary storage 70 (Step S214).

On the other hand, it is determined that the selected region is not the high frequency region (No in Step S212), the feature extracting unit 16a extracts density information for each line formed by each nozzle in the selected region and transfers the extracted density information to the control information generator 16b (Step S220). Here, a mean value of density values for each line is calculated and taken as the density information.

When the control information generator 16b acquires the density information and the information of the selected region from the feature extracting unit 16a, the control information generator 16b reads a region determination threshold value included in the determination information from the determination information storing unit 16c (Step S222). For example, assuming that a differential value of the average density value includes a region determination threshold value whose allowable variation range is −30 to +30 (being varied depending on ink color), an allowable variation range of the density differential value becomes $-30 \leq x \leq +30$. Here, x is a differential value of the average density value of adjacent lines. That is, if the differential value x is less than −31 and more than +30, it is out of the allowable variation range.

Upon acquiring the region determination threshold value, the control information generator 16b selects a line not processed, from the region of the circle B and rectangle E selected as the region associated with the specified nozzle (in this embodiments also selects a processed line adjacent to the line not processed) (Step S224) and compares a differential value of the average density value of the selected line with the acquired region determination threshold value (Step S226). The control information generator 16b determines a line whose differential value of the average density value falls within the allowable variation range ($-30 \leq x \leq +30$) to be a line of the processing region, based on a result of the comparison (Step S228), and stores a result of the determination in a predetermined area of the secondary storage 70 (Step S230). These comparison, determination and storing processes are performed for all lines of elements associated with the specified nozzle. When these processes are ended (Yes in Step S232), a processing region of the banding prevention process is decided based on the determination result for all lines of regions of elements, which is stored in the secondary storage 70 (Step S234). Here, a region that is constituted by the banding generation line and different lines which are lined up in a direction perpendicular to the banding generation line and have an average density value falling within the allowable variation range are determined to be the processing region. Information of the determined processing region is stored in a predetermined area of the secondary storage 70 (Step S214).

When the determination process of the processing region of the banding prevention process is ended for regions of elements corresponding to all nozzles (Yes in Step S216), the control information generator 16b generates control information of the banding prevention process, based on the processing region information stored in the secondary storage 70 (Step S218). Specifically, the control information includes information used to perform an N-value process accompanied with the banding prevention process for the processing region of the banding prevention process and perform an ordinary N-value process for other regions in the acquired image data. When the control information is generated in this manner, the banding prevention processing controller 16 transfers the CMYK image data and the control information to the N-value processor 18.

Upon acquiring the CMYK image data and the control information from the banding prevention processing controller 16 (Step S300), the N-value processor 18 reads N-valued information used to perform the ordinary N-value process and N-valued information used to perform the N-value process accompanied with the banding prevention process from the N-valued information storing unit 20 (Step S302). Next, the N-value processor 18 selects pixel data not processed, from the CMYK image data (Step S304). Based on the acquired CMYK image data and the control information, the N-value processor 18 performs the ordinary N-value process (Step S312) if the selected pixel data are not a process object of the banding prevention process (No in Step S306) and performs the N-value process accompanied with the banding prevention process (Step S308) if the selected pixel data are not the process object of the banding prevention process (Yes in Step S306).

In this embodiment, if an original pixel value (density value or luminance value) of selected pixel data is a 8 bit value, that is, a 256 gray scale, and the pixel value is the density value, the N-value process is performed as shown in FIGS. 12A and 12B, for example. That is, if the original pixel value is 0 to 42, the pixel value is arranged to be "0" and the N value is taken as "0" (forming no dot); if the original pixel value is 42 to 126, the pixel value is arranged to be "84" and the N value is taken as "1" (forming dots) for small dots or large dots based on a dot generation ratio table, which will be described later; and if the original pixel value is 126 to 255 (or above 255), the pixel value is arranged to be "255" and the N value is taken as "1" for small dots or large dots based on the dot generation ratio table. In addition, when a relatively high density value is represented by small dots, a plurality of small dots representing the value may be taken as "1."

When the N-value processor 18 performs the N-value process for the selected pixel data, the N-value processor 18 calculates a difference (error) between a density value before the N-value process of the selected pixel data and a density value corresponding to each dot size after the N-value process of the selected pixel data and performs an error diffusion process of diffusing the calculated error to adjacent pixels that are not subjected to the N-value process, based on an error diffusion matrix shown in FIG. 12B.

In a conventional error diffusion process, in case of a binarization process, if an object pixel to be processed can be expressed by 8 bits (256 gray scales) and has a 101 gray scale, since the 101 gray scale does not satisfy a threshold value (middle value) of 128 in an ordinary binarization, this pixel is treated as a pixel having "0" (forming no dot) and the 101 gray scale is disregarded. On the contrary, in the error diffusion process according to the embodiment of the invention, since the 101 gray scale is diffused to adjacent pixels not processed, according to the error diffusion matrix, for example, a pixel on the right side of a selected pixel receives an error of the selected pixel and accordingly its density value exceeds the threshold value, thereby being treated as forming a dot and accordingly making it possible to obtain binary data closer to original image data, although, by only the ordinary binarization process, the pixel is treated as not forming a dot since the pixel does not satisfy the threshold value, like the selected pixel.

In addition, in this embodiment, for the ordinary N-value process, a generation frequency of small dots and large dots adjusts a generation ratio of the small dots to the large dots, based on a dot generation ratio table (a table in which information on a generation frequency of the small dots and the large dots for each density value is registered) shown in FIG. 13A. Here, the dot generation ratio table shown in FIG. 13A is a table set to increase the generation frequency of the small dots for a medium tone region in order to use the small dot as possible. By doing so, since the small dots are much used for a density value of the medium tone, granularity of a group of dots in a conspicuous medium tone region is improved, thereby improving print quality.

The above example shows that density is used as a pixel value. In case where luminance is used as the pixel value, dots of different sizes have values reverse to the density.

In this embodiment, data of gray scale direction of an image for each color of CMYK are converted into the gray scale direction and an area gray scale by the N-value process in compliance with the performance of an ink discharge mechanism. As shown in FIG. 12A, if print by two kinds of formation sizes of dots is possible as the performance of the ink discharge mechanism, it is possible to make a three-gray scale representation for each ink, including no dot formation. That is, a full gray scale is reproduced in combination of the three-gray scale and the area gray scale. In addition, in case where a dot size is limited to one kind, a full gray scale is reproduced by a two-gray scale and an area gray scale.

In addition, when a piezo actuator is used in the print head, it is possible to easily control the dot size by varying a voltage applied to the piezo actuator to control the discharge amount of ink.

In this embodiment, the N-value process accompanied with the banding prevention process adjusts a generation ratio of small dots and large dots, on the basis of a dot generation ratio table (a table in which information on generation frequencies of the small dots and the large dots for each density value is registered) shown in FIG. 13B.

Here, in the dot generation ratio table shown in FIG. 13B, the generation frequency of the large dots is set next to the density of about 70 and the generation frequency of the large dots is set to be equal to or greater than the generation frequency of the small dots next to the density of about 140, so as to greatly use the large dots for a relatively low-density region (particularly, a medium tone region). Next to the density of 140, as the density increases more and more, the generation frequency of the large dots increases ("100%" in the density of about 255) and the generation frequency of the small dots decreases ("0%" in the density of about 255). In this way, since the large dots are much included in the lines adjacent to the line in which the dots cannot be formed due to the non-discharge of the ink, it is possible to make invisible the banding resulting from the non-discharge of the ink. In addition, since the large dots are greatly included in the banding generation line and the adjacent lines, it is possible to make invisible the banding (such as a white line) resulting from the flying deflection.

Accordingly, the selected pixel data other than the processing region of the banding prevention process is subjected to the N-value process using the dot generation ratio table shown in FIG. 13A and the selected pixel data included in the processing region of the banding prevention process is subjected to the N-value process using the dot generation ratio table shown in FIG. 13B. That is, the pixel data in which the variation in density value in the constituent region including the banding generation line belongs to an allowable range is subjected to the N-value process using the dot generation ratio table for greatly forming the large dots, which is shown in FIG. 13B.

For example, when the entire lines of the elements corresponding to a specific nozzle belongs to the allowable range, as shown in FIG. 14A, the pixel data of the entire lines are subjected to the N-value process (accompanied with the banding prevention process) using the dot generation ratio table shown in FIG. 13B and the pixel data of the other regions are subjected to the (normal) N-value process using the dot generation ratio table shown in FIG. 13A. On the other hand, as shown in FIG. 14B, when a part of the elements belongs to the allowable range, the pixel data constituting the partial lines are subjected to the N-value process (accompanied with the banding prevention process) using the dot generation ratio table shown in FIG. 13B.

In this way, when all the pixel data of the CMYK image data are subjected to the N-value process to generate the N-valued image data (the branch of "Yes" in step S310), the N-value processor 18 transmits the N-valued image data to the print data generator 22.

When acquiring the N-valued image data from the N-value processor 18, the print data generator 22 converts the N-valued image data into a data format which can be analyzed by the printing unit 24 to generate the print data (step S114) and outputs the generated print data to the printing unit 24 (step S116).

When acquiring the print data from the print data generator 22, the printing unit 24 forms (prints) dots on a medium used for printing by the use of the print head 200 on the basis of the print data (step S118).

In the dot pattern formed on the medium by the printer 100 according to this embodiment, the banding prevent process is not performed to only the banding generation positions as shown in FIG. 15, but is performed to the banding generation line and the lines vertically successive to and adjacent to the banding generation line as shown in FIG. 16. Accordingly, it is possible to prevent or reduce the deterioration in print quality due to the banding prevention process.

That is, in the example shown in FIG. 15, the bandings such as a white line and a black line are prevented by adding the large dots only to the banding generation line, but the banding prevention line is different from the other regions due to the non-uniform dot sizes in the banding prevention line. Accordingly, the deterioration in print quality (banding) seems to occur due to the local difference in dot size.

On the other hand, in the example shown in FIG. 16 as the print result of the printer 100 according to this embodiment, the entire regions (after the banding generation line and right before a different line of which the density abruptly varies) including the banding generation line and the lines which are vertically successive to the banding generation line and in which the variation in density in the adjacent lines is in a predetermined range are subjected to the banding prevention process. Accordingly, the large dots entirely increase in the range not being local but having the same density or substantially the same density, or in the range in which the variation in density is slow. Therefore, since the granularity is decreased but regions having different dot sizes can be prevented from occurring in only a part (banding generation places) of the regions (including the gradation image) which can be considered as having the same image quality, the local difference in dot size is not generated unlike the example shown in FIG. 15.

In this embodiment, since the process is not performed using the place where the density abruptly varies as a boundary, but the partition of the regions due to the variation in density occurs, the problem such as deterioration in image quality due thereto does not occur.

In the printer 100 according to this embodiment, when the selected region is a high frequency region (region having such a density that the banding as invisible without performing the banding prevention process), the selected region is not subjected to the banding prevention process. Accordingly, it is possible to suppress the bad influence on the original print quality due to the banding prevention process as small as possible.

In the first embodiment, the image data acquiring unit 10 corresponds to the image data acquiring unit of Aspect 3 or 47 and the nozzle specifying unit 12 corresponds to the nozzle specifying unit of Aspect 3 or 47. The nozzle characteristic information storing unit 14 corresponds to the nozzle characteristic information storing unit of Aspect 3 or 47 and the control information generating process of the banding prevention process performed by the banding prevention processing controller 16 and the N-value process performed by the N-value processor 18 and the N-value information storing unit 20 based on the control information correspond to the banding prevention process controlling unit of any one of Aspects 3, 5, 6, 9, 11, 47, 49, 50, 53, and 54. The print data generating process performed by the N-value processor 18, the N-value information storing unit 20, and the print data generator 22 corresponds to the print data generating unit of Aspect 4 or 47 and the printing unit 24 corresponds to the printing unit of Aspect 3 or 4.

In the first embodiment, the print information acquiring process performed by the image data acquiring unit 10 corresponds to the print information acquiring unit of Aspect 11 or 54 and the frequency information extracting process performed by the feature extraction unit 16a corresponds to the frequency information extracting unit of Aspect 9 or 52.

In the first embodiment, steps S100 to S104 and step S120 correspond to the acquiring of the image data of any one of Aspects 19, 33, 60, and 73 and steps S106 and S108 correspond to the specifying of the nozzle of any one of Aspects 19, 33, 60, and 73. Steps S110 and S112 correspond to the controlling of the banding prevention process of any one of Aspects 19, 23, 24, 25, 27, 33, 37, 38, 39, 41, 60, 63, 64, 65, 67, 73, 76, 77, 78, and 80. Steps S112 to S116 correspond to the generating of the print data of any one of Aspects 20, 34, 60, and 73 and step S118 corresponds to the printing of Aspect 19 or 33.

In the first embodiment, step S206 corresponds to the extracting of the frequency information of any one of Aspects 25, 39, 65, and 78.

Second Embodiment

Next, a second embodiment of the invention will be described with reference to the drawings. FIGS. 17 to 25 are views illustrating a printer, a printer control program, a printer control method, a print data generating device, a print data generating program, and a print data generating method according to the second embodiment of the invention.

The printer and the computer system according to the second embodiment are equal to those according to the first embodiment shown in FIGS. 1 and 2. In the second embodiment, the control information generating process of the first embodiment shown in FIG. 6 is replaced with that shown in FIG. 17.

The second embodiment is different from the first embodiment, in that edge information of an image is extracted from the CMYK image data to determine candidate processing regions on the basis of the edge information and density information is extracted from the candidate processing regions to determine a processing region on the basis of the extracted density information and in that the lines of the processing region to be subjected to the banding prevention process is subjected to the banding prevention process using the processing amount corresponding to a distance from the banding generation line. That is, in this embodiment, an image portion of which the density abruptly varies is determined from the edge information to determine the target range of the processing region, it is judged on the basis of the density the candidate processing regions whether the banding prevention process should be performed to the regions, and then the processing region determined as not being subjected to the banding prevention process is not subjected to the banding prevention process even when the banding is generated therein. In the following description, only elements different from those of the first embodiment are described and description of the same elements as being described in the first embodiment will be omitted.

The feature extraction unit 16a has a function of extracting an image feature indicating an image feature constructed by the CMYK image data from the CMYK image data acquired by the image data acquiring unit 10. Specifically, the CMYK image data are first subjected to a filtering process by the known edge extraction filter and the edge amount of the image data are extracted as the image feature. The place (edge portion) in which the density abruptly varies in the image is analyzed on the basis of the extracted edge amount and the edge determination threshold value and the image region to be processed associated with a specific nozzle is determined on the basis of the analysis result. That is, in the image such as a photograph image in which the elements cannot be distinguished from the image information generated by the printer driver, the place (edge portion) in which the elements and the density abruptly vary is determined from the edge information thereof. In this embodiment, image regions having the determined edge portion as a boundary and including the banding generation line are determined as candidate processing regions. Next, features associated with the density values (or brightness values) of the candidate processing regions are extracted for each color constituting the candidate processing regions. In this embodiment, the image features and the information on the candidate processing regions are transmitted to the control information generator 16b.

The control information generator 16b judges whether the candidate processing regions should be subjected to the banding prevention process on the basis of the image features and the information on the candidate processing regions from the feature extraction unit 16a and the determination information stored in the determination information storing unit 16c and generates the control information on the basis of the determination result. Specifically, for each ink color included in the determination information, a predetermined density control threshold value is compared with an average density value of the candidate processing regions. When the average density value is equal to or less than the density control threshold value, the control information indicating that the corresponding candidate processing region should not be subjected to the banding prevention process is generated. On the other hand, when the average density value is larger than the density control threshold value, the control information indicating that the corresponding candidate processing region should be subjected to the banding prevention process is generated. Hereinafter, the candidate processing region which should be subjected to the banding prevention process is referred to as a processing region.

The control information generator 16b generates the control information indicating that the processing amount of the banding prevention process should be reduced as the distance from the banding generation line becomes larger among the lines adjacent to the banding generation line in the processing region. That is, in the N-value process accompanied with the banding prevention process of the N-value processor 18, the control information indicating that the processing amount of the banding prevention process in the banding generation line (and the lines adjacent thereto) is the largest and the processing amount of the banding prevention process becomes smaller as the distance from the banding generation line becomes larger is generated.

The N-value processor 18 selects predetermined pixel data from the CMYK image data transmitted from the banding prevention processing controller 16 and judges whether the selected pixel data should be subjected to the banding prevention process on the basis of the control information transmitted from the banding prevention processing controller 16. When judging that the banding prevention process should be performed, the N-value processor 18 converts the selected pixel data into the N value through the N-value process accompanied with the banding prevention process on the basis of the N-value information read from the N-value information storing unit 20. In this embodiment, the N-value process accompanied with the banding prevention process is performed on the basis of the information on the designated processing amount in the control information. On the other hand, when judging that the banding prevention process should not be performed, the N-value processor 18 converts the selected pixel data into the N value by using the normal N-value process.

Next, the control information generating process of step S110 in this embodiment will be described in detail with reference to FIG. 17.

Figure 17:
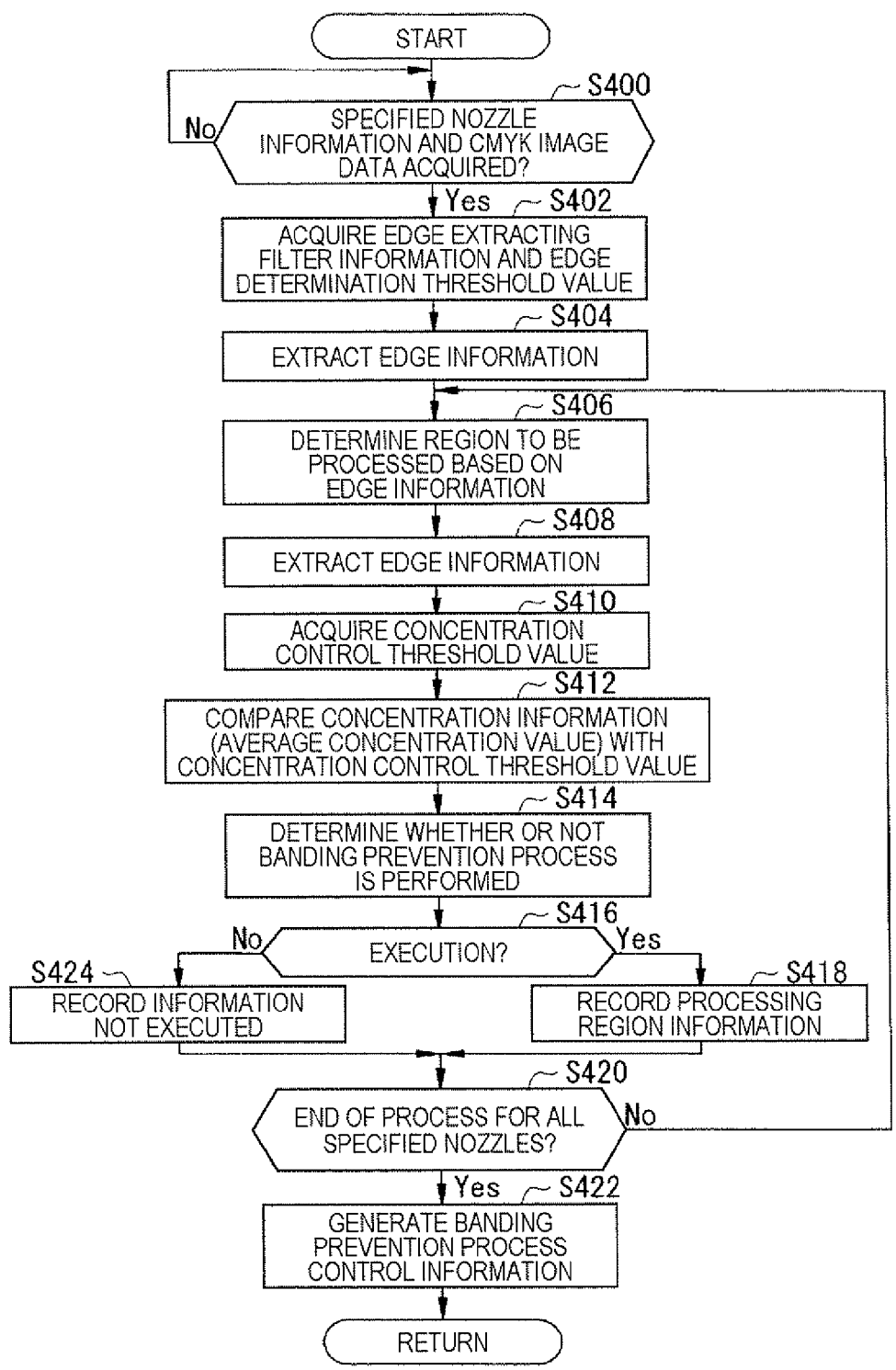
FIG. 17 is a flow chart illustrating a control information generating process in a banding prevention processing controller 16 of the printer 100 according to a second embodiment of the invention.

FIG. 17 is a flow chart illustrating the control information generating process performed by the banding prevention processing controller 16 of the printer 100 according to the second embodiment of the invention.

The control information generating process is a process of determining a candidate processing region associated with a specific nozzle based on the edge information, judging whether the corresponding candidate processing region should be subjected to the banding prevention process on the basis of the density information, and generating the control information indicating that the banding prevention process should be performed to the lines other than the banding generation line when it is judged that the banding prevention process should be performed, on the basis of the processing amount corresponding to the distance from the banding generation line. Such process is performed in step S110, and then the process of step S400 is performed, as shown in FIG. 17. In this embodiment, the control information generating process is performed in each image data corresponding to each ink color.

In step S400, it is judged whether the feature extraction unit 16a acquires the specific nozzle information and the CMYK image data. When it is judged that the feature extraction unit 16a acquires the information and data (Yes), the process of step S402 is performed and when it is not judged that the feature extraction unit 16a does not acquire the information and data (No), the judgment process is repeatedly performed until the feature extraction unit 16a acquires the information and data.

In step S402, the control information generator 16b acquires the edge extraction filter information and the edge determining threshold value included in the determination information from the determination information storing unit 16c and then the process of step S404 is performed. Here, the determination information includes a variety of information such as the edge extraction filter, the edge determining threshold value, the density control threshold value, and information for determining the processing amount of the banding prevention process corresponding to the distance.

In step S404, the feature extraction unit 16a performs the filtering process to the CMYK image data acquired in step S400 on the basis of the edge extraction filter information acquired in step S402 and extracts the edge amount of the respective pixel data. Then the process of step S406 is performed.

In step S406, the feature extraction unit 16a determines the candidate processing regions associated with a specific nozzle on the basis of the specific nozzle information acquired in step S400, the edge amount of the respective pixel data extracted in step S404, and the edge determining threshold value acquired in step S402 and then the process of step S408 is performed. Specifically, the extracted edge amount is compared with the edge determining threshold value and when the edge amount is equal to or greater than the threshold value, the corresponding pixel data is determined as the edge. Then, a region having the edge portion including the banding generation line formed by the specific nozzle as a boundary is set as the candidate processing region associated with the specific nozzle on the basis of the edge portion of the image acquired from the edge information.

In step S408, the feature extraction unit 16a extracts the density information as the image feature information from the candidate processing region determined in step S406 and transmits the extracted density information to the control information generator 16b. Then, the process of step S410 is performed. Specifically, an average density value of the candidate processing region is calculated on the basis of the pixel data of the candidate processing region.

In step S410, the control information generator 16b reads the density control threshold value th of each ink color corresponding to the candidate processing region included in the determination information from the determination information storing unit 16c and then the process of step S412 is performed.

In step S412, the density control threshold value th acquired in step S410 is compared with the density information (average density value) of the candidate processing region extracted in step S408 and then the process of step S414 is performed. In this embodiment, the density control threshold value th varies depending on the ink colors and is set to have a larger value as the density becomes lower.

In step S414, the control information generator 16b judges whether the candidate processing region determined in step S406 should be subjected to the banding prevention process on the basis of the comparison result of step S412 and then the process of step S416 is performed. Specifically, the average density value of the candidate processing region is equal to or less than the density control threshold value th, it is judged that the banding prevention process should not be performed and when the average density value is larger than the density control threshold value th, it is judged that the banding prevention process should be performed.

In step S416, the control information generator 16b performs the process of step S418 when it is judged in step S414 that the candidate processing region determined in step S406 should be subjected to the banding prevention process (Yes) and performs the process of step S424 when it is judged that the banding prevention process should not be performed thereto (No).

In step S418, the control information generator 16b sets the candidate processing region determined in step S406 as the processing region and records the information in a predetermined area of the storage 70. Then, the process of step S420 is performed.

In step S420, the control information generator 16b judges whether the processing region is determined for all the specific nozzles. When it is judged that the determination of the processing region is finished for al the specific nozzles (Yes), the process of step S422 is performed and otherwise (No), the process of step S406 is performed again.

In step S422, the control information generator 16b generates the control information on the basis of the information of the processing region of the banding prevention process recorded in the storage 70, transmits the generated control information together with the CMYK image data to the N-value processor, ends a series of processes, and then returns to the original process. Here, the control information includes information indicating that the processing amount of the banding prevention process in the banding generation line (and the lines adjacent thereto) is the largest and the processing amount of the banding prevention process becomes gradually smaller as the distance from the banding generation line increases in the N-value process accompanied with the banding prevention process of the N-value processor 18, as described above. In this embodiment, the determination information includes information for determining the processing amount of the banding prevention process corresponding to the distance and the control information generator 16b generates the above-mentioned control information on the basis of the information.

On the other hand, when it is judged in step S416 that the candidate processing region determined in step S406 should not be subjected to the banding prevention process and the process of step S424 is performed, the information indicating that the candidate processing region should not be subjected to the banding prevention process is recorded in a predetermined area of the storage 70 and then the process of step S420 is performed.

Next, operations of this embodiment will be described with reference to FIGS. 18 and 25.

Figures 18, 19:
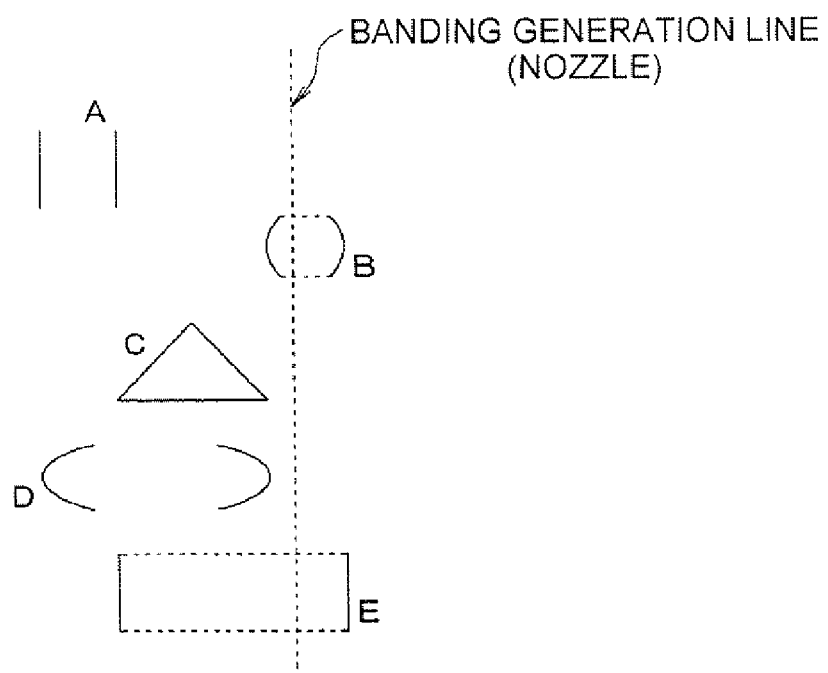
FIG. 18 is a view showing an example of an edge extraction filter in only a horizontal direction.
FIG. 19 is a view showing an example of elements formed by pixel data determined as an edge.
Figures 20A, 20B:
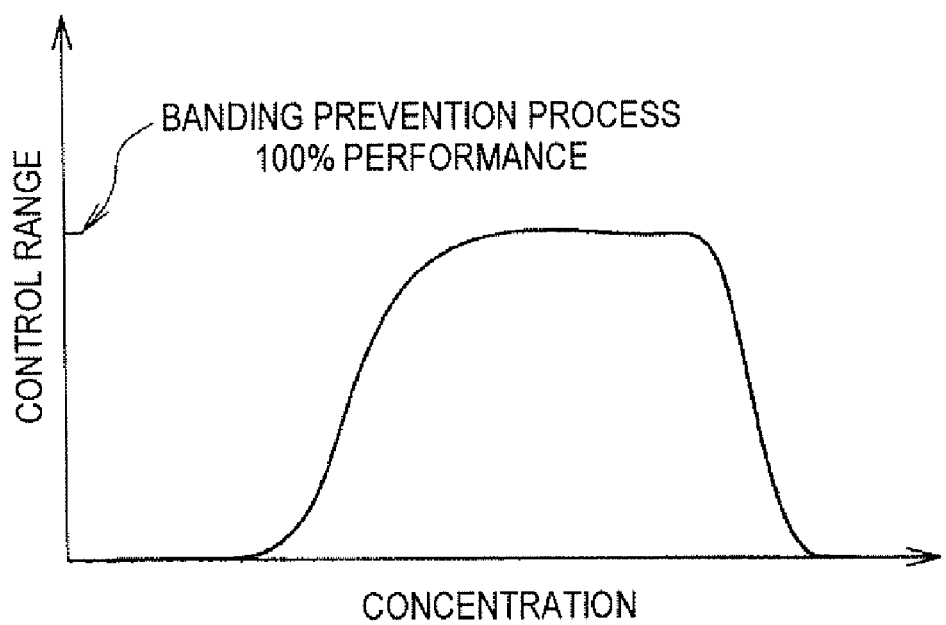
FIG. 20A is a view showing an example of a density control threshold value th set for each ink color of CMYK.
FIG. 20B is a view showing a relationship between a density value and a performance ratio of the banding prevention process.
Figure 21A:
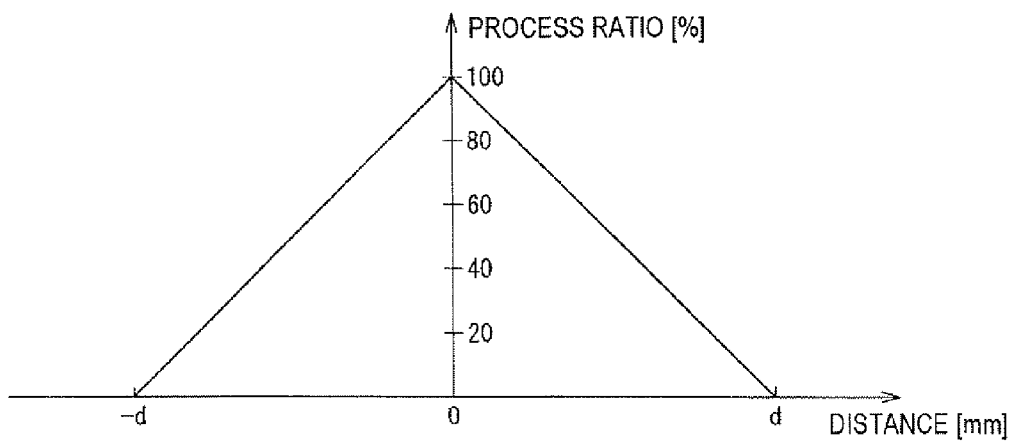
FIG. 21A is a view showing a processing ratio at which the N-value process is performed using the dot generation ration table of FIG. 13A.
Figure 21B:
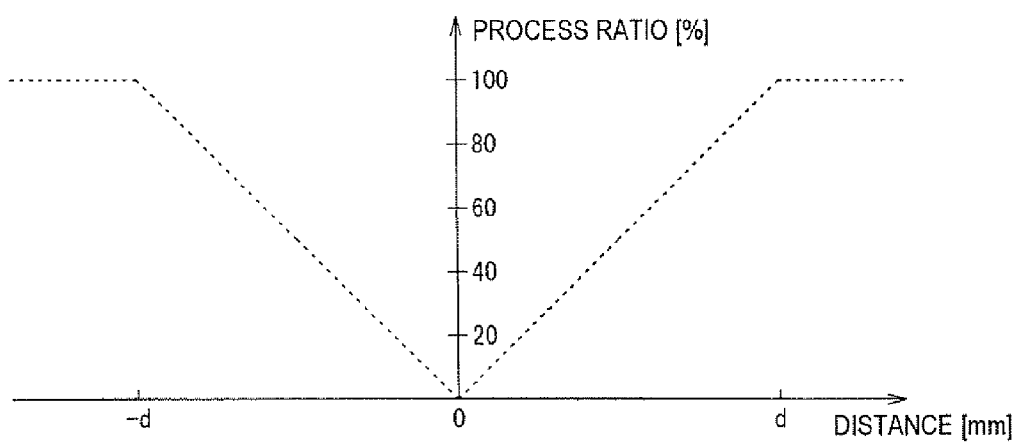
FIG. 21B is a view showing a processing ratio at which the N-value process is performed using the dot generation ration table of FIG. 13B.
Figures 22, 23:
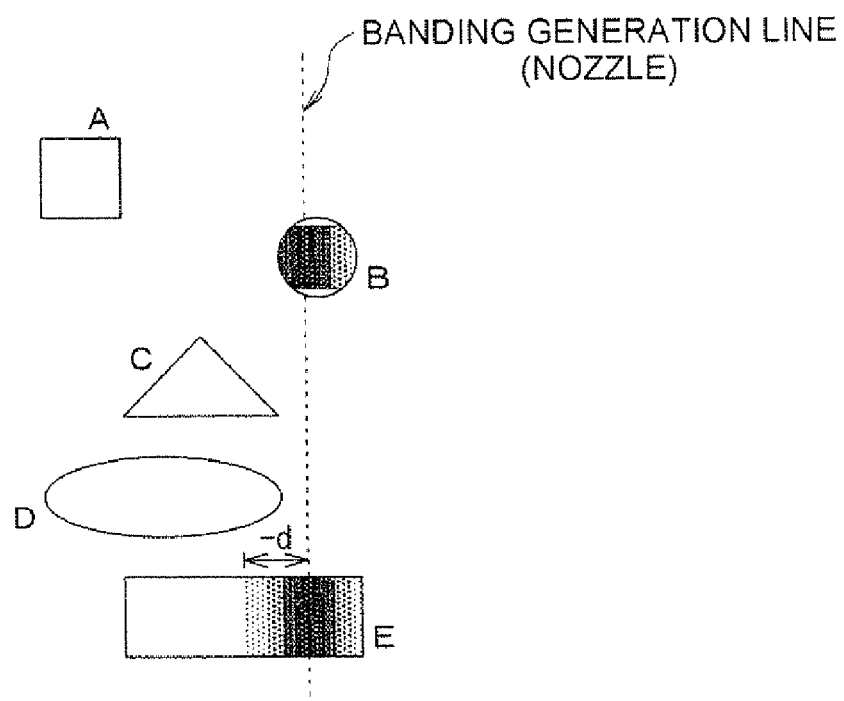
FIG. 22 is a view showing an example of visualization of a result of the banding prevention process.
FIG. 23 is a view showing an example of an edge extraction filter in all directions.
Figure 24:
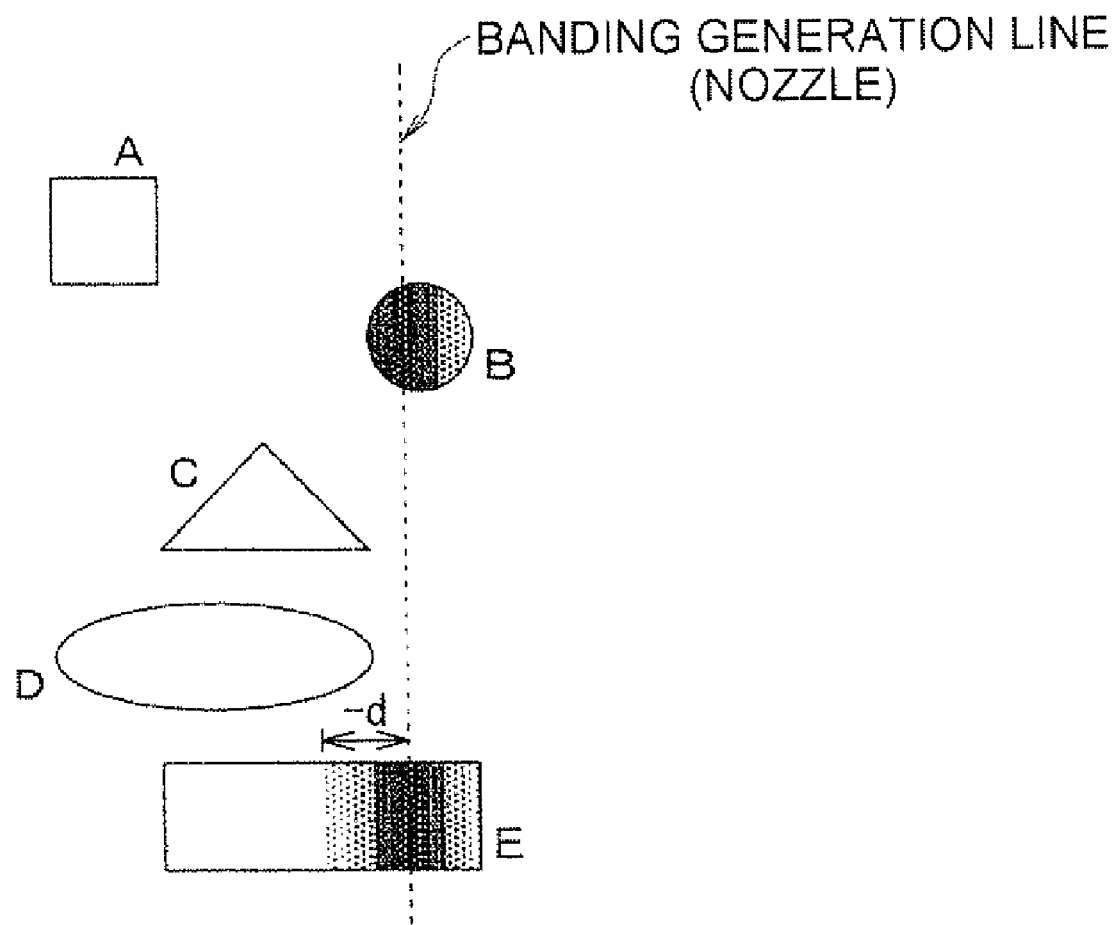
FIG. 24 is a view showing an example of visualization of a result of the banding prevention process performed for a processing region determined using the edge extraction filter of FIG. 23.

Here, FIG. 18 is a view showing an example of the edge extraction filter in only a horizontal direction. FIG. 19 is a view showing an example of elements formed by the pixel data determined as an edge. FIG. 20A is a view showing an example of the density control threshold value th set for each ink color of CMYK and FIG. 20B is a view showing a relationship between the density value and a performance ratio of the banding prevention process. FIG. 21A is a view showing a processing ratio at which the N-value process is performed using the dot generation ration table shown in FIG. 13A and FIG. 21B is a view showing a processing ratio at which the N-value process is performed using the dot generation ration table shown in FIG. 13B. FIG. 22 is a view showing an example of visualization of a result of the banding prevention process. FIG. 23 is a view showing an example of the edge extraction filter in all directions. FIG. 24 is a view showing an example of visualization of a result of the banding prevention process performed to a processing region determined using the edge extraction filter shown in FIG. 23. FIG. 25 is a view showing an example of a dot pattern in which the processing region determined using the method according to the second embodiment of the invention is subjected to the banding prevention process.

When acquiring the specific nozzle information and the CMYK image data from the nozzle specifying unit 12, the banding prevention processing controller 16 performs the control information generating process (step S110).

When the banding prevention processing controller 16 performs the control information generation process, the feature extraction unit 16a first reads the edge extraction filter information and the edge determining threshold value included in the determination information from the determination information storing unit 16c (step S402), performs the filtering process based on the edge extraction filter information to the CMYK image information, and extracts the edge information (edge amount) of the respective pixel data (step S404). Here, as shown in FIG. 18, the filtering process is performed using the edge extraction filter in the horizontal direction (including a diagonal direction) to extract the edge amount. The edge determining threshold value is compared with the edge amount of the respective pixel data, determines as an edge the pixel data of which the edge amount is equal to or greater than the threshold value, and determines a candidate processing region on the basis of the determination result and the specific nozzle information. For example, similarly to the first embodiment, when the image constituting the CMYK image data is the image shown in FIG. 10, the image formed by the edge extracted by the edge extraction filter in the horizontal direction is an image constituted by only the horizontal edges of the respective elements as shown in FIG. 19. In this way, in this embodiment, when the image data is image data such as a photograph image (for example, of a BMP format) of which information on the elements cannot be acquired, a place (edge portion) of which the density value abruptly varies is determined from the extracted edge information and thus the approximate shape and coordinate of the respective elements of the image are determined.

By using the edge portions as boundaries, a region including the line (banding generation line) formed by a specific nozzle in the boundaries is determined as the candidate processing region associated with the specific nozzle (step S406). In the example shown in FIG. 19, since the banding generation line is included in the boundaries as the edge portions forming element B and element E, the regions of element B and element E are determined as the candidate processing regions associated with the specific nozzle.

When the candidate processing region associated with the specific nozzle is determined, the feature extraction unit 16a extracts the density information from the determined regions (element B and element E) and transmits the extracted density information to the control information generator 16b (S408). Here, an average value of the density values of the candidate processing region is calculated and the average value is used as the density information.

When acquiring the density information and the information on the selected region from the feature extraction unit 16a, the control information generator 16b reads the density control threshold value th included in the determination information from the determination information storing unit 16c (step S410), compares the density control threshold value th with the calculated average density value (step S412), and judges whether the candidate processing region should be subjected to the banding prevention process on the basis of the comparison result (step S414).

For example, as shown in FIG. 20A, it is assumed that the density control threshold value th for black (Bk) is 25, the density control threshold value th for cyan (Cy) is 30, the density control threshold value th for magenta (Mg) is 30, and the density control threshold value th for yellow (Ye) is 60. For example, when the average density values of the candidate processing region for the ink colors are all "50", "50>th" is established for Bk, Cy, and Mg. Accordingly, in this case, it is judged that the candidate processing regions of Bk, Cy, and Mg should be subjected to the banding prevention process. On the other hand, since "50<th" is established for Ye, it is judged that the candidate processing region of Ye should not be subjected to the banding prevention process. That is, as shown in FIG. 20B, the place in which the density is relative low and the banding is thus invisible is not subjected to the banding prevention process and the place (particularly, medium tone region) in which the density is relatively high and the banding is thus visible is actively subjected to the banding prevention process. However, when the density is extremely high, the banding is also invisible. Accordingly, in the example shown in FIG. 20B, the place in which the density is equal to or greater than a predetermined density value is not subjected to the banding prevention process.

In this embodiment, the candidate processing region (the branch of "Yes" in step S416) determined as being subjected to the banding prevention process is determined as the processing region and the information thereon is recorded in a predetermined area of storage 70 (step S418). On the contrary, the information indicating (non-performance) that the candidate processing region (the branch of "No" in step S416) determined as not being subjected to the banding prevention process is not subjected to the banding prevention process is recorded in a predetermined area of the storage 70 (step S424).

When the process of determining the candidate processing region which should be subjected to the banding prevention process and the process of determining the candidate processing region which should not be subjected to the banding prevention process are completely performed to all the candidate processing regions corresponding to all the specific nozzles (the branch of "Yes" in step S420), the control information of the banding prevention process is generated on the basis of the information on the processing regions and the information on the non-performance stored in the storage 70 and the information for determining the processing amount of the banding prevention process corresponding to the distance which is included in the determination information (step S422). Specifically, the control information includes the information for performing the N-value process accompanied with the banding prevention process to the processing region in the acquired CMYK image data which should be subjected to the banding prevention process in accordance with the processing ratio preset in FIGS. 21A and 21B corresponding to the distance from the banding generation line and performing the normal N-value process accompanied with banding prevention process to the other regions. That is, as shown in FIGS. 21A and 21B, as the distance of the respective lines of the processing regions from the banding generation line increases, the processing ratio of the N-value process using the dot generation ratio table shown in FIG. 13B for performing the N-value process accompanied with the banding prevention process is allowed to decrease and the processing ratio of the N-value process using the dot generation ratio table shown in FIG. 13A for the normal N-value process is allowed to increase. When the distance from the banding generation line exceeds at least one of distance d and distance −d, the lines located at the positions at which the distance exceeds distance d and distance −d in the processing region is subjected to the N-value process using only the dot generation ratio table for the normal N-value process. For example, it is assumed that the processing ratio of the normal N-value process is 20% and the processing ratio of the N-value process accompanied with the banding prevention process is 80% in a line located at a position where the distance from the banding generation line is X and the density value of the line is 125. Then, as shown in FIG. 13A, in the dot generation ratio table for the normal N-value process, the generation frequency of the small dots is 100% and the generation frequency of the large dots is 0%. Accordingly, the dot generation ratios of 100×0.2=20% and 0×0.2=0% are calculated. On the other hand, as shown in FIG. 13B, in the dot generation ratio table for the N-value process accompanied with the banding prevention process, the generation frequency of the small dots is 32% and the generation frequency of the large dots is 64%. Accordingly, the dot generation ratios of 45×0.8=36% and 30×0.8=24% are calculated. Therefore, the control information is generated so that the line located at the position where the distance is X should be subjected to the N-value process having the generation frequency of the small dots of 56% and the generation frequency of the large dots of 24% in combination of the calculation result of the small dots and the large dots.

As for the line located at a position where the distance from the banding generation line is X, when the processing ratio of the normal N-value process is 20% and the processing ratio of the N-value process accompanied with the banding prevention process is 80%, the invention is not limited to the above-mentioned method, but the control information may be generated so that 20% of the pixel data constituting the line X of distance is subjected to the N-value process using the dot generation ratio table shown in FIGS. 13A and 80% of the pixel data is subjected to the N-value process using the dot generation ratio table shown in FIG. 13B.

In this way, when the generation frequency of the small dots and the generation frequency of the large dots are determined for all the lines in the processing region to be subjected to the banding prevention process, the control information is generated on the basis of the information on the generation frequency, the information on the processing region, and the non-performance information. The banding prevention processing controller 16 transmits the CMYK image data and the control information to the N-value processor 18.

On the other hand, when acquiring the CMYK image data and the control information from the banding prevention processing controller 16 (step S300), the N-value processor 18 reads from the N-value information storing unit 20 the N-value information used to perform the normal N-value process and the N-value information used to perform the N-value process accompanied with the banding prevention process (step S302). The N-value processor 18 selects the non-processed pixel data from the CMYK image data (step S304), performs the normal N-value process on the basis of the acquired N-value information and the control information (step S312) when the selected pixel data is not the process target of the banding prevention process (the branch of "No" in step S306), and performs the N-value process accompanied with the banding prevention process on the basis of the generation frequencies of the small dots and the large dots included in the control information (step S308) when the selected pixel data is the process target (the branch of "Yes" in step S306).

The normal N-value process is similar to that of the first embodiment.

On the other hand, in this embodiment, when the process of adjusting the generation ratios of the small dots and the large dots is performed, the N-value process accompanied with the banding prevention process is performed on the basis of the generation frequencies (or the processing ratios) of the small dots and the large dots for each line which is determined at the time of generating the control information. As for the generation frequencies of the small dots and the large dots, as shown in FIGS. 21A and 21B, the dot generation ratio table shown in FIG. 13B is used by 100% for the banding generation line and the ratio of using the dot generation ratio table shown in FIG. 13B gradually decreases and the ratio of using the dot generation ratio table shown in FIG. 13A gradually increases for the lines of which the distance from the banding generation line becomes larger. Accordingly, for example, the large dots are greatly included in the dots forming the lines vertically successive to and adjacent to the line (banding generation line) in which a dot cannot be formed due to the non-discharge of the ink, while the ratio of using the dot generation ratio table shown in FIG. 13A to form the line gradually increases as the distance from the banding generation line becomes larger.

That is, as shown in FIG. 22, the banding generation line is most strongly subjected to the banding prevention process (the deeper color means the more strength) and the lines of which the distance from the banding generation line becomes larger are gradually weakly subjected to the banding prevention process. When the distance exceeds distance d and distance −d, the normal N-value process is performed to the corresponding pixel data. In the example shown in FIG. 22, since the edge extraction filter in the horizontal direction is used, a part of element B is not subjected to the banding prevention process. In the example shown in FIG. 22, the entire regions of element B and element E are the processing regions (regions which can be considered as having the same density or regions such as a gradation image in which the variation in density is slow).

Here, by using the edge extraction filter in all directions shown in FIG. 23 instead of the edge extraction filter in the horizontal direction shown in FIG. 18 in the process of extracting the edge amount from the respective pixel data of the CMYK image data, it is possible to detect the edges in all directions. In this case, since the elements can be recognized as a closed region, that is, element B has a circular shape and element E has a rectangular shape, the banding prevention process can be performed to all the regions element B and element E as shown in FIG. 24. In this case, similarly to the example shown in FIG. 22, the vicinity of the banding generation line is most strongly subjected to the banding prevention process (the deeper color means the more strength) and the lines of which the distance from the banding generation line becomes larger are more weakly subjected to the banding prevention process. In addition, when the distance from the banding generation line exceeds at least one of distance d and distance −d, the normal N-value process is performed to the pixel data constituting the lines.

Although not shown, the edge information is extracted in this embodiment. Accordingly, places in which the variation in density is rapid can be determined in the elements having a rectangular shape or a circular shape. Therefore, when the density rapidly varies in the elements, the candidate processing regions can be determined using the edges of the varying places as boundaries. Accordingly, similarly to the first embodiment, it is possible to simply determine the regions without performing the process of determining the regions which can be considered as having the same density or the regions such as a gradation image in which the variation in density is slow. That is, in the determination process using the edge determining threshold value, the place determined as the edge is a place departing from the allowable range of the first embodiment.

When all the pixel data of the CMYK image data are subjected to the N-value process and the N-valued image data are generated (the branch of "Yes" in step S310), the N-value processor 18 transmits the N-valued image data to the print data generator 22.

When acquiring the N-valued image data from the N-value processor 18, the print data generator 22 converts the N-valued image data into a data format which can be analyzed by the printing unit 24 to generated the print data (step S114) and outputs the generated print data to the printing unit 24 (step S116).

When acquiring the print data from the print data generator 22, the printing unit 24 forms (prints) dots on a printing medium by the use of the print head 200 on the basis of the print data (step S118).

Figure 25:
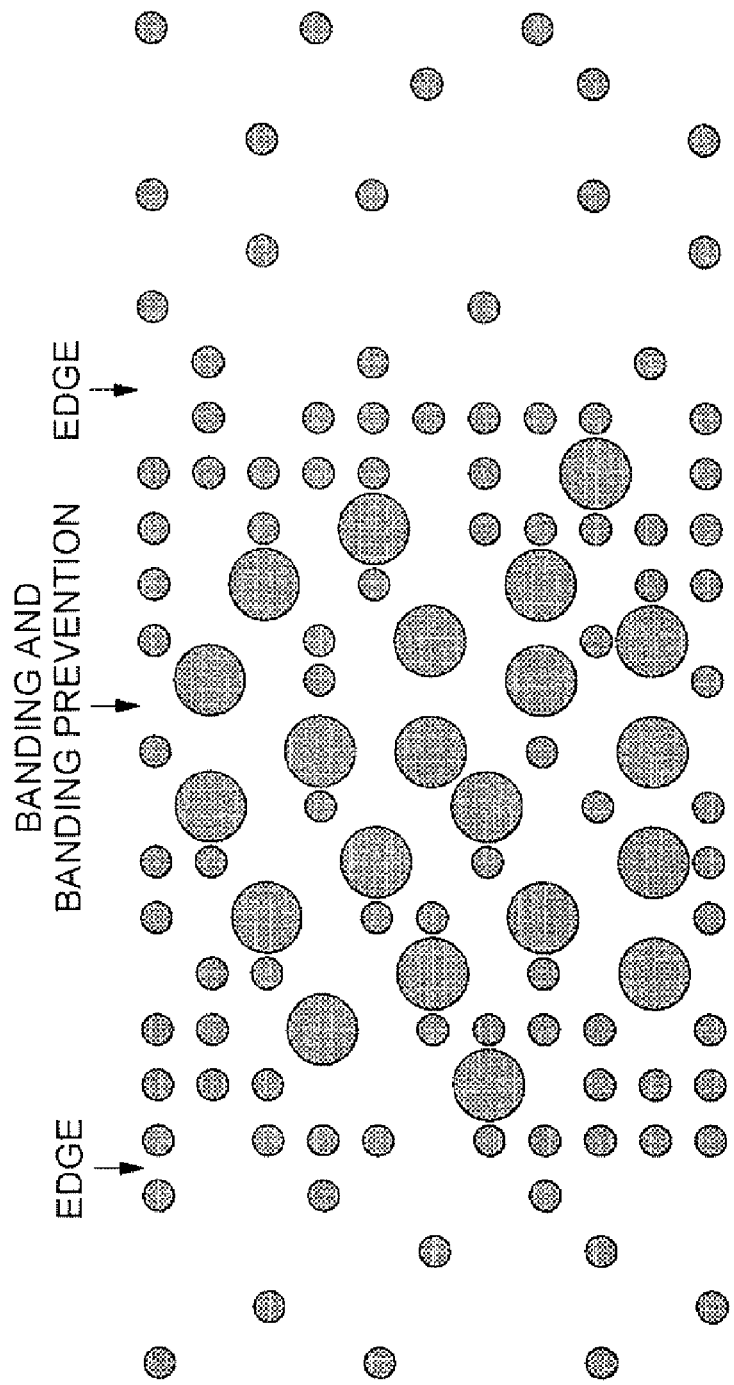
FIG. 25 is a view showing an example of a dot pattern in which a processing region determined using the method of the second embodiment of the invention is subjected to the banding prevention process.

In the dot pattern formed on the medium by the printer 100 according to this embodiment, the banding prevention process is not performed to only the banding generation line as shown in FIG. 15, but can be performed to the banding generation line and the lines in which the difference in average density value between the lines vertically successive to and adjacent to the banding generation line is in the allowable range as shown in FIG. 25. As the distance of a line from the banding generation line becomes larger, the processing amount of the banding prevention process performed to the line can gradually decrease. Accordingly, it is possible to reduce the deterioration in granularity due to the banding prevention process and to prevent or reduce the deterioration of image quality due to the banding prevention process.

That is, in the example shown in FIG. 15, the bandings such as a white line and a black line are prevented by adding the large dots only to the banding generation line, but the banding prevention line is different from the other regions due to the non-uniform dot sizes in the banding prevention line. Accordingly, the deterioration in print quality (banding) seems to occur due to the local difference in dot size.

On the other hand, in the example shown in FIG. 25 as the print result of the printer 100 according to this embodiment, the entire regions (including the regions such as a gradation image in which the variation in density is slow), which includes the banding generation line, of the density range which can be considered as having the same density as the banding generation line are subjected to the banding prevention process and the processing amount of the banding prevention process to the line becomes smaller as the distance of the line from the banding generation line becomes larger. Accordingly, the ratio of using the large dots entirely increase in the banding generation line and the adjacent lines thereof and the ratio of using the small dots increases as the distance from the banding generation line becomes larger. Therefore, since the deterioration in granularity due to the increase of the large dots can be reduced and the regions having different dot sizes can be prevented from occurring in only a part (banding generation places) of the regions which can be considered as having the same image quality, the local difference in dot size is not generated unlike the example shown in FIG. 15 and the deterioration in granularity due to the increase of the large dots can be reduced as shown in the example of FIG. 16 according to the first embodiment.

In this embodiment, since the process is not performed using the places where the density abruptly varies as boundaries, but the partition of the regions due to the variation in density occurs, the problem such as the deterioration in image quality due thereto does not occur.

In the printer 100 according to this embodiment, when the candidate processing regions are low-density regions (regions having such a density that the banding is invisible without performing the banding prevention process), the candidate processing regions are not subjected to the banding prevention process. Accordingly, it is possible to suppress the bad influence on the original print quality due to the banding prevention process as small as possible.

In the second embodiment, the image data acquiring unit 10 corresponds to the image data acquiring unit of any one of Aspects 1, 3, 45, and 47 and the nozzle specifying unit 12 corresponds to the nozzle specifying unit of any one of Aspects 1, 3, 45, and 47. The nozzle characteristic information storing unit 14 corresponds to the nozzle characteristic information storing unit of any one of Aspects 1, 3, 45, and 47 and the control information generating process of the banding prevention process performed by the banding prevention processing controller 16 and the N-value process performed by the N-value processor 18 and the N-value information storing unit 20 based on the control information correspond to the banding prevention process controlling unit of any one of Aspects 1, 2, 3, 5, 6, 7, 8, 10, 45, 46, 47, 49, 50, 51, 52, and 54. The print data generating process performed by the N-value processor 18, the N-value information storing unit 20, and the print data generator 22 corresponds to the print data generating unit of any one of Aspects 1, 3, 45, and 47 and the printing unit 24 corresponds to the printing unit of any one of Aspects 1, 3, and 4.

In the second embodiment, the edge information extracting process performed by the feature extraction unit 16a corresponds to the edge information extracting unit of Aspect 10 or 53.

In the second embodiment, steps S100 to S104 and step S120 correspond to the acquiring of the image data of any one of Aspects 17, 19, 31, 33, 58, 60, 71, and 73 and steps S106 and S108 correspond to the specifying of the nozzle of any one of Aspects 17, 19, 31, 33, 58, 60, 71, and 73. Steps S110 and S112 correspond to the controlling of the banding prevention process of any one of Aspects 17, 18, 19, 21, 22, 23, 24, 26, 31, 32, 33, 35, 36, 37, 38, 40, 58, 59, 60, 61, 62, 63, 64, 66, 71, 72, 73, 74, 75 76, 77, and 79. Steps S112 to S116 correspond to the generating of the print data of any one of Aspects 17, 20, 30, 34, 58, 60, 71, and 73 and step S118 corresponds to the printing of any one of Aspects 17, 20, 31, 33, and 34.

In the second embodiment, step S404 corresponds to the extracting of the edge information of any one of Aspects 26, 40, 66, and 79.

Although it has been described in the first embodiment that the shapes, the coordinates, and the sizes of the elements constituting an image are determined on the basis of the image information included in the print information generated by the printer driver to select the regions associated with the banding generation line and the range which can be considered as having the same density or the range in which the variation in density is slow is determined as a processing range of the banding prevention process on the basis of the density information of the selected regions, the invention is not limited to it, but the processing range of the banding prevention process may be determined on the basis of only the image information. For example, the range which can be considered as having the same density or the range in which the variation in density is slow may be determined on the basis of the color information of the elements included in the image information and the density information of the selected regions, or the entire elements including the banding generation line may be determined as the processing range regardless of the color information of the elements.

Although it has been described in the first and second embodiments that the dot generation ratio table for the banding prevention process different from the dot generation ratio table used for the normal N-value process is used for the banding prevention process, the invention is not limited to it, but may employs a different banding prevention process.

For example, there is a banding prevention process which can prevent or reduce the deterioration in print quality due to the occurrence of the banding by forming dots having a size, which is larger than the dot size determined from the original pixel value of the image data, in the vicinity of the place in which the dot gap is larger than an ideal gap due to the flying deflection or the like. In the banding prevention process, it is possible to determines whether the large dots should be formed for each pixel data at the time of forming the large dots on the basis of a lottery (for example, it is possible to make the election probability variable depending on the amount of flying deflection). Accordingly, it is possible to effectively remove or make invisible "the white line" due to the banding resulting from the flying deflection or the like. When the banding prevention process is applied to the invention, the election probability of the large dots is determined, for example, depending on the distance from the banding generation line. For example, the election probability of the large dots is set to the largest in the banding generation line and the election probability of the large dots is set to gradually decrease as the distance becomes larger.

There is also a banding prevention process which can prevent or reduce the deterioration in print quality due to the occurrence of the banding by forming dots having a size, which is smaller than the dot size determined from the original pixel value of the image data, in the vicinity of the place in which the dot gap is smaller than an ideal gap due to the flying deflection or the like or thinning out the dots in the vicinity. Accordingly, it is possible to effectively remove or make invisible "the deep line" due to the banding resulting from the flying deflection or the like. When the banding prevention process is applied to the invention, the amount of the small dots to be formed or the amount of the dots to be thinned out is determined, for example, depending on the distance from the banding generation line. For example, the amount of the small dots to be formed or the amount of the dots to be thinned out is the largest in the banding generation line and the amount of the small dots to be formed or the amount of the dots to be thinned out is gradually reduced as the distance from the banding generation line becomes larger.

There is a banding prevention process which can prevent or reduce the deterioration in print quality due to the banding by setting the resolution of the print image formed by at least one of the nozzle associated with the occurrence of the banding and the nozzle adjacent thereto to be lower than the resolution of the print image formed on the basis of the original pixel value of the image data. For example, by thinning out the dots formed by at least one of the nozzle associated with the occurrence of the banding and the nozzle adjacent thereto by an amount corresponding to the difference from the ideal formation positions of the dots to lower the resolution of the print image, it is possible to make invisible the banding such as "the white line" or "the deep line". When the banding prevention process is applied to the invention, the amount of the dots thinned out or the number of lines from which the dots are thinned out is determined, for example, depending on the distance from the banding generation line. For example, the amount of the dots thinned out or the number of lines from which the dots are thinned out is the largest in the banding generation line and the amount of the dots thinned out or the number of lines from which the dots are thinned out is gradually reduced as the distance from the banding generation line becomes larger.

There is a banding prevention process which can prevent or reduce the deterioration in print quality due to the occurrence of the banding by forming reference dots at positions corresponding to a predetermined resolution smaller than the maximum printable resolution of the printer by the nozzles in the direction intersecting the nozzle arrangement direction and forming extension dots at positions different from the reference dots. Accordingly, by suppressing the feeling of granularity by the use of the reference dots and the extension dots at the positions different therefrom to secure the print quality and deviating the positions of the extension dots in the direction intersecting the nozzle arrangement direction from the positions of the reference dots, it is possible to reduce the occurrence of the banding. When the banding prevention process is applied to the invention, the amount of correction for correcting the size of the extension dots is determined, for example, depending on the distance from the banding generation line. For example, the amount of correction is the largest in the banding generation line and the amount of correction is gradually reduced as the distance from the banding generation line becomes larger.

There is a banding prevention process which can prevent or reduce the deterioration in print quality due to the banding by changing the amount of ink discharged from the nozzle associated with the banding constituting an image portion of a predetermined color so as not to generate the banding, for example, to reduce the amount of discharged ink, and increasing the amount of ink discharged from the nozzle corresponding to a color different from the color corresponding to an ideal nozzle to compensate for the reduced amount of discharged ink. Accordingly, it is possible to obtain a state in which the banding does not occur in the print result or a state in which the banding is invisible in the print result. In addition, since the pixel values of the image portion of a predetermined color can be reconstructed so as to be in a range in which the predetermined color is substantially maintained, it is possible to maintain the color information before the change and also to reproduce the image of the image data on the printing medium with the image quality not damaging naturalness. When the banding prevention process is applied to the invention, the amount of ink discharged from the nozzle is determined, for example, depending on the distance from the banding generation line. For example, the changing amount of ink discharged from the nozzle is the largest in the banding generation line and the changing amount of ink discharged from the nozzle is gradually reduced as the distance from the banding generation line becomes larger.

Although it has been described in the second embodiment that the known edge extraction filter shown in FIG. 18 or 23 is used to extract the edge information, the invention is not limited to it, but the edge information may be extracted by the use of a different method. For example, there is a method of extracting a difference in pixel value (density value or brightness value) from the adjacent pixel and determining whether the edge exists on the basis of the magnitude of the absolute value of the difference. Specifically, when the pixel value of the noted pixel is Pij and the pixel value of the pixel adjacent left to the noted pixel is P(i−1)j, the absolute value of the difference Dij=|Pij−P(i−1)j| is calculated. Then, when a predetermined threshold value is th and Dij>th, it is determined that an edge exists between Dij and D(i−1)j. By calculating a vertical difference in pixel value (Dij=|Pij−Pi(j−1)|), it is possible to extract the vertical edge similarly to the horizontal edge.

In the printer according to the first and second embodiments, since the print data are generated from the image data in accordance with the feature of the print head without modifying the existing printer, it is not necessary to prepare for a particular printing unit as the printing unit 24 and it is possible to use the existing inkjet printer without any modification. By separating the printing unit 24 from the printer 100 according to the above-mentioned embodiments, it is possible to embody the function by the use of only a general-purpose print instruction terminal (print data generating device) such as PC.

The invention can be applied to a case where the formed dots have the same result as the flying deflection as a result that the dots formed by the nozzles of which the ink discharge direction is vertical (normal) are deviated from the normal positions, as well as the flying deflection.

The printer 100 according to the first and second embodiments can be applied to a multi-pass inkjet printer as well as a line-head inkjet printer. In the line-head inkjet printer, it is possible to obtain a printing matter with high quality by one pass in which the white line or the deep color line is invisible even when the flying deflection occurs. In the multi-pass inkjet printer, it is possible to perform a printing operation at a higher speed since the number of reciprocations can be reduced.

Figures 26A, 26B:
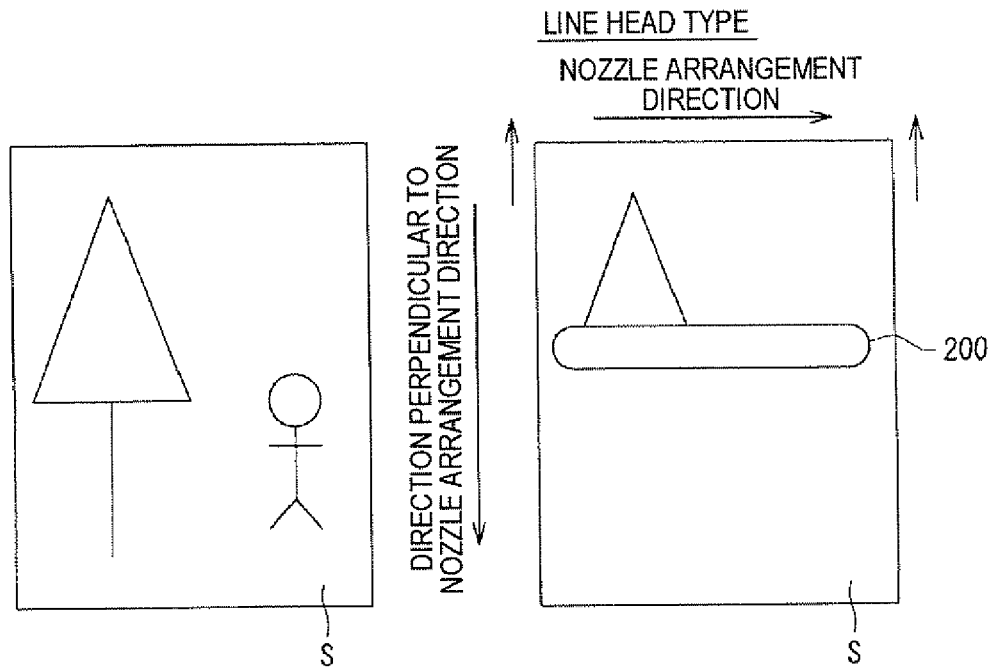
FIGS. 26A to 26C are explanatory views showing a difference in printing method between a multi-pass type inkjet printer and a line head type inkjet printer.
Figure 26C:
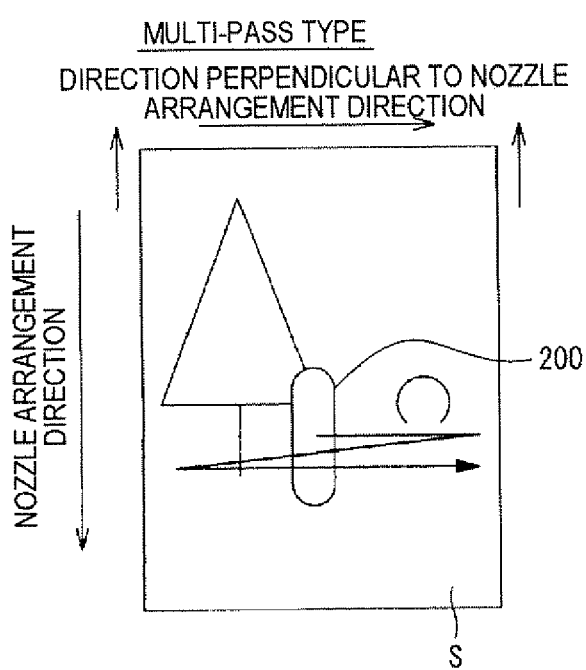

FIGS. 26A to 26C show the printing methods of the line-head inkjet printer and the multi-pass inkjet printer.

In the line-head inkjet printer, when the shown image is printed on a rectangular printing sheet S as shown in FIG. 26A and the width direction of the printing sheet S is set to the nozzle arrangement direction of the image data and the longitudinal direction thereof is set to be perpendicular to the nozzle arrangement direction of the image data as shown in FIG. 26B, the print head 200 has a length equal to the width of the printing sheet S and the printing operation is finished by one pass (operation) by fixing the print head 200 and moving the printing sheet S in the direction perpendicular to the nozzle arrangement direction relative to the print head 200. In addition, similarly to a flatbed type scanner, it is also possible to perform the printing operation by fixing the printing sheet S and moving the print head 200 in the direction perpendicular to the nozzle arrangement direction, or moving both in the opposite directions. On the contrary, in the multi-pass inkjet printer, as shown in FIG. 26C, when the longitudinal direction of the printing sheet S is set to the nozzle arrangement direction of the image data and the width direction thereof is set to the direction perpendicular to the nozzle arrangement direction of the image data, the printing operation is performed by locating the print head 200 having a length still smaller than the width of the printing sheet in the nozzle arrangement direction and moving the printing sheet S in the nozzle arrangement direction by a predetermined pitch while allowing the print head 200 to reciprocate in the direction perpendicular to the nozzle arrangement direction. Accordingly, in the multi-pass inkjet printer, since more print time is required than that of the line-head inkjet printer, but the print head 200 can be located repeatedly at any position, it is possible to cope with the reduction of the white line among the above-mentioned bandings to some extents.

Although the inkjet printer for performing a printing operation by discharging the ink in a dot shape has been described in the first and second embodiments, the invention can be applied to another printer such as a thermal head printer also called a heat transfer printer or a thermal printer using a print head in which printing mechanisms are arranged in a line shape.

Figure 27:
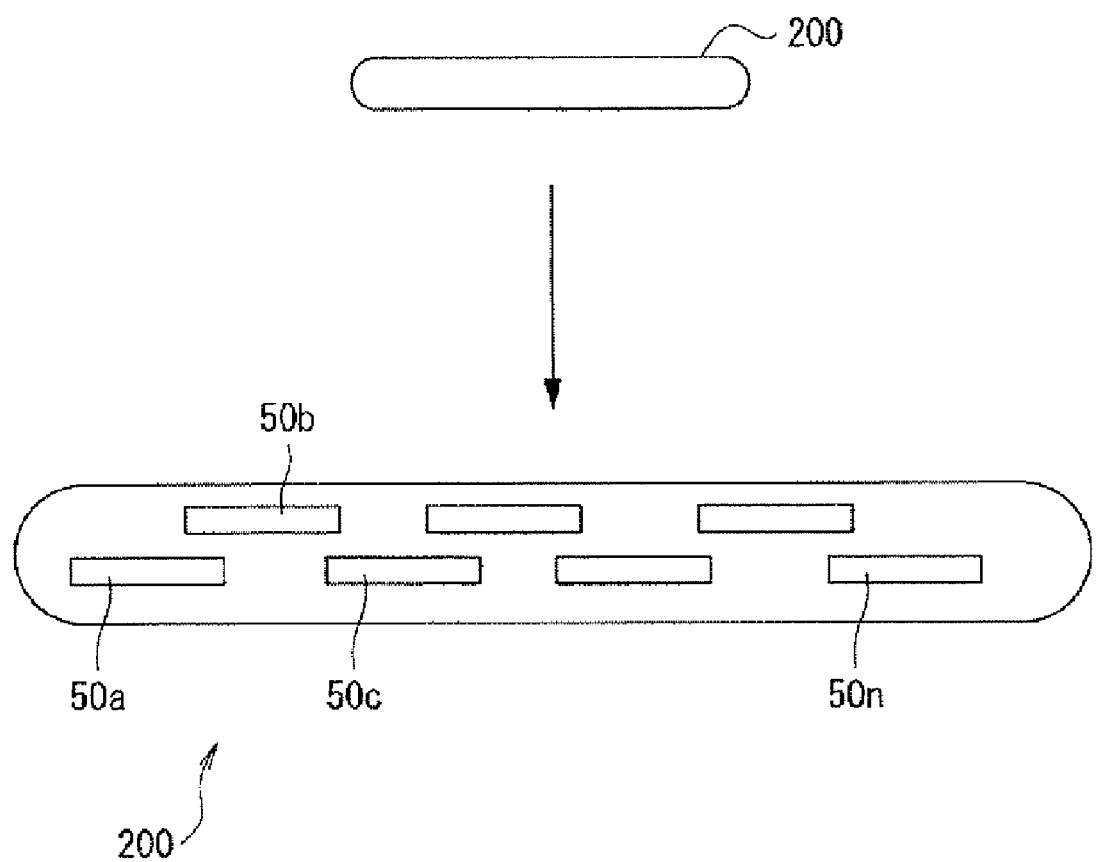
FIG. 27 is a conceptual view showing another example of a structure of the print head.

In FIG. 3, the nozzle modules 50, 52, 54, and 56 of the print head 200 provided for the respective colors has a structure in which the nozzles N are arranged in a line shape in the longitudinal direction of the print head 200, but as shown in FIG. 27, the respective nozzle modules 50, 52, 54, and 56 may be constructed by a plurality of small nozzle units 50a, 50b, . . . , 50n and the nozzle units may be arranged in the movement direction of the print head 200. Specifically, by constructing each of the nozzle modules 50, 52, 54, and 56 out of a plurality of small nozzle units 50a, 50b, . . . , 50n, it is possible to construct a longitudinal nozzle mode by the use of the heads having the small length of the nozzle units 50a, 50b, . . . , 50n, thereby enhancing the productivity of the nozzle modules.

There has been described a print head having a structure in which "the nozzle arrangement direction" is perpendicular or substantially perpendicular to "the printing direction (sheet transport direction), such as a line-head print head in which a plurality of nozzles are arranged in a line shape in the direction parallel to the width direction of the rectangular printing sheet, the width direction is parallel to "the nozzle arrangement direction", and the longitudinal direction of the rectangular printing sheet is parallel to "the direction perpendicular to the nozzle arrangement direction" and a short multi-pass print head in which a plurality o nozzles are arranged parallel to the longitudinal direction of the printing sheet, the longitudinal direction is parallel to "the nozzle arrangement direction", and the width direction of the rectangular printing sheet is parallel to "the direction perpendicular to the nozzle arrangement direction." However, the invention is not limited to above-mentioned structure, but may employ a print head in which a plurality of short nozzle modules are arranged or a print head in which "the nozzle arrangement direction" are not perpendicular to or substantially perpendicular to "the printing direction."

Now, several examples of the line-head print head and the multi-pass print head will be described with reference to FIGS. 28 and 29. Here, FIGS. 28A to 28D are views showing examples of the print head of the line-head printer. FIGS. 29A to 29D are views showing examples the print head of the multi-pass printer.

First, the examples of the print head of the line-head printer are described.

Figures 28A, 28B:
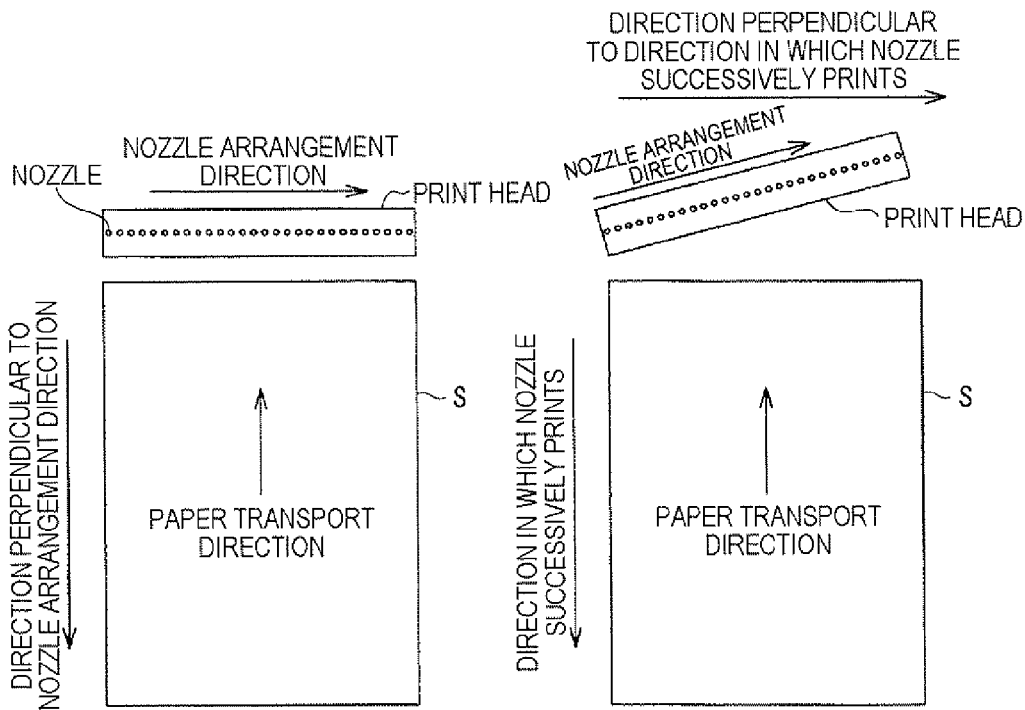
FIGS. 28A to 28D are views showing an example of a configuration of a print head of a line head type printer.

The example of FIG. 28A illustrates a longitudinal print head (a length equal to the width or longer than the width) which is used in the first and second embodiments and in which a plurality of nozzles are arranged in a line shape in the direction parallel to the width direction of the rectangular printing sheet S, the width direction is parallel to "the nozzle arrangement direction", and the longitudinal direction of the rectangular printing sheet S is parallel to "the direction perpendicular to the nozzle arrangement direction". In this example, "the direction perpendicular to the nozzle arrangement direction" and "the printing direction (sheet transport direction)" are parallel to each other. That is, "the nozzle arrangement direction" and "the printing direction" are perpendicular (or substantially perpendicular) to each other. On the other hand, the example of FIG. 28B illustrates a longitudinal print head in which "the nozzle arrangement direction" is not parallel to the width direction of the printing sheet S and a plurality of nozzles are arranged in a direction oblique about the width direction. In this example, "the direction perpendicular to the nozzle arrangement direction" and "the printing direction" are not parallel to each other and "the direction in which the nozzles successively perform the printing operation" is "the printing direction." That is, "the nozzle arrangement direction" and "the printing direction (sheet transport direction)" are not perpendicular (substantially perpendicular) to each other. Accordingly, the longitudinal direction of the printing sheet S is "the direction in which the nozzles successively perform the printing operation" and the width direction of the printing sheet S is not "the nozzle arrangement direction" but "the direction perpendicular to the direction in which the nozzles successively perform the printing operation." In this way, when the nozzle arrangement direction is oblique about the width direction perpendicular to the printing direction, it is possible to obtain an image with high resolution.

Figures 28C, 28D:
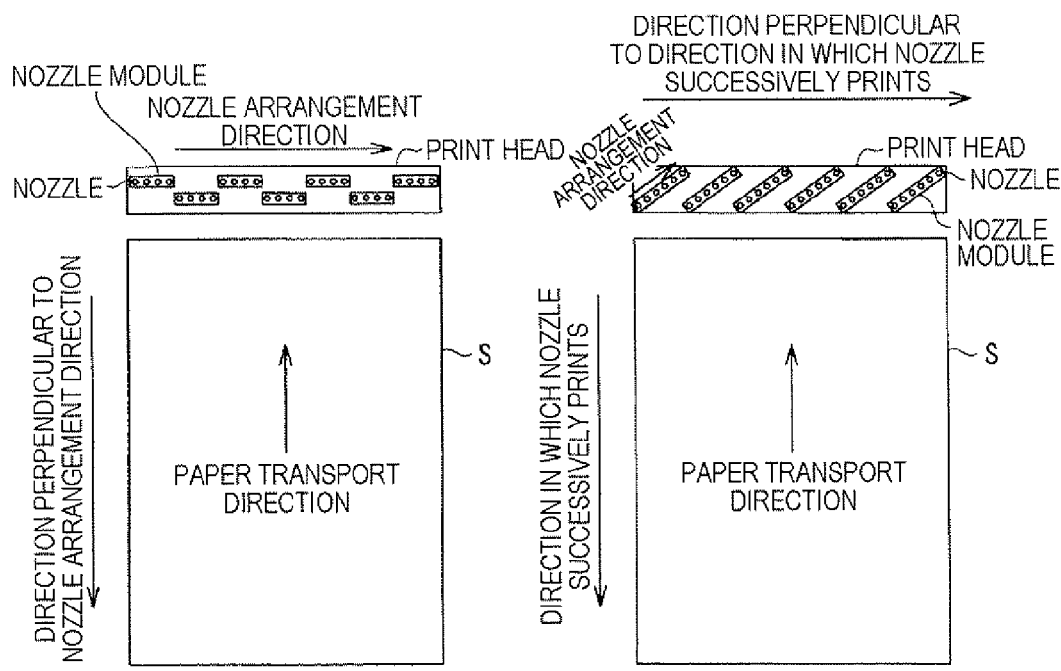

The example of FIG. 28C illustrates a print head in which a plurality of short nozzle modules in which a plurality of nozzles are arranged in a line shape in the same direction as the width direction of the rectangular printing sheet S are not arranged in a line but different from each other in the width direction. Since this example has a structure in which a single nozzle module is divided into a plurality of nozzle modules and which is equal to the example of FIG. 28A, "the nozzle arrangement direction" is the width direction of the printing sheet S and "the direction perpendicular to the nozzle arrangement direction" is the longitudinal direction of the printing sheet S and "the printing direction." On the other hand, the example of FIG. 28D illustrates a print head in which a plurality of nozzles are arranged oblique about the width direction of the printing sheet S, similarly to the example of FIG. 28B. However, in the example shown in FIG. 28D, a plurality of short nozzle modules in which a plurality of nozzles are arranged in the oblique direction are arranged oblique about the width direction of the printing sheet S. Since this example has a structure in which a single nozzle module is divided into a plurality of nozzle modules and which is equal to the example of FIG. 28B, the longitudinal direction of the printing sheet S is "the direction in which the nozzles successively perform the printing operation" and the width direction of the printing sheet S is "the direction perpendicular to the direction in which the nozzles successively perform the printing operation."

Next, the examples of the multi-pass print head are described.

Figures 29A, 29B:
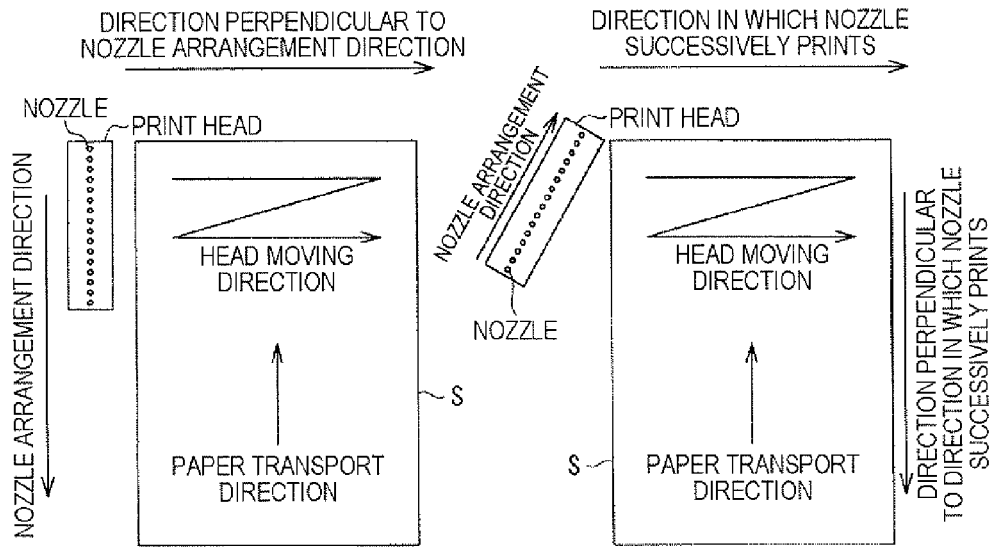
FIGS. 29A to 29D are views showing an example of a configuration of a print head of a multi-pass type printer.

The example of FIG. 29A illustrates a short print head in which a plurality of nozzles are arranged in the same direction as the longitudinal direction of the rectangular printing sheet S, the longitudinal direction is "the nozzle arrangement direction", and the width direction of the rectangular printing sheet S is "the direction perpendicular to the nozzle arrangement direction". In this example, "the direction perpendicular to the nozzle arrangement direction" and "the printing direction (sheet transport direction)" are parallel to each other. That is, "the nozzle arrangement direction" and "the printing direction" are perpendicular (or substantially perpendicular) to each other. In the movement direction of the print head, as shown in FIG. 29A, the print head reciprocates in the width direction of the printing sheet S. On the other hand, the example of FIG. 29B illustrates a short print head in which "the nozzle arrangement direction" is not parallel to the longitudinal direction of the printing sheet S and a plurality of nozzles are arranged in a direction oblique about the longitudinal direction. In this example, "the direction perpendicular to the nozzle arrangement direction" and "the printing direction" are not parallel to each other and "the direction in which the nozzles successively perform the printing operation" is "the printing direction." That is, "the nozzle arrangement direction" and "the printing direction (sheet transport direction)" are not perpendicular (substantially perpendicular) to each other. Accordingly, the width direction of the printing sheet S is not "the nozzle arrangement direction" but "the direction in which the nozzles successively perform the printing operation" and the longitudinal direction of the printing sheet S is "the direction perpendicular to the direction in which the nozzles successively perform the printing operation." In this way, when the nozzle arrangement direction is oblique about the longitudinal direction perpendicular to the printing direction, it is possible to obtain an image with high resolution.

Figures 29C, 29D:
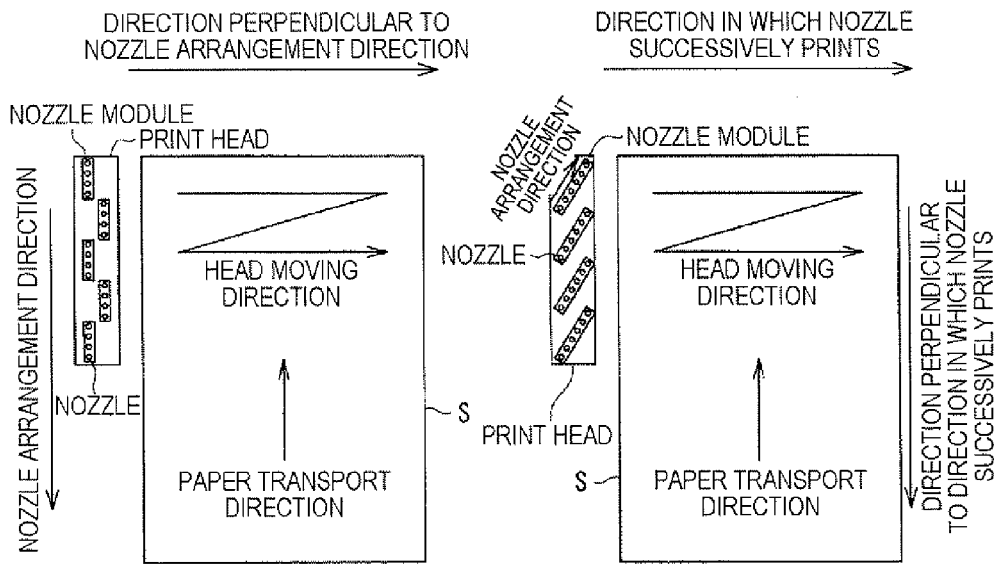

The example of FIG. 29C illustrates a short print head in which a plurality of short nozzle modules in which a plurality of nozzles are arranged in a line shape in the same direction as the longitudinal direction of the rectangular printing sheet S are not arranged in a line but different from each other in the width direction. Since this example has a structure in which a single nozzle module is divided into a plurality of nozzle modules and which is equal to the example of FIG. 29A, "the nozzle arrangement direction" is the width direction of the printing sheet S and "the direction perpendicular to the nozzle arrangement direction" is the longitudinal direction of the printing sheet S and "the printing direction." On the other hand, the example of FIG. 29D illustrates a short print head in which a plurality of nozzles are arranged oblique about the longitudinal direction of the printing sheet S, similarly to the example of FIG. 29B. However, in the example shown in FIG. 29D, a plurality of short nozzle modules in which a plurality of nozzles are arranged in the oblique direction are arranged oblique about the longitudinal direction of the printing sheet S. Since this example has a structure in which a single nozzle module is divided into a plurality of nozzle modules and which is equal to the example of FIG. 29B, the width direction of the printing sheet S is "the direction in which the nozzles successively perform the printing operation" and the longitudinal direction of the printing sheet S is "the direction perpendicular to the direction in which the nozzles successively perform the printing operation."

The invention can be applied to the print heads in which "the nozzle arrangement direction" and "the printing direction" are not perpendicular to each other, such as the line-head print heads shown in FIGS. 28B and 28D and the multi-pass print heads shown in FIGS. 29B and 29D, as well as the print heads in which "the nozzle arrangement direction" and "the printing direction" are perpendicular to each other, such as the line-head print heads shown in FIGS. 28A and 28C and the multi-pass print heads shown in FIGS. 29A and 29C.

Although it has been described in the above-mentioned embodiments that the control program previously stored in the ROM 64 is executed to perform the processes shown in the flowcharts of FIGS. 5, 6, 7, and 17, the invention is not limited to it, but the control program may be loaded in the RAM 62 from the recording medium in which the sequence of the processes is recorded. Alternatively, the program may be acquired from a network.

Here, examples of the recording medium can include semiconductor storage mediums such as a RAM and a ROM, magnetic storage mediums such as an FD and an HD, optically readable storage mediums such as a CD, a CDV, an LD, and a DVD, and magnetically writable/optically readable storage mediums such as an MO, if they can be only read by a computer regardless of the reading methods such as an electromagnetic reading method, a magnetic reading method, and an optical reading method.

Figure 30:
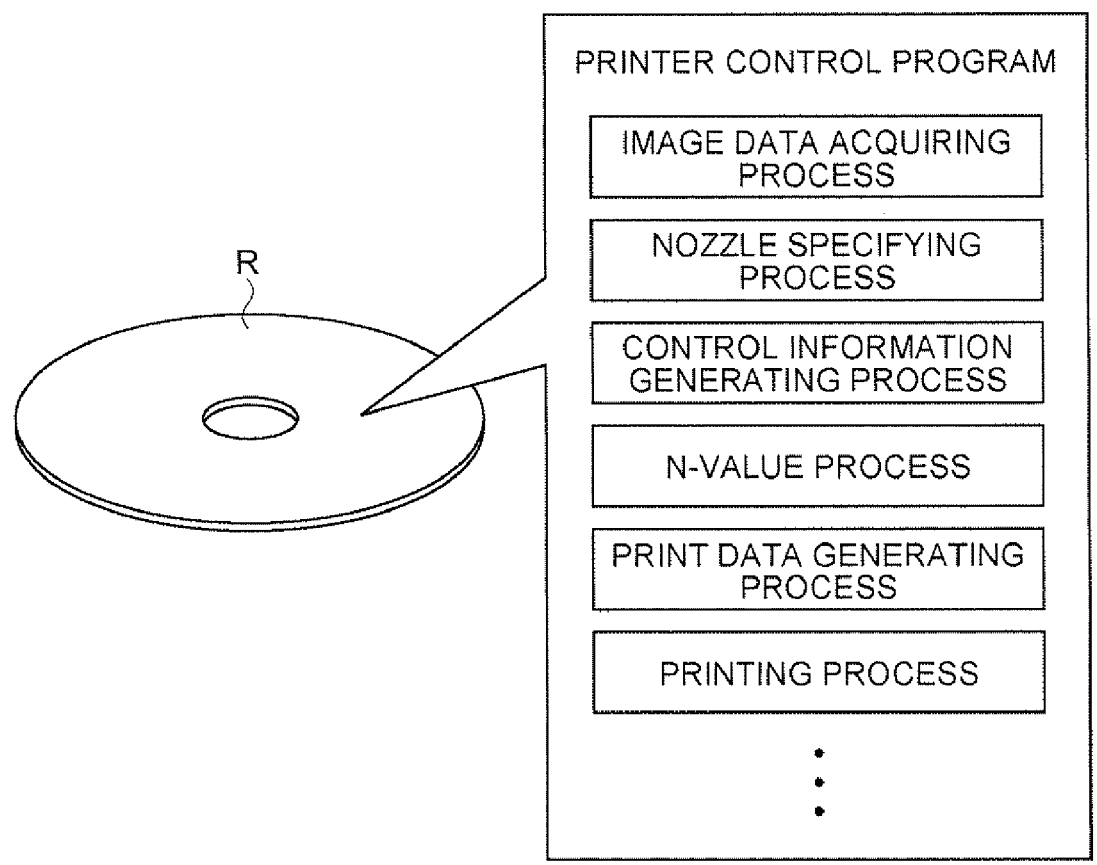
FIG. 30 is a schematic view showing an example of a recording medium in which a printer control program is stored.

FIG. 30 is a schematic view showing an example of a recording medium in which a printer control program is stored according to the invention.

The recording medium stores a program for making a computer execute the image acquiring process of acquiring the image data from an external device, an image scanner, and a recording medium, the nozzle specifying process of specifying a nozzle forming the banding generation line on the basis of the nozzle characteristic information, the control information generation process of generating the control information for controlling the banding prevention process, the N-value process of converting the M-valued image data into the N-valued image data, the print data generating process of generating the print data on the basis of the N-valued image data, and the printing process of performing the printing operation on the basis of the print data.

This application claims priority to Japanese Patent Application Nos. 2006-024154 filed Feb. 1, 2006, and 2006-292573 filed Oct. 27, 2006 which are hereby expressly incorporated by reference herein in their entirety.

What is claimed is:

1. A printer comprising:
a print head having nozzles that form dots on a print medium;
an image data acquiring unit that acquires image data having pixel values each having M gray scales (where, $M \geq 2$);
a nozzle characteristic information storage that stores nozzle characteristic information representing characteristics of the nozzles;
a nozzle specifying unit that specifies a nozzle concerned with banding generation in the print head, based on the nozzle characteristic information;
a banding prevention processor that performs a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding;
a banding prevention processing controller that controls the banding prevention processor so that a process range of the banding prevention process in the banding prevention processor includes the banding generation line and the different line in the image data, a density difference of density values of a line adjacent to the different line falling within a predetermined numerical range; and
a printing unit that prints an image on the print medium by means of the print head, based on the image data that are subjected to the banding prevention process.

2. The printer according to claim 1, further comprising a print data generating unit that generates print data including information associated with dot formation of the nozzle for the image data, based on the image data that are subjected to the banding prevention process,
wherein the printing unit prints the image on the print medium by means of the print head, based on the print data.

3. The printer according to claim 1, wherein the banding prevention processing controller controls the banding prevention processor to perform the banding prevention process for only data of the line whose density value exceeds a predetermined density value.

4. The printer according to claim 1, wherein the banding prevention processing controller controls the banding prevention processor to perform the banding prevention process for only data of the line whose density value falls within a halftone density range.

5. The printer according to claim 1, further comprising a frequency information extracting unit that extracts frequency information from the image data,
wherein the banding prevention processing controller determines the process range of the banding prevention process, based on the frequency information extracted by the frequency information extracting unit.

6. The printer according to claim 1, further comprising an edge information extracting unit that extracts edge information from the image data,
wherein the banding prevention processing controller determines the process range of the banding prevention process, based on the edge information extracted by the edge information extracting unit.

7. The printer according to claim 1, further comprising a print information acquiring unit that acquires print information including configuration information of the image,
wherein the banding prevention processing controller determines the process range of the banding prevention process, based on the print information acquired by the print information acquiring unit.

8. The printer according to claim 1, wherein the banding prevention processing controller controls throughput of the banding prevention process in the banding prevention processor, based on a distance relationship between the banding generation line and the different line.

9. The printer according to claim 8, wherein the banding prevention processing controller controls the banding prevention processor such that the throughput of the banding prevention process for the different line is reduced as a distance between the banding generation line and the different line increases.

10. The printer according to claim 1, wherein the nozzle characteristic information includes information on a difference between an actual position of the dots formed by the nozzles and an ideal position of the dots formed by the nozzles on the print medium.

11. The printer according to claim 1, wherein the nozzle characteristic information includes information indicating the presence or absence of badness of ink discharge of the nozzles.

12. The printer according to claim 1, wherein the nozzle characteristic information includes information on a difference between an actual density value of the dots formed by the nozzles and an ideal density value of the dots formed by the nozzles.

13. The printer according to claim 1, wherein the print head includes the nozzles successively arranged over a range wider than a load region of the print medium and is a print head which can print the image on the print medium through one scan.

14. The printer according to claim 1, wherein the print head is a print head which performs a printing operation while reciprocating in a direction perpendicular to a conveyance direction of the print medium.

15. A printer control program product that causes a computer to execute a method of controlling a printer that prints an image on a print medium by means of a print head having nozzles that can form dots on the print medium, the method comprising:
   acquiring image data having pixel values each having M gray scales (where, M≧2);
   specifying a nozzle concerned with banding generation in the print head, based on nozzle characteristic information representing characteristics of the nozzles;
   performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding; and
   controlling a process range of the banding prevention process to include the banding generation line and the different line, a density difference of density values of a line adjacent to the different line falling within a predetermined numerical range.

16. The printer control program product according to claim 15, further comprising:
   generating print data including information associated with dot formation of the nozzle for the image data, based on the image data that are subjected to the banding prevention process; and
   printing the image on the print medium by means of the print head, based on the print data.

17. A printer control method of controlling a printer that prints an image on a print medium by means of a print head having nozzles that can form dots on the print medium, the method comprising:
   acquiring image data having pixel values each having M gray scales (where, M≧2);
   specifying a nozzle concerned with banding generation in the print head, based on nozzle characteristic information representing characteristics of the nozzles;
   performing a banding prevention process for data corresponding to a banding generation line constituted by dots formed by the nozzle concerned with the banding generation and a different line constituted by dots formed by a different nozzle near the nozzle concerned with the banding generation in the image data to reduce deterioration of print quality due to the banding;
   controlling a process range of the banding prevention process to include the banding generation line and the different line, a density difference of density values of a line adjacent to the different line falling within a predetermined numerical range; and
   printing the image on the print medium by means of the print head, based on the image data that are subjected to the banding prevention process.

18. The printer control method according to claim 15, further comprising generating print data including information associated with dot formation of the nozzle for the image data, based on the image data that are subjected to the banding prevention process,
   wherein the printing of the image on the print medium includes printing the image on the print medium by means of the print head, based on the print data.

* * * * *